United States Patent
Hjermstad et al.

(10) Patent No.: US 11,366,860 B1
(45) Date of Patent: *Jun. 21, 2022

(54) DATABASE SYSTEM FOR DYNAMICALLY GENERATING CUSTOMIZED MODELS

(71) Applicant: Experian Information Solutions, Inc., Costa Mesa, CA (US)

(72) Inventors: Erik Peter Hjermstad, Lincoln, NE (US); Tony T. Morris, Huntington Beach, CA (US); Jennifer Kuhr Schwartz, Lincoln, NE (US); Heidi Beth Haupt, Streamwood, IL (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/931,249

(22) Filed: Jul. 16, 2020

Related U.S. Application Data

(63) Continuation of application No. 16/246,036, filed on Jan. 11, 2019, now Pat. No. 10,740,404, which is a
(Continued)

(51) Int. Cl.
*G06F 16/00* (2019.01)
*G06F 16/9035* (2019.01)
(Continued)

(52) U.S. Cl.
CPC ........ *G06F 16/9035* (2019.01); *G06F 16/904* (2019.01); *G06F 16/909* (2019.01); *G06Q 30/0205* (2013.01)

(58) Field of Classification Search
CPC .................................................. G06F 16/9035
See application file for complete search history.

(56) References Cited

U.S. PATENT DOCUMENTS

| 4,989,144 A | 1/1991 | Barnett, III |
| 5,120,704 A | 6/1992 | Lechter et al. |

(Continued)

FOREIGN PATENT DOCUMENTS

| EP | 0 749 081 | 12/1996 |
| EP | 1 122 664 | 8/2001 |

(Continued)

OTHER PUBLICATIONS

Copeland et al., "Wallet-on-Wheels—Using Vehicle's Identity for Secure Mobile Money", 17th International Conference on Intelligence in Next Generation Networks, 2013, pp. 102-109.
(Continued)

*Primary Examiner* — Ajith Jacob
(74) *Attorney, Agent, or Firm* — Knobbe Martens Olson & Bear, LLP

(57) ABSTRACT

Embodiments of a system may comprise databases and a processor that receives a first filter item and a database filter item, generates a first database based on the first filter item, integrate data from the first database into the user database to create an updated plurality of user records, generate a second database based on a selected set of records, in the updated plurality of user records, corresponding to the database filter item, determine metrics that correspond to the second database, generate a model to segregate the second database using the metrics, receive criteria, compare the segregated second database with the criteria to remove records that do not meet the criteria, cause a subsequent update to the updated second database to integrate data from the event database to create an updated diminished second database, and generate a notification including information included in the updated diminished second database.

20 Claims, 37 Drawing Sheets

Related U.S. Application Data continuation-in-part of application No. 15/914,983, filed on Mar. 7, 2018, now Pat. No. 10,565,181.

(51) Int. Cl.

| | |
|---|---|
| *G06F 16/909* | (2019.01) |
| *G06Q 30/02* | (2012.01) |
| *G06F 16/904* | (2019.01) |

(56) References Cited

U.S. PATENT DOCUMENTS

| | | | |
|---|---|---|---|
| 5,201,010 | A | 4/1993 | Deaton et al. |
| 5,216,612 | A | 6/1993 | Cornett et al. |
| 5,488,360 | A | 1/1996 | Ray |
| 5,532,838 | A | 7/1996 | Barbari |
| 5,587,575 | A | 12/1996 | Leitner et al. |
| 5,630,070 | A | 5/1997 | Dietrich et al. |
| 5,748,098 | A | 5/1998 | Grace |
| 5,765,143 | A | 6/1998 | Sheldon et al. |
| 5,819,234 | A | 10/1998 | Slavin et al. |
| 5,878,403 | A | 3/1999 | DeFrancesco |
| 5,940,812 | A | 8/1999 | Tengel et al. |
| 5,950,169 | A | 9/1999 | Borghesi et al. |
| 5,963,129 | A | 10/1999 | Warner |
| 5,995,947 | A | 11/1999 | Fraser et al. |
| 6,006,201 | A | 12/1999 | Berent et al. |
| 6,038,554 | A | 3/2000 | Vig |
| 6,052,065 | A | 4/2000 | Glover |
| 6,052,068 | A | 4/2000 | Price R-W et al. |
| 6,076,064 | A | 6/2000 | Rose, Jr. |
| 6,126,332 | A | 10/2000 | Cubbage et al. |
| 6,154,152 | A | 11/2000 | Ito |
| 6,182,048 | B1 | 1/2001 | Osborn et al. |
| 6,208,979 | B1 | 3/2001 | Sinclair |
| 6,236,977 | B1 | 5/2001 | Verba et al. |
| 6,278,936 | B1 | 8/2001 | Jones |
| 6,282,517 | B1 | 8/2001 | Wolfe et al. |
| 6,330,499 | B1 | 12/2001 | Chou et al. |
| 6,330,546 | B1 | 12/2001 | Gopinathan et al. |
| 6,430,539 | B1 | 8/2002 | Lazarus et al. |
| 6,516,239 | B1 | 2/2003 | Madden et al. |
| 6,587,841 | B1 | 7/2003 | DeFrancesco |
| 6,609,108 | B1 | 8/2003 | Pulliam et al. |
| 6,714,859 | B2 | 3/2004 | Jones |
| 6,738,748 | B2 | 5/2004 | Wetzer |
| 6,754,564 | B2 | 6/2004 | Newport |
| 6,760,794 | B2 | 7/2004 | Deno et al. |
| 6,772,145 | B2 | 8/2004 | Shishido |
| 6,804,606 | B2 | 10/2004 | Jones |
| 6,839,682 | B1 | 1/2005 | Blume et al. |
| 6,904,359 | B2 | 6/2005 | Jones |
| 6,938,021 | B2 | 8/2005 | Shear et al. |
| 6,959,281 | B1 | 10/2005 | Freeling et al. |
| 6,980,963 | B1 | 12/2005 | Hanzek |
| 7,024,418 | B1 | 4/2006 | Childress |
| 7,050,982 | B2 | 5/2006 | Sheinson et al. |
| 7,069,118 | B2 | 6/2006 | Coletrane et al. |
| 7,092,898 | B1 | 8/2006 | Mattick et al. |
| 7,113,853 | B2 | 9/2006 | Hecklinger |
| 7,130,821 | B1 | 10/2006 | Connors et al. |
| 7,181,427 | B1 | 2/2007 | DeFrancesco |
| 7,184,974 | B2 | 2/2007 | Shishido |
| 7,191,058 | B2 | 3/2007 | Laird et al. |
| 7,228,298 | B1 | 6/2007 | Raines |
| 7,288,298 | B2 | 6/2007 | Raines |
| 7,275,083 | B1 | 9/2007 | Seibel et al. |
| 7,366,694 | B2 | 4/2008 | Lazerson |
| 7,392,203 | B2 | 6/2008 | Edison et al. |
| 7,392,221 | B2 | 6/2008 | Nabe et al. |
| 7,418,408 | B1 | 8/2008 | Heppe |
| 7,421,322 | B1 | 9/2008 | Silversmith et al. |
| 7,433,891 | B2 | 10/2008 | Haber et al. |
| 7,444,302 | B2 | 10/2008 | Hu et al. |
| 7,472,088 | B2 | 12/2008 | Taylor et al. |
| RE40,692 | E | 3/2009 | Rose, Jr. |
| 7,505,838 | B2 | 3/2009 | Raines et al. |
| 7,561,963 | B2 | 7/2009 | Brice et al. |
| 7,567,922 | B1 | 7/2009 | Weinberg et al. |
| 7,571,139 | B1 | 8/2009 | Giordano et al. |
| 7,580,856 | B1 | 8/2009 | Pliha |
| 7,590,589 | B2 | 9/2009 | Hoffberg |
| 7,593,893 | B1 | 9/2009 | Ladd et al. |
| 7,596,512 | B1 | 9/2009 | Raines et al. |
| 7,603,293 | B2 | 10/2009 | Chenn |
| 7,610,257 | B1 | 10/2009 | Abrahams |
| 7,630,932 | B2 | 12/2009 | Danaher et al. |
| 7,653,592 | B1 | 1/2010 | Flaxman et al. |
| 7,693,896 | B1 | 4/2010 | Raines |
| 7,739,142 | B2 | 6/2010 | Chand et al. |
| 7,778,841 | B1 | 8/2010 | Bayer et al. |
| 7,788,147 | B2 | 8/2010 | Haggerty et al. |
| 7,835,940 | B2 | 11/2010 | Kowalchuk |
| 7,865,409 | B1 | 1/2011 | Monaghan |
| 7,877,320 | B1 | 1/2011 | Downey |
| 7,925,654 | B1 | 4/2011 | Raines |
| 7,945,478 | B2 | 5/2011 | Hogan et al. |
| 7,945,483 | B2 | 5/2011 | Inghelbrecht et al. |
| 7,962,404 | B1 | 6/2011 | Metzger, II et al. |
| 7,966,210 | B2 | 6/2011 | Hall et al. |
| 7,974,886 | B2 | 7/2011 | Coleman |
| 7,991,689 | B1 | 8/2011 | Brunzell et al. |
| 8,005,759 | B2 | 8/2011 | Hirtenstein et al. |
| 8,005,795 | B2 | 8/2011 | Galipeau et al. |
| 8,036,952 | B2 | 10/2011 | Mohr et al. |
| 8,055,544 | B2 | 11/2011 | Ullman et al. |
| 8,078,524 | B2 | 12/2011 | Crawford et al. |
| 8,104,671 | B2 | 1/2012 | Besecker et al. |
| 8,121,938 | B1 | 2/2012 | Zettner et al. |
| 8,185,417 | B1 | 5/2012 | Brown et al. |
| 8,219,464 | B2 | 7/2012 | Inghelbrecht et al. |
| 8,239,388 | B2 | 8/2012 | Raines |
| 8,244,563 | B2 | 8/2012 | Coon et al. |
| 8,255,243 | B2 | 8/2012 | Raines et al. |
| 8,255,244 | B2 | 8/2012 | Raines et al. |
| 8,285,656 | B1 | 10/2012 | Chang et al. |
| 8,355,983 | B1 | 1/2013 | Parr et al. |
| 8,380,594 | B2 | 2/2013 | Berkman et al. |
| 8,392,334 | B2 | 3/2013 | Hirtenstein et al. |
| 8,438,048 | B1 | 5/2013 | Benavides, III |
| 8,438,170 | B2 | 5/2013 | Koran et al. |
| 8,521,615 | B2 | 8/2013 | Inghelbrecht et al. |
| 8,560,161 | B1 | 10/2013 | Kator et al. |
| 8,577,736 | B2 | 11/2013 | Swinson et al. |
| 8,595,079 | B1 | 11/2013 | Raines et al. |
| 8,600,783 | B2 | 12/2013 | Smith et al. |
| 8,600,823 | B1 | 12/2013 | Raines et al. |
| 8,606,648 | B1 | 12/2013 | Bayer et al. |
| 8,626,560 | B1 | 1/2014 | Anderson |
| 8,630,929 | B2 | 1/2014 | Haggerty et al. |
| 8,645,193 | B2 | 2/2014 | Swinson et al. |
| 8,661,032 | B2 | 2/2014 | Otten et al. |
| 8,725,584 | B1 | 5/2014 | Eager et al. |
| 8,781,846 | B2 | 7/2014 | Swinson et al. |
| 9,020,843 | B2 | 4/2015 | Taira et al. |
| 9,020,844 | B2 | 4/2015 | Taira et al. |
| 9,053,589 | B1 | 6/2015 | Kator et al. |
| 9,053,590 | B1 | 6/2015 | Kator et al. |
| 9,076,276 | B1 | 7/2015 | Kator et al. |
| 9,087,335 | B2 | 7/2015 | Rane et al. |
| 9,105,048 | B2 | 8/2015 | Koran et al. |
| 9,111,308 | B2 | 8/2015 | Taira et al. |
| 9,123,056 | B2 | 9/2015 | Singh et al. |
| 9,129,325 | B2 | 9/2015 | Taira et al. |
| 9,147,217 | B1 | 9/2015 | Zabritski et al. |
| 9,292,860 | B2 | 3/2016 | Singh et al. |
| 9,501,781 | B2 | 11/2016 | Singh et al. |
| 9,646,308 | B1 | 5/2017 | Eager et al. |
| 9,690,820 | B1 | 6/2017 | Girulat, Jr. |
| 9,697,544 | B1 | 7/2017 | Bayer et al. |
| 9,727,904 | B2 | 8/2017 | Inghelbrecht et al. |
| 9,741,066 | B2 | 8/2017 | Eager et al. |
| 9,754,304 | B2 | 9/2017 | Taira et al. |
| 9,818,140 | B2 | 11/2017 | Inghelbrecht et al. |
| 9,904,933 | B2 | 2/2018 | Taira et al. |

(56) References Cited

U.S. PATENT DOCUMENTS

| | | |
|---|---|---|
| 9,904,948 B2 | 2/2018 | Taira et al. |
| 10,162,848 B2 | 12/2018 | Mohan et al. |
| 10,163,156 B1 | 12/2018 | Shapley et al. |
| 10,217,123 B2 | 2/2019 | Taira et al. |
| 10,269,030 B2 | 4/2019 | Taira et al. |
| 10,269,031 B2 | 4/2019 | Inghelbrecht et al. |
| 10,380,654 B2 | 8/2019 | Hirtenstein et al. |
| 10,409,867 B1 | 9/2019 | Von Busch et al. |
| 10,430,848 B2 | 10/2019 | Cotton et al. |
| 10,489,809 B2 | 11/2019 | Inghelbrecht et al. |
| 10,489,810 B2 | 11/2019 | Taira et al. |
| 10,515,382 B2 | 12/2019 | Taira et al. |
| 10,565,181 B1 | 2/2020 | Hjermstad et al. |
| 10,580,054 B2 | 3/2020 | Cain et al. |
| 10,581,825 B2 | 3/2020 | Poschel et al. |
| 10,740,404 B1 | 8/2020 | Hjermstad et al. |
| 10,853,831 B2 | 12/2020 | Inghelbrecht et al. |
| 10,977,727 B1 | 4/2021 | Smith et al. |
| 11,157,835 B1 | 10/2021 | Hjermstad et al. |
| 11,176,608 B1 | 11/2021 | Smith |
| 11,210,276 B1 | 12/2021 | Smith |
| 11,210,351 B1 | 12/2021 | Von Busch et al. |
| 2001/0044769 A1 | 11/2001 | Chaves |
| 2002/0023051 A1 | 2/2002 | Kunzle et al. |
| 2002/0042752 A1 | 4/2002 | Chaves |
| 2002/0072964 A1 | 6/2002 | Choi |
| 2002/0082978 A1 | 6/2002 | Ghouri et al. |
| 2002/0091706 A1 | 7/2002 | Anderson et al. |
| 2002/0099628 A1 | 7/2002 | Takaoka et al. |
| 2002/0103622 A1 | 8/2002 | Burge |
| 2002/0128960 A1 | 9/2002 | Lambiotte et al. |
| 2002/0161496 A1 | 10/2002 | Yamaki |
| 2002/0193925 A1 | 12/2002 | Funkhouser et al. |
| 2003/0033242 A1 | 2/2003 | Lynch et al. |
| 2003/0041019 A1 | 2/2003 | Vagim, III et al. |
| 2003/0046179 A1 | 3/2003 | Anabtawi et al. |
| 2003/0101111 A1 | 5/2003 | Dang et al. |
| 2003/0105728 A1 | 6/2003 | Yano et al. |
| 2003/0144950 A1 | 7/2003 | O'Brien et al. |
| 2003/0177481 A1 | 9/2003 | Amaru et al. |
| 2003/0187753 A1 | 10/2003 | Takaoka |
| 2003/0200151 A1 | 10/2003 | Ellenson et al. |
| 2003/0216965 A1 | 11/2003 | Libman |
| 2003/0233323 A1 | 12/2003 | Bilski et al. |
| 2004/0034657 A1 | 2/2004 | Zambo et al. |
| 2004/0039646 A1 | 2/2004 | Hacker |
| 2004/0088228 A1 | 5/2004 | Mercer et al. |
| 2004/0107125 A1 | 6/2004 | Guheen et al. |
| 2004/0128262 A1 | 7/2004 | Nafousi |
| 2004/0163101 A1 | 8/2004 | Swix |
| 2004/0193644 A1 | 9/2004 | Baker et al. |
| 2004/0243506 A1 | 12/2004 | Das |
| 2004/0249532 A1 | 12/2004 | Kelly et al. |
| 2005/0010555 A1 | 1/2005 | Gallivan |
| 2005/0021384 A1 | 1/2005 | Pantaleo et al. |
| 2005/0038580 A1 | 2/2005 | Seim et al. |
| 2005/0113991 A1 | 5/2005 | Rogers et al. |
| 2005/0173524 A1 | 8/2005 | Schrader |
| 2005/0177489 A1 | 8/2005 | Neff et al. |
| 2005/0209892 A1 | 9/2005 | Miller |
| 2005/0234912 A1 | 10/2005 | Roach |
| 2005/0246256 A1 | 11/2005 | Gastineau et al. |
| 2005/0251820 A1 | 11/2005 | Stefanik et al. |
| 2005/0256780 A1 | 11/2005 | Eldred |
| 2005/0267754 A1 | 12/2005 | Schultz et al. |
| 2005/0267774 A1 | 12/2005 | Merritt et al. |
| 2006/0004731 A1 | 1/2006 | Seibel et al. |
| 2006/0010052 A1 | 1/2006 | Willingham |
| 2006/0015425 A1 | 1/2006 | Brooks |
| 2006/0031182 A1 | 2/2006 | Ryan et al. |
| 2006/0041443 A1 | 2/2006 | Horvath |
| 2006/0107560 A1 | 5/2006 | Wong |
| 2006/0149674 A1 | 7/2006 | Cook et al. |
| 2006/0163868 A1 | 7/2006 | Baumann |
| 2006/0178957 A1 | 8/2006 | LeClaire |
| 2006/0178973 A1 | 8/2006 | Chiovari et al. |
| 2006/0202012 A1 | 9/2006 | Grano et al. |
| 2006/0202862 A1 | 9/2006 | Ratnakar |
| 2006/0206416 A1 | 9/2006 | Farias |
| 2006/0218079 A1 | 9/2006 | Goldblatt et al. |
| 2006/0229799 A1 | 10/2006 | Nimmo et al. |
| 2006/0242046 A1 | 10/2006 | Haggerty et al. |
| 2006/0242050 A1 | 10/2006 | Haggerty et al. |
| 2006/0277141 A1 | 12/2006 | Palmer |
| 2007/0011083 A1 | 1/2007 | Bird et al. |
| 2007/0027791 A1 | 2/2007 | Young et al. |
| 2007/0043487 A1 | 2/2007 | Krzystofczyk et al. |
| 2007/0059442 A1 | 3/2007 | Sabeta |
| 2007/0136163 A1 | 6/2007 | Bell |
| 2007/0156515 A1 | 7/2007 | Hasselback et al. |
| 2007/0162293 A1 | 7/2007 | Malkon |
| 2007/0173993 A1 | 7/2007 | Nielsen et al. |
| 2007/0179798 A1 | 8/2007 | Inbarajan |
| 2007/0179860 A1 | 8/2007 | Romero |
| 2007/0185777 A1 | 8/2007 | Pyle et al. |
| 2007/0192165 A1 | 8/2007 | Haggerty et al. |
| 2007/0226131 A1 | 9/2007 | Decker et al. |
| 2007/0244732 A1 | 10/2007 | Chatterji et al. |
| 2007/0250327 A1 | 10/2007 | Hedy |
| 2007/0271178 A1 | 11/2007 | Davis et al. |
| 2007/0282713 A1 | 12/2007 | Ullman et al. |
| 2007/0288271 A1 | 12/2007 | Klinkhammer |
| 2007/0294163 A1 | 12/2007 | Harmon et al. |
| 2008/0015954 A1 | 1/2008 | Huber et al. |
| 2008/0016119 A1 | 1/2008 | Sharma et al. |
| 2008/0059317 A1 | 3/2008 | Chandran et al. |
| 2008/0071882 A1 | 3/2008 | Hering et al. |
| 2008/0097663 A1 | 4/2008 | Morimoto |
| 2008/0120155 A1 | 5/2008 | Pliha |
| 2008/0126137 A1 | 5/2008 | Kidd et al. |
| 2008/0177590 A1 | 7/2008 | Brodsky et al. |
| 2008/0183689 A1 | 7/2008 | Kubota et al. |
| 2008/0183722 A1 | 7/2008 | Lane et al. |
| 2008/0201163 A1 | 8/2008 | Barker et al. |
| 2008/0228635 A1 | 9/2008 | Megdal et al. |
| 2008/0235061 A1 | 9/2008 | Innes |
| 2008/0255897 A1 | 10/2008 | Megdal et al. |
| 2008/0294540 A1 | 11/2008 | Celka et al. |
| 2008/0294546 A1 | 11/2008 | Flannery |
| 2008/0301188 A1 | 12/2008 | O'Hara |
| 2008/0312969 A1 | 12/2008 | Raines et al. |
| 2009/0018996 A1 | 1/2009 | Hunt et al. |
| 2009/0055044 A1 | 2/2009 | Dienst |
| 2009/0063172 A1 | 3/2009 | Thomas et al. |
| 2009/0083130 A1 | 3/2009 | Hall et al. |
| 2009/0138290 A1 | 5/2009 | Holden |
| 2009/0144201 A1 | 6/2009 | Gierkink et al. |
| 2009/0187513 A1 | 7/2009 | Noy et al. |
| 2009/0240602 A1 | 9/2009 | Mohr et al. |
| 2009/0240735 A1 | 9/2009 | Grandhi et al. |
| 2009/0271296 A1 | 10/2009 | Romero |
| 2009/0271385 A1 | 10/2009 | Krishnamoorthy et al. |
| 2009/0287370 A1 | 11/2009 | Iwai et al. |
| 2010/0030649 A1 | 2/2010 | Ubelhor |
| 2010/0049538 A1 | 2/2010 | Frazer et al. |
| 2010/0070343 A1 | 3/2010 | Taira et al. |
| 2010/0070382 A1 | 3/2010 | Inghelbrecht et al. |
| 2010/0076881 A1 | 3/2010 | O'Grady et al. |
| 2010/0082792 A1 | 4/2010 | Johnson |
| 2010/0088158 A1 | 4/2010 | Pollack |
| 2010/0094664 A1 | 4/2010 | Bush et al. |
| 2010/0153235 A1 | 6/2010 | Mohr et al. |
| 2010/0161486 A1 | 6/2010 | Liu et al. |
| 2010/0174657 A1 | 7/2010 | Stanton, Jr. |
| 2010/0179861 A1 | 7/2010 | Teerilahti et al. |
| 2010/0198629 A1 | 8/2010 | Wesileder et al. |
| 2010/0217616 A1 | 8/2010 | Colson et al. |
| 2010/0223106 A1 | 9/2010 | Hallowell et al. |
| 2010/0293089 A1 | 11/2010 | Peterson et al. |
| 2010/0293181 A1 | 11/2010 | Muller et al. |
| 2010/0299190 A1 | 11/2010 | Pratt et al. |
| 2010/0332292 A1 | 12/2010 | Anderson |
| 2011/0022489 A1 | 1/2011 | Hallowell et al. |
| 2011/0022525 A1 | 1/2011 | Swinson et al. |

(56) References Cited

U.S. PATENT DOCUMENTS

| | | |
|---|---|---|
| 2011/0040440 A1 | 2/2011 | de Oliveira et al. |
| 2011/0082759 A1 | 4/2011 | Swinson et al. |
| 2011/0137758 A1 | 6/2011 | Bienias |
| 2011/0161115 A1 | 6/2011 | Hampton |
| 2011/0202471 A1 | 8/2011 | Scott et al. |
| 2011/0213641 A1 | 9/2011 | Metzger, II et al. |
| 2011/0264595 A1 | 10/2011 | Anspach et al. |
| 2011/0270706 A1 | 11/2011 | Anspach et al. |
| 2011/0270707 A1 | 11/2011 | Breed et al. |
| 2011/0276467 A1 | 11/2011 | Blackburn et al. |
| 2011/0320241 A1 | 12/2011 | Miller |
| 2012/0005045 A1 | 1/2012 | Baker |
| 2012/0005108 A1 | 1/2012 | Hollenshead et al. |
| 2012/0106801 A1 | 5/2012 | Jackson |
| 2012/0109770 A1 | 5/2012 | Seergy et al. |
| 2012/0197699 A1 | 8/2012 | Snell et al. |
| 2012/0221485 A1 | 8/2012 | Leidner et al. |
| 2012/0239637 A9 | 9/2012 | Prakash et al. |
| 2012/0254017 A1 | 10/2012 | Fusco et al. |
| 2012/0265648 A1 | 10/2012 | Jerome et al. |
| 2012/0271850 A1 | 10/2012 | Licata Messana et al. |
| 2012/0331010 A1 | 12/2012 | Christie |
| 2013/0006801 A1 | 1/2013 | Solari et al. |
| 2013/0006809 A1 | 1/2013 | Hollenshead et al. |
| 2013/0159033 A1 | 6/2013 | Weinstock et al. |
| 2013/0173453 A1 | 7/2013 | Raines et al. |
| 2013/0173481 A1 | 7/2013 | Hirtenstein et al. |
| 2013/0238455 A1 | 9/2013 | Laracey |
| 2013/0268298 A1 | 10/2013 | Elkins et al. |
| 2014/0025681 A1 | 1/2014 | Raines |
| 2014/0058956 A1 | 2/2014 | Raines et al. |
| 2014/0082017 A1 | 3/2014 | Miller |
| 2014/0258309 A1 | 9/2014 | Young |
| 2014/0358719 A1 | 12/2014 | Inghelbrect et al. |
| 2015/0154608 A9 | 6/2015 | Raines |
| 2015/0213559 A1 | 7/2015 | Raines et al. |
| 2015/0227942 A1 | 8/2015 | Sidman et al. |
| 2015/0310865 A1 | 10/2015 | Fay et al. |
| 2015/0317728 A1 | 11/2015 | Nguyen |
| 2015/0324400 A1 | 11/2015 | Sheck et al. |
| 2015/0332411 A1 | 11/2015 | Bush et al. |
| 2015/0348143 A1 | 12/2015 | Raines et al. |
| 2015/0348145 A1 | 12/2015 | Nakajima |
| 2016/0004742 A1 | 1/2016 | Mohan et al. |
| 2016/0012494 A1 | 1/2016 | Lasini |
| 2016/0180428 A1 | 6/2016 | Cain et al. |
| 2016/0217046 A1 | 7/2016 | Lamoureux et al. |
| 2016/0267588 A1 | 9/2016 | Cain et al. |
| 2016/0299905 A1 | 10/2016 | Geyer et al. |
| 2016/0321726 A1 | 11/2016 | Singh et al. |
| 2016/0379486 A1 | 12/2016 | Taylor |
| 2017/0052652 A1 | 2/2017 | Denton et al. |
| 2017/0270490 A1 | 9/2017 | Penilla et al. |
| 2017/0323295 A1 | 11/2017 | Kranzley et al. |
| 2018/0018723 A1 | 1/2018 | Nagla et al. |
| 2018/0107676 A1 | 4/2018 | Vora |
| 2018/0108189 A1 | 4/2018 | Park et al. |
| 2018/0157761 A1 | 6/2018 | Halstead et al. |
| 2018/0165747 A1 | 6/2018 | Patten et al. |
| 2018/0349988 A1 | 12/2018 | Shebesta et al. |
| 2019/0295133 A1 | 9/2019 | Hirtenstein et al. |
| 2020/0051102 A1 | 2/2020 | Taira et al. |
| 2020/0065885 A1 | 2/2020 | Smith |
| 2020/0065898 A1 | 2/2020 | Forrester et al. |
| 2020/0265480 A1 | 8/2020 | Swinson et al. |

FOREIGN PATENT DOCUMENTS

| | | |
|---|---|---|
| JP | 09-251486 | 9/1997 |
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| JP | 2007-299281 | 11/2007 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2002-0068866 | 8/2002 |
| WO | WO 99/004350 | 1/1999 |
| WO | WO 99/022328 | 5/1999 |
| WO | WO 01/071458 | 9/2001 |
| WO | WO 01/075754 | 10/2001 |
| WO | WO 03/101123 | 12/2003 |
| WO | WO 2007/149941 | 12/2007 |
| WO | WO 2008/022289 | 2/2008 |
| WO | WO 2018/199992 | 11/2018 |

OTHER PUBLICATIONS

"Activant PartExpert with Vehicle Identification Number (VIN) Lookup", Activant Solutions, Inc., Livermore, CA, Copyright 2006, http://counterworks.com/PartExp_DS_092806.pdf, pp. 2.

"AutoConnect Partners with Organic to Build World's Most Comprehensive Online Emporium of Pre-Owned Vehicles", PR Newswire, May 19, 1998, pp. 2.

"Auto Market StatisticsSM:Drive Response with Aggregated Motor Vehicle Information", Experian, Apr. 2007, http://www.experian.com/assets/marketing-services/product-sheets/auto-market-statistics.pdf, pp. 2.

"Appraisal Tool", VAuto Live Market View, Dec. 14, 2007, http://www.vauto.com/vAuto_solution/appraisal.asp, pp. 3.

Autobytel.com, http://web.archive.org/web/20040806010507//http://autobytel.com/, as archived Aug. 6, 2004, pp. 3.

Bala, Pradip Kumar, "Purchase-Driven Classification for Improved Forecasting in Spare Parts Inventory Replenishment," International Journal of Computer Applications, Nov. 2010, vol. 10, No. 9, pp. 40-45.

Bankrate.com, http://web.archive.org/web/20040809000026/www.bankrate.com/brm/default.asp, as archived Aug. 9, 2004, pp. 3.

"Carfax Teams with Esurance", PR Newswire, May 14, 2001, p. 1.

Cars.com, http://web.archive.org/web/20041010081241/www.cars.com/go/index.jsp?aff=national, as archived Oct. 10, 2004, pp. 2.

Carsdirect.com, http://web.archive.org/web/20040730142836/www.carsdirect.com/home, as archived Jul. 30, 2004, pp. 2.

Checkbook.org, http://web.archive.org/web/20040604192834/www.checkbook.org/auto/carbarg.cfm, as archived Jun. 4, 2004, p. 1.

"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003, pp. 2.

Cohen et al., "Optimizer: IBM's Multi Echelon Inventory System for Managing Service Logistics", Interfaces, vol. 20, No. 1, Jan.-Feb. 1990, pp. 65-82.

"Driveitaway.com Links with AutoCheck to Provide Car Shoppers Vehicle Histories; Consumers Bidding on Driveitaway.com's Used Auto Auctions Can Now Go Online to Research a Specific Vehicle's History", PR Newswire, Jan. 15, 2001, p. 1.

"Experian Uses SSA-NAME3 to Match 40 to 50 Million Transactions per Month Against an 11.5 Billion Row Database", DM Review, Apr. 2001, vol. 11, No. 4, pp. 3.

Farrell et al., "Installed Base and Compatibility: Innovation, Product Preannouncements, and Predation", The American Economic Review, Dec. 1986, vol. 76, No. 5, pp. 940-955.

Garcia-Molina et al., "Database Systems: The Complete Book", Prentice Hall, Inc., Ch. 15, 2002, pp. 713-715.

Grange, Frank, "Challenges in Modeling Demand for Inventory Optimization of Slow-Moving Items," Proceedings of the 1998 Winter Simulation Conference, 1998, pp. 1211-1217.

(56) References Cited

OTHER PUBLICATIONS

Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.

Handfield et al., "Managing Component Life Cycles in Dynamic Technological Environments", International Journal of Purchasing and Materials Management, Tempe, Spring 1994, vol. 30, No. 2, pp. 20-28.

Inderfurth et al., "Decision Support for Spare Parts Acquisition in Post Product Life Cycle", Central European Journal of Operations Research, 2008, vol. 16, pp. 17-42.

"Intelligence Insight Impact", Polk Automotive Manufacturers; http://usa.polk.com/Industries/AutoMfr/Analyze/MarketAnalysis/, Dec. 13, 2007, pp. 3.

International Search Report and Written Opinion in PCT Application No. PCT/US07/76152, dated Mar. 20, 2009.

Invoicedealers.com, http://web.archive.org/web/20040804044511/http://www.invoicedealers.com/, Aug. 4, 2004, pp. 2.

Ivillage.com, http://web.archive.org/web/20040729234947/http://www.ivillage.com/, Jul. 29, 2004, pp. 2.

"Japan's JAAI System Appraises Used Cars Over Internet", Asia Pulse, Mar. 3, 2000, p. 1.

Jaro, Matthew A., "Probabilistic Linkage of Large Public Health Data Files", Statistics in Medicine, 1995, vol. 14, pp. 491-498.

Käki, Anssi, "Forecasting in End-of-Life Spare Parts Procurement", Master's Thesis, Helsinki University of Technology, System Analysis Laboratory, Jul. 27, 2007, p. 84.

Kennedy et al., "An Overview of Recent Literature on Spare Parts Inventories", International Journal of Production Economics, 2002, vol. 76, pp. 201-215.

Kim et al., "Optimal Pricing, EOL (End of Life) Warranty, and Spare Parts Manufacturing Strategy Amid Product Transition", European Journal of Operation Research, 2008, vol. 188, pp. 723-745.

Koller, Mike, "Wireless Service Aids," Internetweek, Jul. 9, 2001, p. 15.

Krupp, James A.G., "Forecasting for the Automotive Aftermarket", The Journal of Business Forecasting Methods & Systems, Winter 1993-1994, vol. 12, No. 4, ABI/Inform Global, pp. 8-12.

Lapide, Larry, "New Developments in Business Forecasting", The Journal of Business Forecasting, Spring 2002, pp. 12-14.

Lee, Ho Geun, "AUCNET: Electronic Intermediary for Used-Car Transactions", EM-Electronic Markets, Dec. 1997, vol. 7, No. 4, pp. 24-28.

Miller, Joe, "NADA Used-Car Prices Go Online", Automotive News, Jun. 14, 1999, p. 36.

Moore, John R., Jr. "Forecasting and Scheduling for Past-Model Replacement Parts", Management Science, Application Series, vol. 18, No. 4, Part 1, Dec. 1971, pp. B-200-B-213.

"NAAA-Recommended Vehicle Condition Grading Scale", Noted as early as 2007, pp. 3.

Packer, A. H., "Simulation and Adaptive Forecasting an Applied to Inventory Control", Operations Research, Jul. 1965, vol. 15, No. 4, pp. 660-679.

"Power Information Network: Power to Drive your Business", J.D. Power and Associates Power Information Network, http://www.powerinfonet.com/products/productDetail.asp?type=financialinstitutions, Dec. 13, 2007, pp. 2.

Peters, Peter-Paul, "A Spare Parts Configurator for the European Service Business" (Graduation Report), Honeywell, Industrial Service Logistic Center, Amsterdam, The Netherlands, Mar. 2000, pp. 80.

Porter, G. Zell, "An Economic Method for Evaluating Electronic Component Obsolescence Solutions", www.gidep.org/data/dmsms/library/zell.pdf, May 1998, pp. 1-9.

"Pricing Tool", vAuto Live Market View, http://www.avauto.com/vAuto_Solution/pricing.asp, Dec. 13, 2007, pp. 2.

Reinbach, Andrew, "MCIF Aids Banks in CRA Compliance", Bank Systems & Technology, Aug. 1995, vol. 32, No. 8, p. 27.

Roos, Gina, "Web-Based Service Helps OEMs Cure Parts Obsolescence Blues", Electronic Engineering Times, Oct. 8, 2001, p. 86.

Santarini, Michael, "Forecasts the Probable Obsolescence of Components—Module Predicts Parts Life", Electronic Engineering Times, Jan. 11, 1999, vol. 1, p. 48.

Sawyers, Arlena, "NADA to Offer Residual Guide", Automotive News, May 22, 2000, p. 1.

Shapiro et al., "Systems Competition and Aftermarkets: an Economic Analysis of Kodak", The Antitrust Bulletin, Spring 1994, pp. 135-162.

"Stoneage Corporation Announces Database of 250,000 Used Cars Posted to the Internet", PR Newswire, Feb. 24, 1998, p. 1.

Sullivan, Laurie, "Obsolete-Parts Program Thriving", EBN, Manhasset, NY, Jan. 21, 2002, Issue 1296, p. 26.

"Urban Science Launches Second Generation Lead Scoring Solution", Urban Science, Detroit, MI, Mar. 1, 2007, http://www.urbanscience.com/newsevents/pr_20070222.html, pp. 3.

"WashingtonPost.com and Cars.com Launch Comprehensive Automotive Web Site for the Washington Area", PR Newswire, Oct. 22, 1998. pp. 2.

Watts, Craig, "Consumers Now Can Know What Loan Rate Offers to Expect Based on Their FICO Credit Score at MyFICO.com," San Rafael, CA, Mar. 6, 2002, p. 2, http://www.myfico.com/PressRoom/PressReleases/2002_03_06.aspx.

Webster, Lee R., "Failure Rates & Life-Cycle Costs", Consulting-Specifying Engineer, Apr. 1998, vol. 23, No. 4, ABI/INFORM Global, p. 42.

"Web Sites Let Automotive Consumers Arm Themselves with Price Information", Orange County Register, Nov. 14, 1997, pp. 3.

"Yahoo! Autos Provides Enhanced Road Map for Researching, Buying and Selling Cars Online", PR Newswire, Oct. 13, 1998, pp. 2.

Greenlight.com Teams up With Credit Online to Expand Online Financing Options, Published in PR Newswire Association LLC; New York; Aug. 28, 2000 extracted from Dialog on Jun. 14, 2021, pp. 3.

"The Most Reliable Cars 2006", https://www.forbes.com/2006/04/20/reliable-vehicles-japanese_cx_dl_0424feat%20html?sh=19b3172a48f3, Apr. 24, 2006, pp. 4.

| LeaseMaturityDate | OwnerZipCode | OwnerZipFour | VehicleMakeFriendly | VehicleType | VehicleSegment | Total | VehicleModel | VehicleManufacturer | ZIPZIP4 |
|---|---|---|---|---|---|---|---|---|---|
| Feb 2019 | 00727 | 6XXX | TOYOTA | T | VAN - MINI | 1 | S | TOYOTA | 007276XXX |
| Apr 2019 | 00730 | 2XXX | MINI | C | SPORT CAR - TOURING | 1 | CC | BMW | 007302XXX |
| Jan 2019 | 00791 | 6XXX | NISSAN | T | CUV - ENTRY LEVEL | 1 | J | NISSAN | 007916XXX |
| Jun 2019 | 00801 | 3XXX | NISSAN | C | SMALL CAR - ECONOMY | 1 | S | NISSAN | 008013XXX |
| Nov 2017 | 00913 | 4XXX | MITSUBISHI | C | SMALL CAR - ECONOMY | 1 | L | MITSUBISHI | 009134XXX |
| Apr 2017 | 01001 | - | FORD | C | MID RANGE CAR - PREMIUM | 1 | T | FORD | 01001- |
| Aug 2017 | 01001 | - | HONDA | T | CUV - ENTRY LEVEL | 1 | CRV | HONDA | 01001- |
| Mar 2018 | 01001 | - | CHEVROLET | T | CUV - ENTRY LEVEL | 1 | E | GENERAL MOTORS | 01001- |
| Oct 2019 | 01001 | - | HONDA | C | MID RANGE CAR - STANDARD | 1 | A | HONDA | 01001- |
| Sep 2018 | 01001 | 0XXX | LEXUS | C | UPSCALE - LUXURY | 1 | 350 | TOYOTA | 010010XXX |

| ZIP | ZIP4 | ZIPZIP4 | RURAL_URBAN | LUID | NAME | F_NAME | L_NAME | ADDR1 | ADDR2 | CITY | STATE | STATE_CD | CNTY_CODE | BLOCK_GRP |
|---|---|---|---|---|---|---|---|---|---|---|---|---|---|---|
| 01001 | 0626 | 010010626 | 2 | XXXXX00049 | | | | | | AGAWAM | MA | 25 | 013 | 8132093 |
| 01001 | 0616 | 010010616 | 2 | XXXXX00531 | | | | | | AGAWAM | MA | 25 | 013 | 8132093 |
| 01001 | 0425 | 010010425 | 2 | XXXXX00701 | | | | | | AGAWAM | MA | 25 | 013 | 8132093 |
| 01001 | 0028 | 010010028 | 2 | XXXXX02354 | | | | | | AGAWAM | MA | 25 | 013 | 8132093 |
| 01001 | 0111 | 010010111 | 2 | XXXXX02697 | | | | | | AGAWAM | MA | 25 | 013 | 8132093 |
| 01001 | 0219 | 010010219 | 2 | XXXXX03098 | | | | | | AGAWAM | MA | 25 | 013 | 8132093 |
| 01001 | 0129 | 010010129 | 2 | XXXXX04354 | | | | | | AGAWAM | MA | 25 | 013 | 8132093 |
| 01001 | 0323 | 010010323 | 2 | XXXXX04700 | | | | | | AGAWAM | MA | 25 | 013 | 8132093 |
| 01001 | 0160 | 010010160 | 2 | XXXXX55352 | | | | | | AGAWAM | MA | 25 | 013 | 8132093 |
| 01001 | 0206 | 010010206 | 2 | XXXXX93453 | | | | | | AGAWAM | MA | 25 | 013 | 8132093 |

FIG. 7

Vehicle and Household Metrics

Targeted Households
Historical Purchase Rate
Estimated Sales

Conquest Rate
Gross Per Sale
Marketing $/HH
Other

Financials

Total Gross Profit
Marketing Cost
Model Build Cost
Other Costs
Yearly Program Cost Return on Investment

DATABASE SYSTEM FOR DYNAMICALLY GENERATING CUSTOMIZED MODELS

CROSS-REFERENCE TO RELATED APPLICATIONS

This application is a continuation of U.S. patent application Ser. No. 16/246,036, filed Jan. 11, 2019, entitled DATABASE SYSTEM FOR DYNAMICALLY GENERATING CUSTOMIZED MODELS, which is a continuation-in-part of U.S. patent application Ser. No. 15/914,983, filed Mar. 7, 2018, entitled DATABASE SYSTEM FOR DYNAMICALLY GENERATING CUSTOMIZED MODELS. Each of these applications is hereby incorporated by reference herein in its entirety.

TECHNICAL FIELD

Embodiments of the present disclosure relate to data processing, including database and file management, as well as a database system for accessing one or more databases or other data structures.

BACKGROUND OF THE DISCLOSURE

Electronic databases provide for storage and retrieval of digital data records. Data records in such databases may be electronically updated.

SUMMARY OF THE DISCLOSURE

The systems, methods, and devices described herein each have several aspects, no single one of which is solely responsible for its desirable attributes. Without limiting the scope of this disclosure, several non-limiting features will now be described briefly.

Embodiments of the present disclosure relate to a database system (also herein referred to as "the system") for merging data from discrete sources, and changing data sets and dynamically generating customized models based on the merged data.

In one embodiment, a data processing system for accessing databases and updated data items is disclosed. The data processing system may comprise a user database including a plurality of user records relating to demographics or marketing preferences of a population including vehicle owners. The data processing system may also comprise an event database including a plurality of event records relating to the vehicle owners and a hardware processor. The hardware processor may be configured to execute computer-executable instructions to receive, via an interactive user interface displayed on a user device, a first filter item regarding calculating a number of households for each of a plurality of geographic zones and generate a first database including a first plurality of records by identifying, in the plurality of event records, event records that include information regarding events experienced by the vehicle owners but not specific owner identifying information. The hardware processor may be also configured to execute computer-executable instructions in order to cause a first update to the user records of the user database to integrate event data from the generated first database into the demographics or marketing preferences data of the plurality of user records to create an updated plurality of user records and receive, via the interactive user interface displayed on the user device, a database filter item comprising one or more of a geographic area, a vehicle make, a vehicle model, or a time period. The hardware processor may be further configured to execute computer-executable instructions in order to generate a second database including a second plurality of records by extracting from the updated plurality of user records, a selected set of household level records of the updated plurality of user records matching to the database filter item and determine a first set of database metrics that correspond to the second plurality of records, the first set of database metrics comprising at least a comparison of a number of relevant household level records to a total number of household level records in the geographic area. The hardware processor may be also further configured to execute computer-executable instructions in order to generate a customized dynamic model configured to segregate the second plurality of records using the determined first set of database metrics and receive criteria of one or more selected metrics of the first set of database metrics to filter the second plurality of records. The hardware processor may be further also configured to execute computer-executable instructions in order to compare the segregated second plurality of records with the criteria to update the segregated second plurality of records to remove records that do not meet the criteria, creating a diminished second plurality of records that includes records that meet one or more of the first set of database metrics and cause a subsequent update to the diminished second plurality of records to integrate data from the event database into the diminished second plurality of records to create an updated diminished second plurality of records. Finally, the hardware processor may be configured to execute computer-executable instructions in order to, based on an identification of one or more records existing in the update diminished second plurality of records, update the interactive user interface to include information included in the updated diminished plurality of records.

In another embodiment, a computer implemented method for generating an event notification is disclosed. The method may comprise accessing, by a database system, a user database including a plurality of user records relating to demographics or marketing preferences of a population including vehicle owners and accessing, by the database system, an event database including a plurality of event records relating to the vehicle owners. The method may also comprise receiving, via an interactive user interface displayed on a user device, a first filter item regarding calculating a number of households for each of a plurality of geographic zones and generating a first database including a first plurality of records by identifying, in the plurality of event records, event records that include information regarding events experienced by the vehicle owners but not specific owner identifying information. The method may further comprise causing a first update to the user records of the user database to integrate event data from the generated first database into the demographics or marketing preferences data of the plurality of user records to create an updated plurality of user records and receiving, via the interactive user interface displayed on the user device, a database filter item comprising one or more of a geographic area, a vehicle make, a vehicle model, or a time period. The method may additionally comprise generating a second database including a second plurality of records by extracting from the updated plurality of user records, a selected set of household level records of the updated plurality of user records matching to the database filter item and determining a first set of database metrics that correspond to the second plurality of records, the first set of database metrics comprising at least a comparison of a number of relevant household level records to a total number of household level records in the geographic area. The method may further also comprise generating a customized dynamic model configured to segregate the second plurality of records using the determined first set of database metrics and receiving criteria of one or more selected metrics of the first set of database metrics to filter the second plurality of records. The method may also further comprise comparing the segregated second plurality of records with the criteria to update the segregated second plurality of records to remove records that do not meet the criteria, creating a diminished second plurality of records that includes records that meet one or more of the first set of database metrics and causing a subsequent update to the diminished second plurality of records to integrate data from the event database into the diminished second plurality of records to create an updated diminished second plurality of records. The method may also comprise, based on an identification of one or more records existing in the update diminished second plurality of records, update the interactive user interface to include information included in the updated diminished plurality of records.

In an additional embodiment, non-transitory, computer-readable storage media storing computer-executable instructions that, when executed by a computer system, configure the computer system to perform operations is disclosed. The operations may comprise accessing a user database including a plurality of user records relating to demographics or marketing preferences of a population including vehicle owners and accessing an event database including a plurality of event records relating to the vehicle owners. The operations may also comprise receiving, via an interactive user interface displayed on a user device, a first filter item regarding calculating a number of households for each of a plurality of geographic zones and generating a first database including a first plurality of records by identifying, in the plurality of event records, event records that include information regarding events experienced by the vehicle owners but not specific owner identifying information. The operations may further comprise causing a first update to the user records of the user database to integrate event data from the generated first database into the demographics or marketing preferences data of the plurality of user records to create an updated plurality of user records and receiving, via the interactive user interface displayed on the user device, a database filter item comprising one or more of a geographic area, a vehicle make, a vehicle model, or a time period. The operations may also additionally comprise generating a second database including a second plurality of records by extracting from the updated plurality of user records, a selected set of household level records of the updated plurality of user records matching to the database filter item and determining a first set of database metrics that correspond to the second plurality of records, the first set of database metrics comprising at least a comparison of a number of relevant household level records to a total number of household level records in the geographic area. The operations may further additionally comprise generating a customized dynamic model configured to segregate the second plurality of records using the determined first set of database metrics and receiving criteria of one or more selected metrics of the first set of database metrics to filter the second plurality of records. The operations may also further comprise comparing the segregated second plurality of records with the criteria to update the segregated second plurality of records to remove records that do not meet the criteria, creating a diminished second plurality of records that includes records that meet one or more of the first set of database metrics and causing a subsequent update to the diminished second plurality of records to integrate data from the event database into the diminished second plurality of records to create an updated diminished second plurality of records. The operations may further also comprise, based on an identification of one or more records existing in the update diminished second plurality of records, updating the interactive user interface to include information included in the updated diminished plurality of records.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to perform operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, computer readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

BRIEF DESCRIPTION OF THE DRAWINGS

The above-mentioned aspects, as well as other features, aspects, and advantages of the present technology will now be described in connection with various aspects, with reference to the accompanying drawings. The illustrated aspects, however, are merely examples and are not intended to be limiting. Throughout the drawings, similar symbols typically identify similar components, unless context dictates otherwise. Note that the relative dimensions of the following figures may not be drawn to scale. The following drawings and the associated descriptions are provided to illustrate embodiments of the present disclosure and do not limit the scope of the claims. Moreover, the relative dimensions of the following figures may not be drawn to scale.

The figures depicted herein and the corresponding descriptions may utilize examples involving dealers, vehicles, and corresponding entities and items. However, these entities and items may be replaced with any saleable consumer good or item.

FIG. 6 is an example of a portion of data stored in a lease file, in accordance with an exemplary embodiment.

FIG. 7 is an example of a portion of data stored in a marketing database, in accordance with an exemplary embodiment.

FIG. 10 is an example of a calculated breakdown of vehicle and household metrics, in accordance with an exemplary embodiment.

DETAILED DESCRIPTION OF EMBODIMENTS

Figure 1:
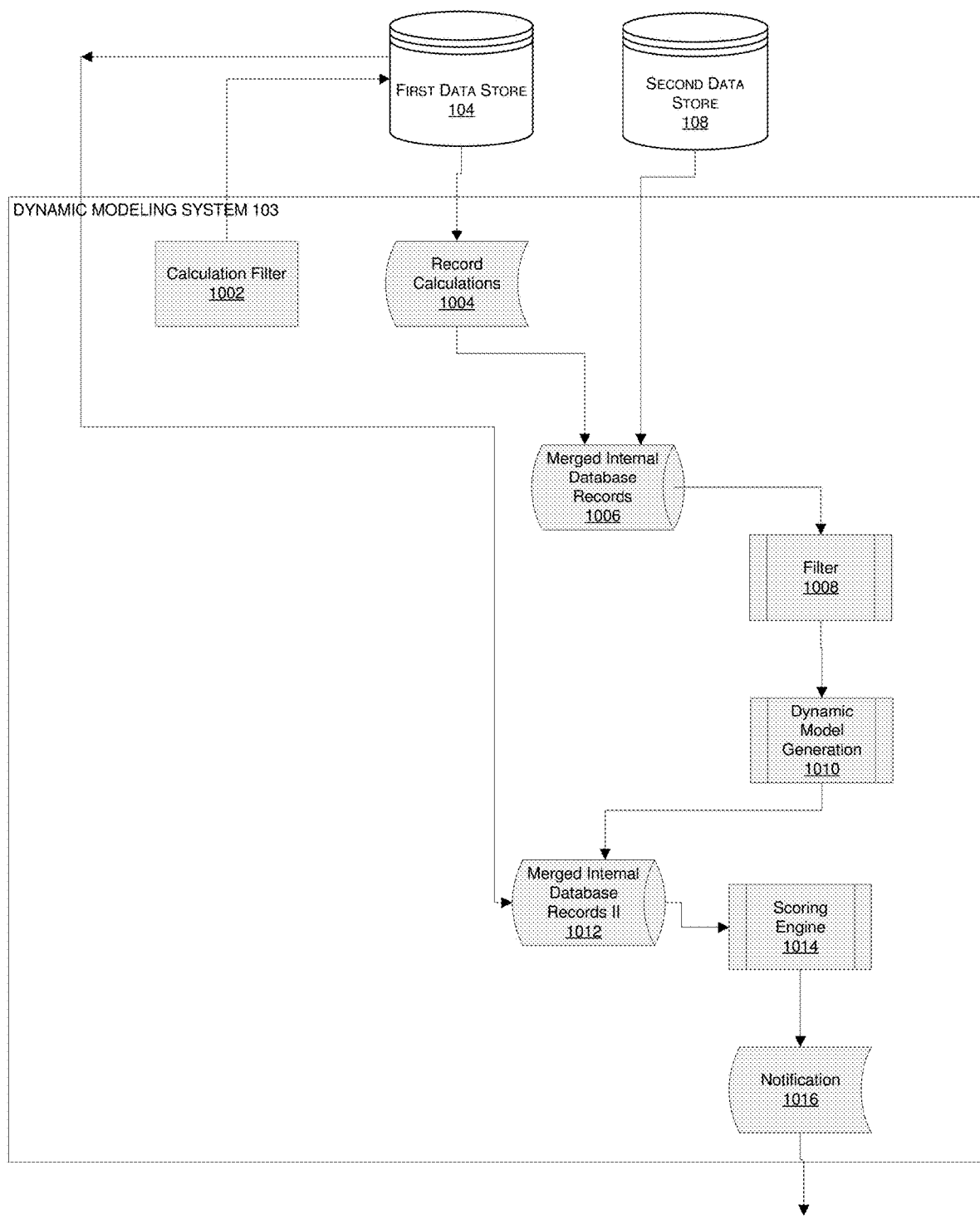
FIG. 1 is a block or data flow diagram of a database system for providing electronic notifications regarding database records, according to an embodiment.

Although certain embodiments and examples are disclosed below, inventive subject matter extends beyond the specifically disclosed embodiments to other alternative embodiments and/or uses and to modifications and equivalents thereof. Thus, the scope of the application is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

Embodiments of the present disclosure relate to a database system (also herein referred to as "the system") for integrating data from remote, disparate database systems and dynamically generating customized models to provide electronic notifications (also referred to herein as "notifications" or "alerts") to third party systems based on dynamically received requirements and updated information and data. Subsets of the data from the disparate database systems may be processed, updated, merged, and filtered to match the dynamically received requirements and criteria. In addition, geographic filters may also be applied to aggregate the merged subsets of data into data sets which can be used to dynamically generate the customized models without over-utilizing too much processing power or memory storage, which may occur when datasets are used at too granular or too high a level. The aggregation of the merged subsets of data may also assist with improving accuracy levels which can also decline when datasets are used at too granular or too high a level.

Embodiments of the present disclosure also allow the system to conduct such processing, merging, filtering, and aggregation in a time efficient manner as the data from one or more of the disparate database systems may be changing and/or the dynamically received requirements may be different for each request.

The dynamically generated, customized models may rely upon on data feeds from one or more of a plurality of databases, where one or more databases of the plurality of databases includes different data and/or data in different formats that may not be simply combined with data from one or more other databases. The dynamically generated, customized models may utilize various rules for accessing, acquiring, processing, and generating outputs based on the plurality of databases. Accessing, acquiring, and processing the data may comprise, for example, aggregating, filtering, merging, comparing, and/or refining the data in the databases as well as the automatic generation of new data files and/or internal or external databases. Based on the information in the internal databases, other databases may be searched for records and the records from the other databases may be compared and/or combined with the information in the internal databases. By comparing records from the other databases, information that is only available in one of the databases may be identified and associated with information from other databases.

Embodiments of the present disclosure address the highly technical problem of integrating large, disparate data sets, which are constantly being updated as well as the problem of matching records among the different data sets without overconsuming too many processing or memory resources while still maintaining a level of matching accuracy. In addition, embodiments of the present disclosure address the highly technical problem of addressing the differences among various geographical regions represented within the large disparate data sets such that the matching in one geographical region is different from the matching in another geographical region or even overlapping geographical regions.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Terms

In order to facilitate an understanding of the systems and methods discussed herein, a number of terms are described below. The terms described below, as well as other terms used herein, should be construed broadly to include the described information, the ordinary and customary meaning of the terms, and/or any other implied meaning for the respective terms. Thus, the descriptions below do not limit the meaning of these terms, but only provide exemplary descriptions.

Data Store: Includes any computer readable storage medium and/or device (or collection of data storage mediums and/or devices). Examples of data stores include, but are not limited to, optical disks (for example, CD-ROM, DVD-ROM, and so forth), magnetic disks (for example, hard disks, floppy disks, and so forth), memory circuits (for example, solid state drives, random-access memory ("RAM"), and so forth), and/or the like. Another example of a data store is a hosted storage environment that includes a collection of physical data storage devices that may be remotely accessible and may be rapidly provisioned as needed (commonly referred to as "cloud" storage).

Database: Includes any data structure (and/or combinations of multiple data structures) for storing and/or organizing data, including, but not limited to, relational databases (for example, Oracle databases, MySQL databases, and so forth), non-relational databases (for example, NoSQL databases, and so forth), in-memory databases, spreadsheets, as comma separated values ("CSV") files, eXtendible markup language ("XML") files, TeXT ("TXT") files, flat files, spreadsheet files, and/or any other widely used or proprietary format for data storage. Databases are typically stored in one or more data stores. Accordingly, each database referred to herein (for example, in the description herein and/or the figures of the present application) is to be understood as being stored in one or more data stores.

Database Record and/or Record: Includes one or more related data items stored in a database. The one or more related data items making up a record may be related in the database by a common key value and/or common index value, for example.

Update Data Item and/or Update: Any data item that may be used to update a database record, in whole or in part. For example, an update data item may indicate that it is related to a corresponding database record. The system may compare the update data item to the corresponding database record, determine that the update data item indicates a change to one or more data items of the database record, and then update the database record as indicated by the update data item.

Event Notification, Notification, and/or Alert: Includes electronic notifications of a new record set or changes to one or more records of interest. Notifications may include information regarding the record change of interest, and may indicate, for example, to a user, an updated view of the data records. Notifications may be transmitted electronically, and may cause activation of one or more processes, as described herein.

User: Includes an entity that provides input to the system and/or an entity that utilizes a device to receive the event notification, notification or alert (for example, a user who is interested in receiving notifications upon the occurrence of the newly generated record set or changes to records of interest).

III. Example Operation of the System

FIG. 1 is one embodiment of a block or data flow diagram of a database system, referred to as a dynamic modeling system 103, for dynamically generating models for processing data sourced from various databases. In some implementations, one or more of the blocks of FIG. 1 may be optional, and/or blocks may be rearranged.

At 1002, the dynamic modeling system 103 accesses a calculation filter update data item. Such calculation filter update data item may include, for example, instructions to perform specific calculations on database records stored by the system in a first data store 104. Examples of such data items are described below. The system implements the calculation filter update data item on records in the first data store 104. For example, the system may query the first data store 104 for specific sets of data and perform calculations on the data to automatically generate a set of record calculations 1004.

In some embodiments, if the first data store 104 stores information about a population such that the calculation filter update data item may execute calculations on specific subsets of the population. For example, using an example use case for vehicle leasing, the first data store 104 may be a consumer demographics or marketing database that stores data on individual consumers as well as information on households and vehicles owned in the household. Further, a database record in such a first data store 104 may represent a person, and may include the person's name, address, city, county, state, country, and/or zip code. Further, the database record may be associated with a unique identifier (for example, a key value and/or index value). The system may determine that the calculation filter update data item includes instructions to perform a count of the number of people or households within a specific geographic area, such as, for example, number of households within an identified geographic area, zip code, zip code+4 area, city, county, state, set of 5 specific zip codes, set of zip codes that begin with digits XY, and so forth.

At 1004, the dynamic modeling system 103 generates and stores the record calculations, such as, for example, stores the calculations along with the corresponding geographic area indicator. In some embodiments, the data store includes one or more (or all) items included in the corresponding database record of the first data store 104. These calculations may be reprocessed as the data in the first data store 104 is updated and may be done, for example, on a daily, weekly, monthly, bi-monthly, bi-annually, annually, every 28 days, or on any other type of schedule. In some embodiments, the calculations may be reprocessed on demand or whenever a specific threshold of change has been detected (for example, 2% of the records have been updated, 0.8% of the certain fields of the records have been updated, and so forth). In some embodiments, the calculations maybe reprocessed as determined by the third party owner of the first data store 104.

Advantageously, storing the calculations and the corresponding geographic area indicators in the records calculation 1004 can speed up later processing by the system, such as, for example, the merging, analysis, dynamic generation of custom models, and/or scoring of one or more records. For example, as described below, by storing a count of the designated categories, such as, for example the households within a specific zip code, those records can be more quickly merged with other data sets that are organized at the zip code level.

The system may also include a second data store 108 which comprises a large set of data, which is stored differently from the data in the first data store 104. Using the example use case, the second data store 108 is a vehicle leasing data store, which comprises leased vehicle data, which has been extracted from an auto market database and then matched to third party data. In some embodiments, the vehicle leasing data store is generated by extracting data from an auto market database, which includes data sources such as state department motor vehicle data, manufacturer data, and so forth. The vehicle leasing data store extracts household-level records of vehicles that are coming off lease.

The extracted data may include, for example, vehicle make, vehicle type, vehicle model, vehicle manufacturer, as well as the vehicle owner location such as zip code and/or zip code+4 area. The extracted records are then matched to third party data to determine when that household's vehicle lease or loan is about to expire, such as, for example, the month and year, or the day, month, and year, or the quarter and year. The vehicle leasing data store may also include information on the vehicle segment of the vehicle, such as, for example, economy car, sports car, luxury car, and so forth. In some embodiments, the vehicle leasing data store does not include any owner-identifying information such as name, street address, or social security number, but instead only indicates that a vehicle within a household in a zip code+4 area is coming off lease at a certain date.

The second data store 108 may be updated, for example, on daily, weekly, monthly, bi-monthly, bi-annually, annually, every 28 days, or on any other type of schedule. In some embodiments, the second data store 108 may be updated on demand or whenever a specific threshold of change has been detected (for example, 2% of the records have been updated, 0.8% of the certain fields of the records have been updated, and so forth). In some embodiments, the calculations maybe reprocessed as determined by the third party owner of the second data store 108.

The dynamic modeling system 103 may then access a set of data from the second data store 108 and merge those records with the record calculations created in block 1004. In some embodiments, the merged internal database records 1006 are stored in a separate file from the first data store 104 and the second data store 108, whereas in other embodiments, the merged internal database records 1006 are stored in one or both of the first data store 104 and the second data store 108. In some embodiments, there may be some advantages to storing the merged internal database records 1006 in a separate file, such as for example, when the accessed set of data is a smaller data set in comparison to the complete set of records in the second data store or, as another example, when the merged internal database records 1006 are stored as a file or in a system that can be more readily read and accessed than the second data store 108. In some embodiments, the merged internal database records 1006 are stored locally within the dynamic modeling system 103, whereas in other embodiments, the merged internal database records 1006 are stored remotely from the dynamic modeling system 103, such as in an external database or in the second data store 108. If separate from the second data store 108, the merged internal database records 1006 may be processed by the dynamic modeling system 103 without having to further communicate with the first data store 104 or the second data store 108 to process the merged internal database records 1006.

Using the example use case, the second data store 108 may include vehicle leasing data that is provided at the household level such that a subset of that household data may be aggregated at a geographic level, such as the zip code level, and merged with the record calculations 1004 that may represent a count of the number of households within a specific zip code set to create merged internal database records 1006. The merged internal database records 1006 may then store data on each zip code set which indicates the number of households in each zip code as well as the households within those zip codes which have a vehicle lease that is about to expire.

The system may then apply a filter 1008 using a set of criteria which is stored in the dynamic modeling system 103 or accessed by the dynamic modeling system 103. The filter may be used to access a filtered subset of data from the merged internal database records 1006. In some embodiments, the subset of the data is stored as a separate database from the merged internal database records 1006, whereas in other embodiments, the filtered subset of the data is stored in a temporary memory location, such as RAM or buffer memory to be accessed for use in the dynamic model generation 1010.

In some embodiments, one or more criteria of the filter are based on user-provided criteria. For example, a user may utilize a computing device to interface with the dynamic modeling system 103 and request information on vehicles of a specific make and class and/or for drivers within a specific set of zip codes as well as data parameters. In addition, the user may provide other parameters, such as, for example, manufacturer options, model, vehicle class, luxury/non-luxury categorization, or other categorizations or options. For example, the user may also provide instruction to include "comparable" options, such as, for example, if the user indicated a Toyota Corolla, the system may also include Honda Civic as a "comparable option". The user may also provide instruction to include "upsell/cross-sell" options, such as, for example, if the user indicated a Toyota Corolla, the system may also include Toyota Prius as an "upsell/cross-sell" options even though they may not be considered comparable.

The dynamic modeling system 103 is able to dynamically receive such criteria in real-time and then access the filtered subset of the merged internal database records 1006 dynamically so that the filtered subset accounts for any newly updated criteria from the user. The dynamic modeling system 103 may also aggregate the filtered records from merged internal data base records 1006 to the selected user-provided criteria. Using the example use case, the filter may include criteria from a vehicle dealer requesting information about specific vehicle makes within certain zip codes where the leases are expected to end within a certain time period, for example, Lexus vehicles within zip codes 60119, 60134, 60175, and 60176 where the leases are ending in the next 6 months. After the dynamic modeling system 103 applies the filter, the data set now includes household information for the selected zip codes 60119, 60134, 60175, and 60176. The dynamic modeling system 103 may then aggregate the data using the selected criteria to provide overall calculations including, for example, the number of Lexus vehicle leases that are ending in the next six months in the four selected zip codes, the number of total vehicle leases that are ending in the next six months in the four selected zip codes, and the number of total households in each zip code in the four selected zip codes, and/or the number of target households in each zip code in the four selected zip codes.

The dynamic modeling system 103 may perform various counts, calculations, metrics, or other analyses of the filtered subset. As one example, the dynamic modeling system 103 may calculate an "off lease" rate by comparing the total number of households within the selected zip codes with the total number of households coming off a lease within the zip codes and which meet the vehicle criteria. In some embodiments, if there are any groups that have less than a certain number of households (for example, 4, 10, or 50) or groups that have an off-lease percentage greater than or equal to a certain number criteria (for example, 95%, 98%, or 100%), then the dynamic modeling system can combine groups within, for example, the same zip codes in order to increase the group size to at least the set number of householders and create an off-lease percentage that meets the percentage criteria.

In some embodiments, the dynamic modeling system 103 stores the aggregated household data at the geographic/parameter level such that a record is created for each geographical/parameter combination and the total number of households with a vehicle coming off lease that matches the set of parameters is calculated. Storing the data at this level helps improve the processing speed and memory allocation, which can be important for use when generating the models using this data.

In addition, the dynamic modeling system 103 may dynamically generate and apply a modeling algorithm that groups the filtered subset based on the filter criteria to determine a prediction or a likelihood estimation 1010. The dynamic modeling system 103 may utilize the filter criteria to generate the custom model. Using the example above, the dynamic modeling system 103 may take the filtered set of vehicle lease data for a specific set of zip codes (which includes the household count information and the off lease percentage) to dynamically generate a custom modeling algorithm that groups together households by optimizing their likelihood of coming off of a lease of certain models and makes within a specific time frame to generate a new model that calculates the likelihood of a specific household coming off lease in a given time frame. In some embodiments, the dynamic modeling system 103 sorts the geographical zones by the off lease percentages, and creates tiered groups of zones. For example, the tiered groups of zones maybe based on the off lease percentage where tier A may be zones with off lease percentage of >65% but <100%, tier B may be zones with an off lease percentage of >30% but <=65%, tier C may be zones with an off lease percentage of <=30%. In some embodiments, the dynamic modeling system 103 removes or flags zones that do not meet the acceptable tier levels or off lease percentages. In some embodiments, the lease percentages for the various tiers A, B, and C may be different values than those described explicitly above.

Depending on the embodiment, the dynamic modeling systems discussed herein may use various techniques for generating models, such as machine learning techniques that may include artificial intelligence such as neural networks, genetic algorithms, clustering, or the like. Machine learning may be performed using a training set of data. The training data may be used to generate the model that best characterizes a feature of interest using the training data. In some implementations, the class of features may be identified before training. In such instances, the model may be trained to provide outputs most closely resembling the target class of features. In some implementations, no prior knowledge may be available for training the data. In such instances, the model may discover new relationships for the provided training data. Such relationships may include similarities between data elements such as transactions or transaction categories as will be described in further detail below.

The dynamic modeling system 103 may also apply various rules to determine whether the data meets predetermined criteria or error levels. In some embodiments, the dynamic modeling system 103 removes, discards, or ignores data that does not meet such criteria or error levels. The remaining data may represent a working data set which can then be stored in a temporary memory location, such as RAM or buffer memory or in a permanent memory.

The dynamic modeling system 103 may then merge the working data set with data from the first data store 104 to generate merged internal database records II 1012. In some embodiments, the merged internal database records II 1012 are stored as a new database whereas in other embodiments, they are stored in or within the merged internal database records 1006. Using the example use case above, the dynamic modeling system 103 may merge the selected geographic groups with marketing data or with records from the first data store 104 to provide marketing information for the set of households in the selected zones or zip codes. In some embodiments, the marketing information is provided for all of the households in the selected zip codes, whereas in other embodiments, the marketing information is only provided for a subset of the households in the selected zip codes.

At 1014, the dynamic modeling system 103 may then generate a model score for each record and append the scores onto the records or groups of records. However, it is recognized that in other embodiments, scores are not included as the fact that record remains within the merged internal database records II 1012 indicates that the dynamically generated custom model has determined that they are a viable contact. Using the example above, the dynamic modeling system 103 may then append a score onto each record to indicate whether that specific record is in one of the selected geographic groups where some subset of the households within the group are likely coming off lease for the selected vehicle make(s). The scores may include tier indicators, an estimated accuracy rate, a number, an alphanumeric identifier, or any variety of scoring indicator.

At 1016, the dynamic modeling system 103 may also generate and may generate an output file on a periodic basis, for example daily, weekly, monthly, bimonthly, quarterly, semiannually, and so forth) and send a notification alert or notification package. The generated notification package or alert may comprise a digital and/or electronic message. The notification package may include an indication of the corresponding records from the merged internal database records II 1012 along with their corresponding scores, and any other data items from the corresponding record. In other embodiments, the notification package may be an indication to the user that user should access the dynamic modeling system 103 to review the records from the merged internal database records II 1012 and/or the scores. The notification may be sent to the user that provided the filter criteria, and/or to any other recipient indicated by the user or the notification package. Further, the notification package may be delivered by any appropriate mode. Using the example above, the dynamic modeling system 103 may send a notification package that comprises information on households that are most likely to be coming off lease as well as a score that indicated the relative likelihood. The notification package may indicate the households that are located within the better performing geographical areas. The notification package may include one or more of the following fields for each household: name, address, city, state, zip code+4, period coming off lease, score, and/or tier.

In some embodiments, the alert and/or notification is automatically transmitted to a device operated by the user associated with corresponding notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (for example, a browser, a mobile application, and so forth). For example, receipt of the alert and/or notification may automatically activate an application on the device, such as a messaging application (for example, SMS or MMS messaging application), a standalone application (for example, a vehicle dealership application or vehicle financing application used by a financial agency), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the system so that the user can log in to the system and view the alert and/or notification. Alternatively, the alert and/or notification may include a URL of a webpage (or other online information) associated with the alert and/or notification, such that when the device (for example, a mobile device) receives the alert, a browser (or other application) is automatically activated and the URL included in the alert and/or notification is accessed via the Internet.

In some implementations, the alert and/or notification may be automatically routed directly to an interactive user interface where it may be viewed and/or evaluated by a user. In another example, the alert and/or notification may be automatically routed directly to a printer device where it may be printed in a report for review by a user. In another example, the alert and/or notification may be automatically routed directly to an electronic work queue device such that information from the notification may automatically be displayed to a user, and optionally information from the notification may be automatically used, for example, to contact (for example, dial a phone number) persons represented in the notification. In a further example, the alert and/or notification may be automatically routed as input to an external system (for example, to be fed into a marketing campaign management system, a dealer management system, or a customer relationship management system).

In various implementations, filter criteria changes may be made continuously, in real-time or substantially real-time, and/or in batch. In various implementations, record changes may be evaluated continuously, in real-time or substantially real-time, and/or in batch. In various implementations, notification may be generated and/or sent continuously, in real-time or substantially real-time, and/or in batch.

In various implementations, the first data store 104, the second data store 108, the record calculations 1004, the merged internal database records 1006, the merged internal database records II 1012, and/or any combination of these databases or other databases and/or data storage devices of the system may be combined and/or separated into additional databases.

IV. Additional Example Implementations of the System

Figure 2A:
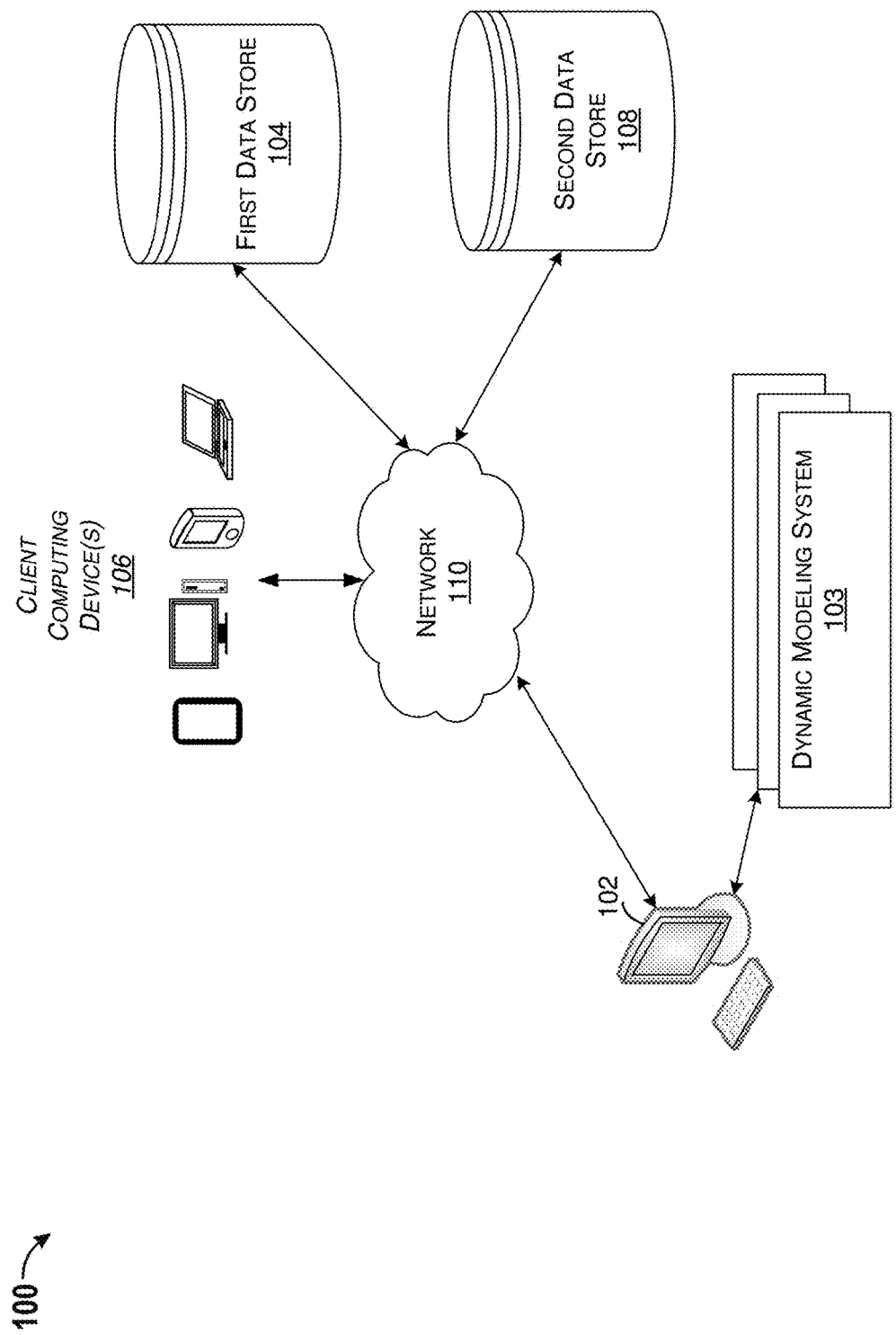
FIG. 2A illustrates one possible organization of a system that can dynamically generate models for identifying conditions based on information from a plurality of databases, in accordance with an exemplary embodiment.
Figure 2B:
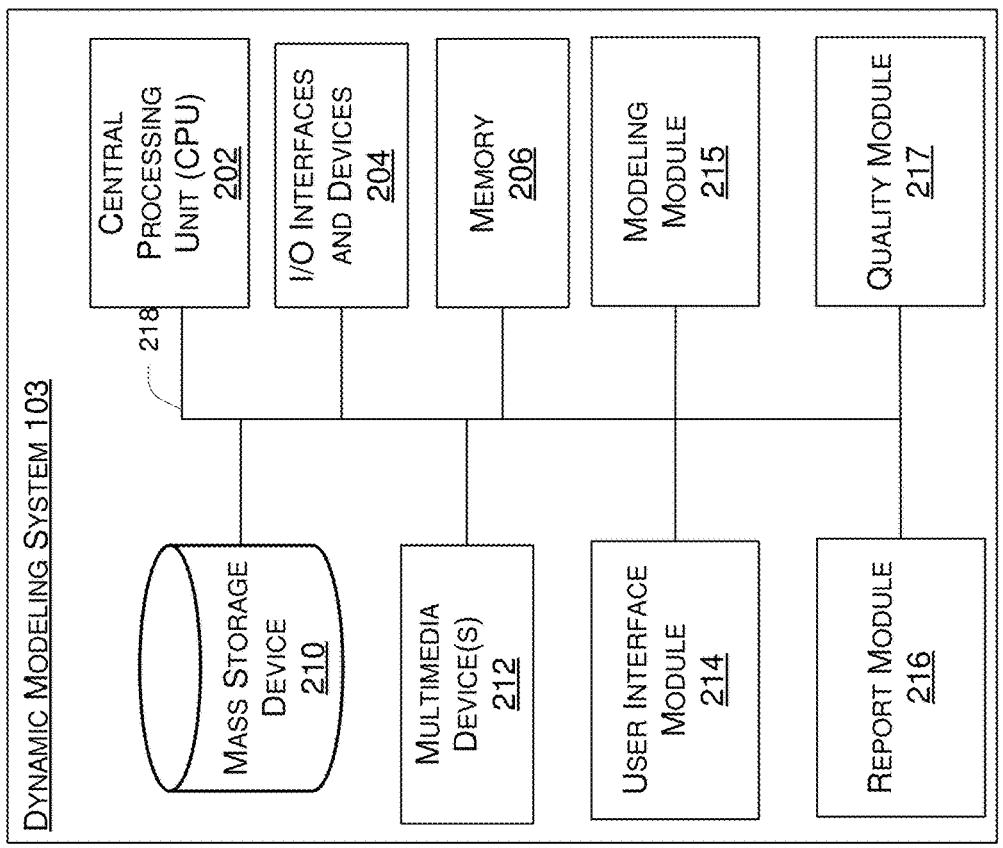
FIG. 2B is a block diagram corresponding to an aspect of a hardware and/or software component of an example embodiment of a device in the system of FIG. 2A.

FIGS. 2A and 2B illustrate embodiments of a dynamic modelling system 103 used to communicate with data stores in a system 100.

a. System Overview

FIG. 2A illustrates one embodiment of a system 100 that allows users to dynamically generate models for processing data sourced from various databases where the models can generate outputs (for example, reports, segments, and so forth) from the data based on dynamically changing requirements from users.

The system 100 of FIG. 2A comprises a dynamic modeling system 103 interfacing with a computing device 102, a first data store 104, a second data store 108, additional computing devices 106, and a network 110. Additionally, communication links are shown enabling communication among the components of system 100 via the network 110. The computing device 102 is shown communicatively coupled to the dynamic modeling system 103 in a localized manner (for example, via a local communication link), though the dynamic modeling system 103 may be integrated into the computing device 102 or visa versa, or may be accessible via the network 110. Furthermore, in some embodiments, one or more of the data stores described herein may be combined into a single data store that is local to the computing device 102 or remote from the computing device 102 or additional data stores not show may be integrated with the system 100. In some embodiments, two or more of the components described above may be integrated. In some embodiments, one or more of the components may be excluded from the system 100 or one or more components not shown in FIG. 1 may be included in the system 100. The system 100 may be used to implement systems and methods described herein.

In some embodiments, the network 110 may comprise any wired or wireless communication network by which data and/or information may be communicated between multiple electronic and/or computing devices. The wireless or wired communication network may be used to interconnect nearby devices or systems together, employing widely used networking protocols. The various aspects described herein may apply to any communication standard, such as a wireless 802.11 protocol. The computing device 102 may comprise any computing device configured to transmit and receive data and information via the network 110 for an entity. The entity may be an individual person, or an institution such as a business, a non-profit organization, an educational institution, an automobile dealer, a vehicle manufacture, a financial institution, and so forth. In some embodiments, the computing device 102 may include or have access to one or more databases (for example, the first data store 104 and the second data store 108) that include various records and information that may be used to generate customized outputs. In some embodiments, the computing device 102 may be accessible locally as well as remotely via the network 110. The computing device 102 may create the customized outputs based on events associated with potential clients (for example, historical data, vehicle, or life events described herein). These events (and corresponding information) may be used to dynamically generate models for when to predictively engage potential clients to provide better value to the potential client and improve likelihood of completing a transaction with the potential client.

The first data store 104 may comprise one or more databases or data stores and may also store data regarding any of the historical or current events. Using the example use case, the first data store 104 may comprising marketing data which includes name, contact information, zip code, as well as other demographic data and potentially other data items for a consumer. In some embodiments, the marketing database may provide data for households or consumers within particular geographic areas, as defined by the users via the one or more computing devices 106 or the computing device 102. For example, the marketing database may provide details regarding households in a geographic area defined by a zip code or zip code+4 identifier (sometimes referred to as a zip 9).

The computing devices 102, 106 may comprise any computing device configured to transmit and receive data and information via the network 110. In some embodiments, the computing device 106 may be configured to perform analysis of the transmitted and received data and information and/or perform one or more actions based on the performed analysis and/or the transmitted and received data and information. In some embodiments, the one or more computing devices 102, 106 may comprise mobile or stationary computing devices. In some embodiments, the computing device 102, 106 may be integrated into a single terminal or device. In some embodiments, when the computing device 102 is remote from the dealer, manufacturer, or other entity, the computing devices 106 may be used by users to access the network 110 and access the computing device 102 remotely.

The second data store 108 may also comprise one or more databases or data stores and may also store data regarding any of the historical or current events. In the example use case, the second data store 108 comprise a vehicle history database or other financial information source that may provide lease data, such as vehicle lease data, loan data, equity data, event data, etc., which indicates, by zip code or other geographic criteria, the number of households coming off lease, off loan, having equity, or experiencing events on specific dates or in time frames. For example, the lease, loan, equity, or event data may be organized based on or according to one or more of a vehicle's unique identifier (for example, a vehicle identification number, a license plate number, and so forth), personal information for an owner or lessee, and so forth. The lease data store may comprise records associated with the lease or ownership of vehicles included therein and may comprise records from state agency records, independent agency records, financial institutions, dealers and/or manufacturers, and the like. In some embodiments, the lease data store may comprise publicly available and/or "private sources. In some embodiments, the lease data store may provide a lease file that includes details regarding leases that are terminating or ending within a certain period of time. Alternatively, or additionally, the lease data store may provide a loan maturity or similar financing file that includes details of loans or other financing tools that are terminating or ending within the period of time.

The dynamic modeling system 103 may process data from the first data store 104 and the second data store 108 and also generate one or more models based on requests or inputs provided by users via the computing devices 106 and the computing device 102. The dynamic modeling system 103 may dynamically generate one or more models that are applied to data obtained from one or more of the first data store 104, the second data store 108, or the users (via the one or more computing devices 106). In some embodiments, the models may be generated dynamically by the dynamic modeling system 103 as the inputs and data change. For example, the dynamic modeling system 103 may generate changing models in real-time based on the inputs received from the user (for example, types of vehicles selected by the user for inclusion in generating the outputs, geography, time frames, and so forth). In some embodiments, the generated models themselves may be dynamically applied to the inputs and data. For example, the models generated by the dynamic modeling system 103 may create various metrics and data points based on the data sourced from the first and second data stores 104 and 108, respectively, and the users (for example, filters, geographic areas, and so forth). The models generated by the dynamic modeling system 103 may also be used to dynamically apply various rules or constraints to the generated and obtained data. For example, the models may dynamically apply one or more rules to confirm that the outputs being generated do not violate any predetermined requirements or standards on data mining, storage, and so forth. In some embodiments, the development of the model comprises identifying marketing characteristics, attributes, or segmentations that are statistically correlated (for example, a statistically significant correlation) with being more likely to meet a specific criteria. In some embodiments, the development of the model may include developing a set of heuristic rules, filters, and/or electronic data screens to determine and/or identify and/or predict which consumers would be considered more likely to be meet specific criteria based on current and/or historical data. In some embodiments, the dynamic modeling system 103 may automatically adjust the model to meet pre-selected levels of accuracy and/or efficiency.

In some embodiments, the dynamic modeling system 103 may be adaptive to data from the first data store 104, the second data store 108, or from users that is constantly changing. For example, the inputs received from the user (for example, via the user interface module 214 or the I/O interfaces and devices 204 in FIG. 2B) may be different for each user. Using an example use case, one user may be interested in a first set of zip codes along with Honda vehicles, whereas another user may be interested in a different set of zip codes along with BMW vehicles, whereas a third user may be interested in the same set of zip codes as the first user, but with Mercedes vehicles instead of Honda vehicles. Accordingly, the data obtained from the first and second data stores 104 and 108 using the filter criteria from the users, will likely be constantly changing. Thus, the processing and/or model generation will change for each user. Additionally, the data obtained from the first and second data stores 104 and 108 will likely change over time as records in the data stores are updated, replaced, and/or deleted. In the example use case, different users may request different periods of time, different vehicle makes, types, models, and so forth, different customers, and different geographic areas such that the lease and customer data stores are changing. Accordingly, the dynamic modeling system 103 may dynamically generate models to handle constantly changing data and requests.

Based on the user requests, as will be detailed herein, the data obtained from the first and second data stores 104 and 108, respectively, may be filtered to eliminate those records that are not desired. For example, in the example use case, records may be filtered to eliminate non-competitive vehicle makes, types, and so forth. However, while such filtering may reduce processing complexities, the reduced information also results in reduced efficiencies and accuracies, for example for a certain time period. Accordingly, the dynamic modeling system 103 and the dynamic models may balance when to apply filters to confirm the greatest accuracy in results while reducing unnecessary data processing.

In various embodiments, large amounts of data are automatically and dynamically calculated interactively in response to user inputs, and the calculated data is efficiently and compactly presented to a user by the system. Thus, in some embodiments, the data processing and generating of user interfaces described herein are more efficient as compared to previous data processing and user interfaces generation in which data and models are not dynamically updated and compactly and efficiently presented to the user in response to interactive inputs.

Further, as described herein, the system may be configured and/or designed to generate output data and/or information useable for rendering the various interactive user interfaces or reports as described. The output data may be used by the system, and/or another computer system, device, and/or software program (for example, a browser program), to render the interactive user interfaces or reports. The interactive user interfaces or reports may be displayed on, for example, electronic displays (including, for example, touch-enabled displays).

The various embodiments of interactive and dynamic data processing and output generation of the present disclosure are the result of significant research, development, improvement, iteration, and testing. This non-trivial development has resulted in the modeling and output generation described herein, which may provide significant efficiencies and advantages over previous systems. The interactive and dynamic modeling, user interfaces, and output generation include improved human-computer and computer-computer interactions that may provide reduced workloads, improved predictive analysis, and/or the like, for a user. For example, output generation via the interactive user interfaces described herein may provide an optimized display of time-varying report-related information and may enable a user to more quickly access, navigate, assess, and digest such information than previous systems.

In some embodiments, output data or reports may be presented in graphical representations, such as visual representations, such as charts, spreadsheets, and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, for example, forecast, future developments.

Further, the models, data processing, and interactive and dynamic user interfaces described herein are enabled by innovations in efficient data processing, modeling, interactions between the user interfaces, and underlying systems and components. For example, disclosed herein are improved methods of receiving user inputs, translation and delivery of those inputs to various system components, automatic and dynamic execution of complex processes in response to the input delivery, automatic data acquisition, automatic interaction among various components and processes of the system, and automatic and dynamic report generation and updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, for example, in memory databases) is limited in various ways (for example, manual data review is slow, costly, and less detailed; data is too voluminous; and so forth), and various embodiments of the disclosure provide significant improvements over such technology. Additionally, various embodiments of the present disclosure are inextricably tied to computer technology. In particular, various embodiments rely on detection of user inputs via graphical user interfaces, acquisition of data based on those inputs, modeling of data to generate dynamic outputs based on those user inputs, automatic processing of related electronic data, and presentation of output information via interactive graphical user interfaces or reports. Such features and others (for example, processing and analysis of large amounts of electronic data) are intimately tied to, and enabled by, computer technology, and would not exist except for computer technology. For example, the interactions with data sources and displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

b. Dynamic Modeling System

FIG. 2B is a block diagram corresponding to an aspect of a hardware and/or software component of an example embodiment of a dynamic modeling system 103 in the system 100 of FIG. 2A. The hardware and/or software components, as discussed below with reference to the block diagram 200 may be included in any of the devices of the system 100 (for example, the computing device 102, the computing devices 106, the dynamic modeling system 103, and so forth). These various depicted components may be used to implement the systems and methods described herein.

In some embodiments, certain modules described below, such as the modeling module 215, a user interface module 214, or a report module 216 included with the dynamic modeling system 103 may be included with, performed by, or distributed among different and/or multiple devices of the system 100. For example, certain user interface functionality described herein may be performed by the user interface module 214 of various devices such as the computing device 102 and/or the one or more computing devices 106.

In some embodiments, the various modules described herein may be implemented by either hardware or software. In an embodiment, various software modules included in the dynamic modeling system 103 may be stored on a component of the dynamic modeling system 103 itself (for example, a local memory 206 or a mass storage device 210), or on computer readable storage media or other component separate from the dynamic modeling system 103 and in communication with the dynamic modeling system 103 via the network 110 or other appropriate means.

The dynamic modeling system 103 may comprise, for example, a computer that is IBM, Macintosh, or Linux/Unix compatible or a server or workstation or a mobile computing device operating on any corresponding operating system. In some embodiments, the dynamic modeling system 103 interfaces with a smart phone, a personal digital assistant, a kiosk, a tablet, a smart watch, a car console, or a media player. In some embodiments, the dynamic modeling system 103 may comprise more than one of these devices. In some embodiments, the dynamic modeling system 103 includes one or more central processing units ("CPUs" or processors) 202, I/O interfaces and devices 204, memory 206, the dynamic modeling module 215, a mass storage device 210, a multimedia device 212, the user interface module 214, a report module 216, a quality module 217, and a bus 218.

The CPU 202 may control operation of the dynamic modeling system 103. The CPU 202 may also be referred to as a processor. The processor 202 may comprise or be a component of a processing system implemented with one or more processors. The one or more processors may be implemented with any combination of general-purpose microprocessors, microcontrollers, digital signal processors ("DSPs"), field programmable gate array ("FPGAs"), programmable logic devices ("PLDs"), controllers, state machines, gated logic, discrete hardware components, dedicated hardware finite state machines, or any other suitable entities that can perform calculations or other manipulations of information.

The I/O interface 204 may comprise a keypad, a microphone, a touchpad, a speaker, and/or a display, or any other commonly available input/output ("I/O") devices and interfaces. The I/O interface 204 may include any element or component that conveys information to the user of the dynamic modeling system 103 (for example, a requesting dealer, manufacturer, or other entity) and/or receives input from the user. In one embodiment, the I/O interface 204 includes one or more display devices, such as a monitor, that allows the visual presentation of data to the consumer. More particularly, the display device provides for the presentation of GUIs, application software data, websites, web apps, and multimedia presentations, for example.

In some embodiments, the I/O interface 204 may provide a communication interface to various external devices. For example, the dynamic modeling system 103 is electronically coupled to the network 110 (FIG. 2A), which comprises one or more of a LAN, WAN, and/or the Internet. Accordingly, the I/O interface 204 includes an interface allowing for communication with the network 110, for example, via a wired communication port, a wireless communication port, or combination thereof. The network 110 may allow various computing devices and/or other electronic devices to communicate with each other via wired or wireless communication links.

The memory 206, which includes one or both of read-only memory (ROM) and random access memory ("RAM"), may provide instructions and data to the processor 202. For example, data received via inputs received by one or more components of the dynamic modeling system 103 may be stored in the memory 206. A portion of the memory 206 may also include non-volatile random access memory ("NVRAM"). The processor 202 typically performs logical and arithmetic operations based on program instructions stored within the memory 206. The instructions in the memory 206 may be executable to implement the methods described herein. In some embodiments, the memory 206 may be configured as a database and may store information that is received via the user interface module 214 or the I/O interfaces and devices 204.

The dynamic modeling system 103 may also include the mass storage device 210 for storing software or information (for example, the generated models or data obtained to which the models are applied, and so forth. Software shall be construed broadly to mean any type of instructions, whether referred to as software, firmware, middleware, microcode, hardware description language, or otherwise. Instructions may include code (for example, in source code format, binary code format, executable code format, or any other suitable format of code). The instructions, when executed by the one or more processors, cause the processing system to perform the various functions described herein. Accordingly, the dynamic modeling system 103 may include, for example, hardware, firmware, and software, or any combination therein. The mass storage device 210 may comprise a hard drive, diskette, solid state drive, or optical media storage device. In some embodiments, the mass storage device may be structured such that the data stored therein is easily manipulated and parsed.

As shown in FIG. 2B, the dynamic modeling system 103 includes the modeling module 215. As described herein, the modeling module 215 may dynamically generate one or more models for processing data obtained from the data stores or the user. In some embodiments, the modeling module 215 may also apply the generated models to the data. In some embodiments, the one or more models may be stored in the mass storage device 210 or the memory 206. In some embodiments, the modeling module 215 may be stored in the mass storage device 210 or the memory 206 as executable software code that is executed by the processor 202. This, and other modules in the dynamic modeling system 103, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 2B, the dynamic modeling system 103 is configured to execute the modeling module 215 to perform the various methods and/or processes as described herein.

In some embodiments, the report module 216 may be configured to generate a report, notification, or output mentioned and further described herein. In some embodiments, the report module 216 may utilize information received from the dynamic modeling system 103, the data acquired from the data stores, and/or the computing device 102 or the user of the computing device 106 or the computing device 102 of FIG. 2A to generate the report, notification, or output for a specific dealer, manufacturer, or other entity. For example, the dynamic modeling system 103 may receive information that the dealer, manufacturer, or entity provides via the network 110 that the dynamic modeling system 103 uses to acquire information from the data stores and generate models for processing of the information. In some embodiments, the generated report, notification, or output may comprise a data file including names, addresses, contact information, and other pertinent financial information for potential clients expected to come off lease within a defined period of time. In some embodiments, the generated report, notification, or output may include a ranking or similar value for each potential client in the report or output, where the ranking or similar value corresponds to a confidence level that the corresponding potential client will be coming off lease during the defined period. In some embodiments, the report module 216 may include information received from the user in the generated report, notification, or output.

In some embodiments, the quality module 217 may verify a quality of the records or data included in the generated report or output. In some embodiments, the verification of the quality of record or data as performed by the quality module 217 may comprise identifying the ranking or corresponding value for each potential customer or records with a selected geographic group included in the generated report or output.

The dynamic modeling system 103 also includes the user interface module 214. In some embodiments, the user interface module 214 may also be stored in the mass storage device 210 as executable software code that is executed by the processor 202. In the embodiment shown in FIG. 2B, the dynamic modeling system 103 may be configured to execute the user interface module 214 to perform the various methods and/or processes as described herein.

The user interface module 214 may be configured to generate and/or operate user interfaces of various types. In some embodiments, the user interface module 214 constructs pages, applications or displays to be displayed in a web browser or computer/mobile application. In some embodiments, the user interface module 214 may provide an application or similar module for download and operation on the computing device 102 and/or the computing devices 106, through which the user may interface with the dynamic modeling system 103 to obtain the desired report or output. The pages or displays may, in some embodiments, be specific to a type of device, such as a mobile device or a desktop web browser, to maximize usability for the particular device. In some embodiments, the user interface module 214 may also interact with a client-side application, such as a mobile phone application, a standalone desktop application, or user communication accounts (for example, e-mail, SMS messaging, and so forth) and provide data as necessary to display vehicle equity and prequalification determinations.

For example, as described herein, the dynamic modeling system 103 may be accessible to the dealer, manufacturer, or entity via a website, which may include a banner ad or widget for hyper targeting and/or identification of potential clients within a geographic region that likely has a large percentage of consumers coming off lease within a particular time period. In some embodiments, the user may select or opt out of receiving any report or output.

Once the dynamic modeling system 103 receives the user inputs (for example, identified vehicle type, lease end period, and so forth), the user may view the received information via the I/O interfaces and devices 204 and/or the user interface module 214. Once the dynamic modeling system 103 receives the information from the data stores (for example, via the I/O interfaces and devices 204 or via the user interface module 214), the processor 202 or the modeling module 215 may store the received inputs and information in the memory 206 and/or the mass storage device 210. In some embodiments, the received information from the data stores may be parsed and/or manipulated by the processor 202 or the dynamic modeling system 103 (for example, filtered or similarly processed).

In some embodiments, the processor 202 or the modules 216 or 217, for example, may be configured to generate ratings or levels (for example, a numerical rating or level) for models generated by the modeling module 215. In some embodiments, the ratings or levels may correspond to a confidence level in the accuracy of the modeling or other data processing. For example, the rating or level may provide a relative ranking of a specific model or data versus other models or data. In some embodiments, the rating or level may provide an absolute rating or level. In some embodiments, when a rating or level of a model or data is higher than that of other models or data, the model or data with the higher rating has a higher confidence of being accurate.

The various components of the dynamic modeling system 103 may be coupled together by a bus system 218. The bus system 218 may include a data bus, for example, as well as a power bus, a control signal bus, and a status signal bus in addition to the data bus. In different embodiments, the bus could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of the dynamic modeling system 103 may be combined into fewer components and modules or further separated into additional components and modules than that shown in FIG. 2B.

V. Example Use Case—Vehicle Lease Data

The system 100 may be used in a variety of environments to perform database updates and to dynamically generate custom models. As one non-limiting example which is discussed above and herein, the system 100 may be used to process vehicle data, and specifically, vehicle lease data. Parties in vehicle sales (for example, dealers, manufacturers, lenders, and so forth) are always looking for new clients or customers. In some instances, the new clients may be people who are buying or leasing new vehicles. Some efforts for identifying potential clients may include sending pre-screening offers to invite or encourage customers to visit a dealership or browse an inventory for purchase or lease. Other efforts may involve reviewing records to identify customers who previously purchased a vehicle and who may be interested in purchasing in the near future.

However, such efforts may be expensive, inefficient, and time consuming (for example, taking up time consuming data processing and computations). Furthermore, the results of such efforts to identify potential clients may be unreliable with regard to efficacy of accurately identifying potential clients (for example, clients that will need a new vehicle soon), especially when particular details of the potential clients are desired. Records regarding details of particular leases may be available but may only include pieces of useful information that cannot be aggregated or analyzed with other details to generate useful customer information. For example, when trying to identify potential clients coming off lease, existing vehicle records and analysis may provide partial names of potential clients, terms of an existing lease or loan, current lease or loan status, and/or third party scores. However, these records and analysis may not include all details needed to be of value to the dealer. For example, such records may fail to provide a potential client's full name or address, details regarding the vehicle being leased or paid for, and so forth. Furthermore, there may not be any associations between the existing records, so the available information identified above may not be available for all the potential client's for whom existing records exist. For example, existing records may show that John have a vehicle coming off lease in May 2018 but not include any details regarding the vehicle type or monthly payment that John is currently paying or John's third party score. Similarly, records may provide details regarding Mary's third party score and monthly vehicle payment but not include any information regarding when Mary's lease or loan ends.

Further, even though there may be some data sources that have full information, there may be regulatory restrictions as to who may access those data sources and requirements that firm offers are given if such data sources (such as third party data bases) are accessed.

Thus, dealers and manufacturers that are generally interested in sales in a particular geographic area and/or of particular vehicle types, makes, or models may not be able to fully use the information from existing records and will be unable to target particular potential clients (for example, those within particular zip codes or coming off a lease for a particular vehicle type, make, or model). Records including such useful details may not currently exist and may not be generated with accuracy under current regulatory frameworks.

Records from other sources may also provide details regarding the potential clients, such as household information as well as events in the potential clients' lives (life, vehicle, third party, and so forth). These records may be analyzed individually and in combination with each other to generate predictive models. These other sources may not include the specific third party file data, but may not be subject to the third party regulations. Thus, these other sources may be used to generate models to apply to vehicle purchase and lease events and generate new insights. For example, such modeling may identify which geographic regions have a large percentage of consumers that are likely to be ready to lease or purchase a vehicle. The modeling may dynamically leverage data from various sources to apply predictive insights that increase revenue opportunities by generating customized sets of geographic regions (for example, 90211, zip codes XXXXX+YYYY and GGGGG+HHHH) that the dealers and manufacturers may want to target. However, there may be some constraints on how the data can be used. In addition, the data that is needed from the client events may not interface well with some of the vehicle data sources.

Recent trends show used and new vehicle registrations growing at ever slowing rates while lease registrations have steadily grown. Saturation signaled by the reduced growth in used and new vehicle registrations may suggest that future growth in used and new vehicles may require attracting customers from competitors and protecting existing market share for continued growth. The dynamic modeling described herein may allow for identification and/or targeting of particular geographic increased benefit for the dealer or manufacturer (for example, high likelihood to leave a competitor) without having to overtax the dealer or manufacturer's computing systems.

In some embodiments, such targeting may be generated based on third party events, vehicle events, or life events. Examples of third party events may include increases in third party scores, new trade lines, new third party inquiries, or third party events related to vehicle (for example, end of lease or financing terms, increase/decrease in equity, and so forth). Vehicle events may include insurance losses, major accidents or damage, title changes, thefts, recalls, and so forth. Life events may include address changes (for example, moves, home purchases, rentals, and so forth), birth of children, marriage, new jobs, graduation, birthdays, and so forth. Any of these events may be considered triggering events. Systems and methods may use such triggering events to identify potential targets, where a target is a potential client that is identified as someone likely to lease or purchase a vehicle (new or used) in a given geographic region within a given timeframe.

Thus, hyper targeting may create a customized output based on dynamic modeling applied to varying inputs. The inputs may include one or more of geographic regions, variable time periods, selected vehicle information (for example, make, model, type, and so forth), and third party, life, and/or vehicle events. Outputs may be further be scored or ranked based on expected accuracy.

VI. Generating Dynamic Models—Example Use Case—Vehicle Lease Data

Figure 3:
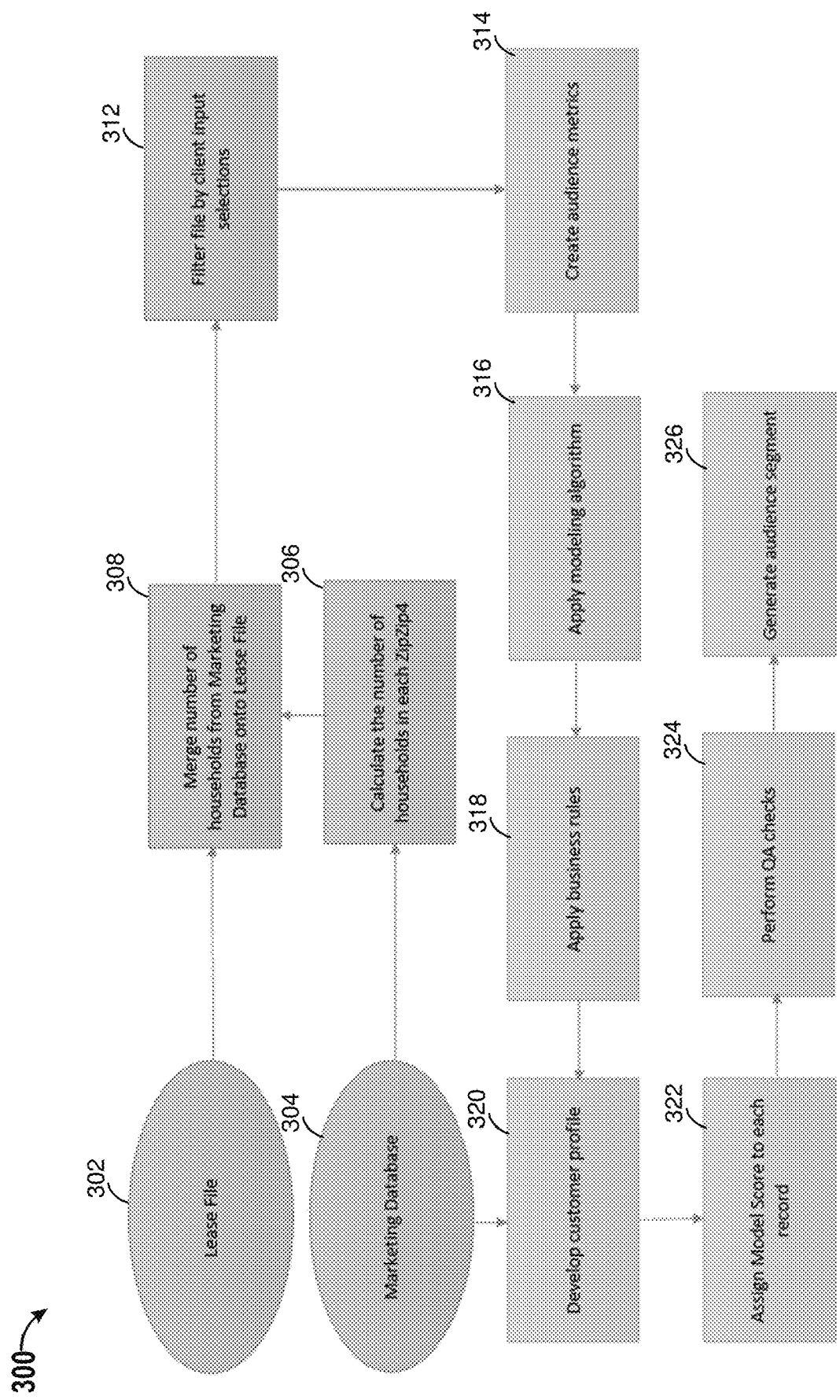
FIG. 3 is an example of one embodiment of a flowchart for processing information from multiple sources and generating dynamic models based on the data from the sources.

FIG. 3 is an example embodiment of a flowchart for a method, process, or data flow diagram 300. The method 300 includes various blocks used to process information from multiple sources and generating dynamic models based on the information from the multiple sources. Methods similar to method 300 may be run simultaneously, in an overlapping manner, or sequentially based on inputs or requests from multiple dealers, manufacturers, or other entities that are each accessing the dynamic modeling system 103 via one or more terminals 102 or computing devices 106. The various blocks of the method 300 may be performed by one or more components of the dynamic modeling system 103 as described in relation to FIG. 2B. For example, one or more blocks of the method 300 may be performed by one of the processor 202, the modeling module 215 (or one of the models generated by the dynamic modeling system 103), the data stores 104 and/or 108, the quality module 217, or the report module 216. In some embodiments, one or more of the blocks of the method 300 are implemented by one or more of the other components of the dynamic modeling system 103, as referenced in FIG. 2B. In some embodiments, the blocks of the method 300 are performed in a sequential manner, while in other embodiments, the blocks of the method 300 may be performed in a non-sequential manner, regardless of the terminology used to describe the method 300 herein. A person having ordinary skill in the art will appreciate that the method 300 may be implemented by other suitable devices and systems. Although the method 300 is described herein with reference to a particular order, in various aspects, blocks herein may be performed in a different order, or omitted, and additional blocks may be added.

As shown, the method 300 may comprise two data input or source blocks: at block 302, the method 300 comprises receiving, accessing, or generating a lease file and at block 304, the method 300 comprises receiving or accessing a marketing database. Each of these data input or source blocks will be described in further detail in relation to the method 300 below.

In some embodiments, the method 300 may begin at or include block 302, where the lease file is received or accessed. For example, obtaining or accessing the lease file may comprise reviewing or accessing one or more data files, database, or reports that include a listing of vehicle(s) expected to come off lease within a particular time period. Information used to generate the one or more reports of the lease file may include information from new vehicle databases (for example, new vehicle registration databases associated with state departments of motor vehicles ("DMVs") and/or from third party archives (for example, providing dates of entrance into leases, and so forth). For example, one or more fields may be extracted from the new vehicle database and used in conjunction with information from the third party archives to identify the parameters of the lease (for example, "lease term" and "lease maturity") for entries in the lease file. Accordingly, the lease file may be generated based on information received from one or more other databases. In some embodiments, the third party data is already included in the lease file and/or the new vehicle databases. In some embodiments, the lease file may include title state, vehicle information (for example, year, make, model, and so forth), lease term, and lease maturity date, among others. In some embodiments, the lease maturity date may be calculated based on a reporting period date (for example, a range of dates for which lease records are compiled and searched) and a lease term.

In some embodiments, the block 302 may be performed by one of the processor 202, the user interface module 214, the I/O interfaces and device 204, and so forth. In some embodiments, the lease file may comprise data from the lease data store 108 that relates to vehicles that are coming off lease within a period of time. In some embodiments, obtaining or accessing the lease file may comprise or be based on receiving an input or request from the user about target potential clients.

For example, the user may request a listing of households or people in a particular geographic area or region that are likely to have lease terms that are expiring within a particular time period. In some embodiments, the request may include details of the geographic area to be searched as well as the time period to search. In some embodiments, the request may also include additional information such as details of make, model, or type of vehicle that the households or people currently lease, which may be used for filtering. The request may also include a request for information for the households or people identified in the geographic area that has a strong likelihood of having consumers that may meet the requirements of the request. In some embodiments, as described herein, the user may comprise one or more of a dealer, manufacturer, or a related entity. Obtaining or generating the lease file may further comprise the dynamic modeling system 103 submitting a request to the lease data store based on the request received from the user. For example, the request to the lease data store may include the time period to be searched. In some embodiments, the request to the lease data store also includes the geographic area from which lease data is requested.

In response to the request to the lease data store, the dynamic modeling system 103 may receive lease data that includes details of one or more vehicles that are coming off lease in the identified time period. The details for each vehicle may include manufacturer information, model information, zip code information (potentially including zip code+4 information) and a quantity for that vehicle (or similar vehicles) that exists in that zip code. The received data from the lease data store may be used to generate a lease file that is further processed by the dynamic modeling system 103.

At block 304, a marketing database may be obtained or generated from data received from the marketing database. Similarly, block 304 may also be performed by one of the processor 202, the user interface module 214, the I/O interfaces and device 204, and so forth. In some embodiments, the marketing database may comprise data from the marketing database that relates to households or consumers within a geographic area or region. The marketing data available from the marketing database may include demographic data for every household in the United States. In some embodiments, obtaining or generating the marketing database may comprise or be based on receiving an input or request from the user about target potential clients. For example, the user may request the listing of households or people in a particular geographic area or region that are likely to have lease terms that are expiring within a particular time period, as discussed herein. Obtaining or generating the marketing database may further comprise the dynamic modeling system 103 submitting a request to the marketing database based on the request received from the user. For example, the request to the marketing database may include the time period to be searched. In some embodiments, the request to the marketing database also includes the geographic area from which lease data is requested.

In response to the request to the marketing database, the dynamic modeling system 103 may receive or access marketing data that includes address information, contact information, names, and zip code for households in the geographic area. The received data from the marketing database 104 may form the marketing database that is further processed by the dynamic modeling system 103.

At block 306, the dynamic modeling system 103 calculates a total number of households in each zip code+4. In some embodiments, the total number of households may be calculated based on the marketing database obtained, accessed, or generated by the dynamic modeling system 103. In other embodiments, other geographic sets could be uses such as zip code, a collection of zip codes, zip codes within a county, and so forth. The data from the marketing database may be summarized and otherwise aggregated based on geographical areas or regions to calculate the number of households in each geographical area or region.

At block 308, the dynamic modeling system 103 may merge data from the marketing database and data from the lease file. In some embodiments, this may involve merging the number of households calculated at block 306 into the lease file. The data may be merged so that the merged data file includes (for each geographic area) the number of households in the geographic area and the lease vehicle information in the geographic area. In some embodiments, the merging of these files and the calculation of the total number of households may be done on a regular basis, for example, quarterly, monthly, weekly, daily, hourly, and so forth or in some batch mode so that the merged data file is ready for when the user request is received. In other embodiment the merging and calculating may be done after receipt of the user request.

The various details from the user request may be identified. For example, one or more of the identified geographic area, makes, models, classes, and time period may be identified from the user request. At block 312, these criteria may be applied via, for example a filter, to the merged lease file and marketing database (for example, the merged data file) to filter the merged data file to only include data based on the user request (for example, only showing the requested makes, models, and so forth). By filtering the merged data file, the dynamic modeling system 103 may be able to focus on only data relevant to the user's specific request and reduces processing of unnecessary or worthless information.

At block 314, the dynamic modeling system 103 may create various audience metrics to provide to the user. For example, the dynamic modeling system 103 may calculate or create various metrics based on the merged data file. For example, the dynamic modeling system 103 may create off lease penetration metrics. Based on the merged data file (which includes the number of households in the geographic area coming off lease and the total number of households in the geographic area), the off lease penetration metrics may be calculated. For example, an off lease penetration rate may be calculated based on dividing the number of households coming off lease by the total number of households in the geographic area. As one example, the off lease percentage for each zip code+4 may be defined as the total number of vehicles coming off lease in that zip code+4 that match the user's criteria divided by the number of households in that zip+4.

The merged data file may be reviewed or processed by the dynamic modeling system 103 to confirm that each zip code+4 is only listed one time in the merged data file (for example, that there are no duplicates in the file). The dynamic modeling system 103 may also confirm a value indicating the total number of vehicles coming off lease is cumulative for each zip code+4 so that all vehicles coming off lease are carried through when records are merged or consolidated. In some embodiments, the dynamic modeling system 103 may apply an aggregation algorithm to form one or more zones to meet pre-defined criteria. For example, if one of the zip code+4 zones only includes 3 households when at least 4 households are required or desired, then the dynamic modeling system 103 may aggregate that zip code+4 zone with another zip code+4 zone, for example, selecting the second zip code+4 zone that gets the closest to the minimum 4 households. As another example, if there are any groups that have less than four households or an off-lease percentage greater than or equal to 100%, then the dynamic modeling system 103 may combine zip code+4 regions within the same zip code in order to increase the group size to at least 4 (or some other pre-defined criteria) and/or to create an off lease percentage that is less than 100% (or some other pre-defined criteria). After zip code+4 areas are combined, the device calculates new off lease percentages for each remaining group. The dynamic modeling system 103 may utilize best matching algorithms or other algorithms to match up and aggregate each of the zones that do not meet the criteria. When creating the groups, the dynamic modeling system 103 may calculate the number of households left in the merged data file that have not already been assigned to a group (for example, total number of households in the merged data file minus the cumulative number of households) and then continue with the grouping until all of households have been assigned to a group. In other embodiments, there may be one or more households or zones that are not assigned to a group.

The dynamic modeling system 103 may also calculate the number of vehicles coming off lease in the group, the number of households in the group, and the off-lease percentage within each group—the total number of vehicles coming off lease in the group divided by the total number of households in the group—which may be based on the user-identified criteria or overall based on the cumulative number of off lease households. Any or all of these metrics may be provided to the user (for example, the audience).

At block 316, the dynamic modeling system 103 may dynamically generate and apply custom models based on the user's criteria to determine groups of households by optimizing their likelihood of coming off lease in the time period. The models may be based on geographic areas and/or the calculated off lease rates. As one example, after the zones have been aggregated such that they comply with any rules or requirements from the user, the merged data file may then be sorted from high to low based on the calculated off lease percentage for each zone (or aggregated zone). Additionally, the dynamic modeling system 103 may generate other calculations such as, for example, a cumulative total number of households, a cumulative total number of vehicles coming off lease for each record in the merged data file, and/or the total number of households in the whole file and merge that total number back into every record on the file.

The groups may be sorted into various tiers, where the highest tier includes zones (or aggregated zones) within which the households are most likely to be coming off lease within the identified time period and where the lowest tier includes zones (or aggregated zones) within which the households are least likely to be coming off lease within the identified time period. The models may automatically make adjustments to the grouping.

At block 318, one or more rules may be applied to the models and generated groups to confirm that any data requirements are met as such the model may be adjusted or calibrated to comply with predefined criteria. For example, the dynamic modeling system 103 may confirm that each created group includes at least four households as identified by the marketing database and has an off lease rate of less than 100%. In some embodiments, the dynamic modeling system 103 may confirm that the groups have more or less households and may establish an off lease rate threshold of any other value. The groups may be created with a goal of maximizing or increasing the off-lease percentage within each group that is created.

At block 320, additional data from the marketing database may be merged into the merged data file for the identified households for one or more tiers of groups. For example, the marketing database may merge households or records identified in the top tiered group (for example, the group with the most households likely to be coming off lease in the time period) with corresponding information, and so forth, and may not be merged into the households or records in lower tiers. In other embodiments, the marketing database data may be merged for all records in all groups.

At block 322, the dynamic modeling system 103 may assign model scores to each record in the merged data file to indicate a likelihood that a specific record is going off lease for the specific criteria. The model score may be based on the assigned tier and/or the zone in which the record is related. In some embodiments, the model scores may also indicate a confidence level that the record is correct or accurate. In some embodiments, records may be removed or reorganized in the groups based on the model scores and/or confidence levels.

At block 324, the dynamic modeling system 103 performs quality checks on the records in the merged data file. The quality checks may confirm that only information meeting corresponding requirements is released to the user. The quality checks may also confirm that the records are appropriately grouped and that only records for the desired geographic area and for the identified makes, models, and time period, and so forth, are included in the records generated for the user.

In some embodiments, the quality checks may include verifying that there are no groups with off lease percentages greater than or equal to 100% and no groups with less than four households. An additional example quality check may include verifying a number of zip code+4 areas in the merged file is equal throughout the processing, that a total number of households is equal throughout the processing, and that a total number of vehicles coming off lease is equal throughout the processing.

At block 326, the dynamic modeling system 103 generates the output notification package (for example, an electronic report) for the user including one or more of the records and/or groups for the identified geographic region, vehicle information, tier information (for example, the tiered group), and the model score. In some embodiments, the electronic report may be automatically transmitted to the user once generated by the dynamic modeling system 103.

In some embodiments, the electronic report may be viewed by the user by accessing the electronic report via the dynamic modeling system 103. In some embodiments, the electronic report may be printed and electronically sent to the dynamic modeling system 103. Thus, the user may receive various information that can be used to target potential clients that are known (or known to be reasonably likely) to be coming off a lease in the desired time period.

VII. Geographic Regions—Example Use Case—Vehicle Data

Figure 4:
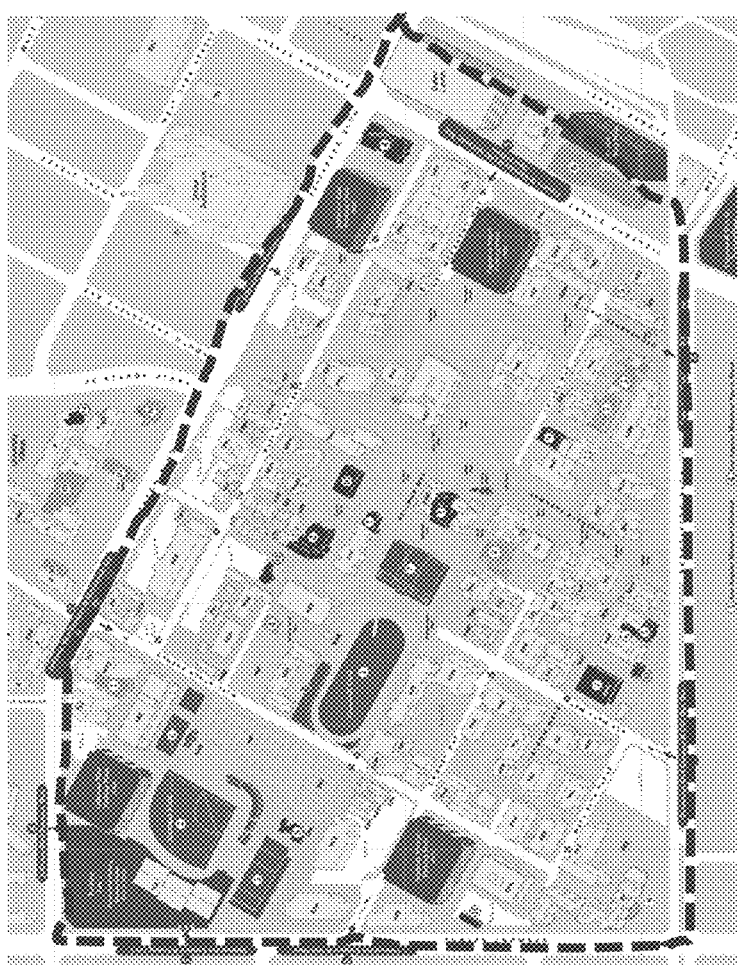
FIG. 4 is an example of a geographic area or region for which analysis is performed by the system of FIG. 2A, in accordance with an exemplary embodiment.

FIG. 4 is one embodiment showing a geographic area or region 400 for which analysis is performed by the system 100 of FIGS. 1 and 2A, in accordance with the example use case. In some embodiments, the geographic area 400 includes a boundary 402. The boundary 402 may identify a zip code+4 area in a larger zip code area shown in area 400. As described herein, the models and reports generated may be specific to an area such as that shown within the boundary 402.

VIII. Communication Flow Diagram—Use Case—Vehicle Data

Figure 5:
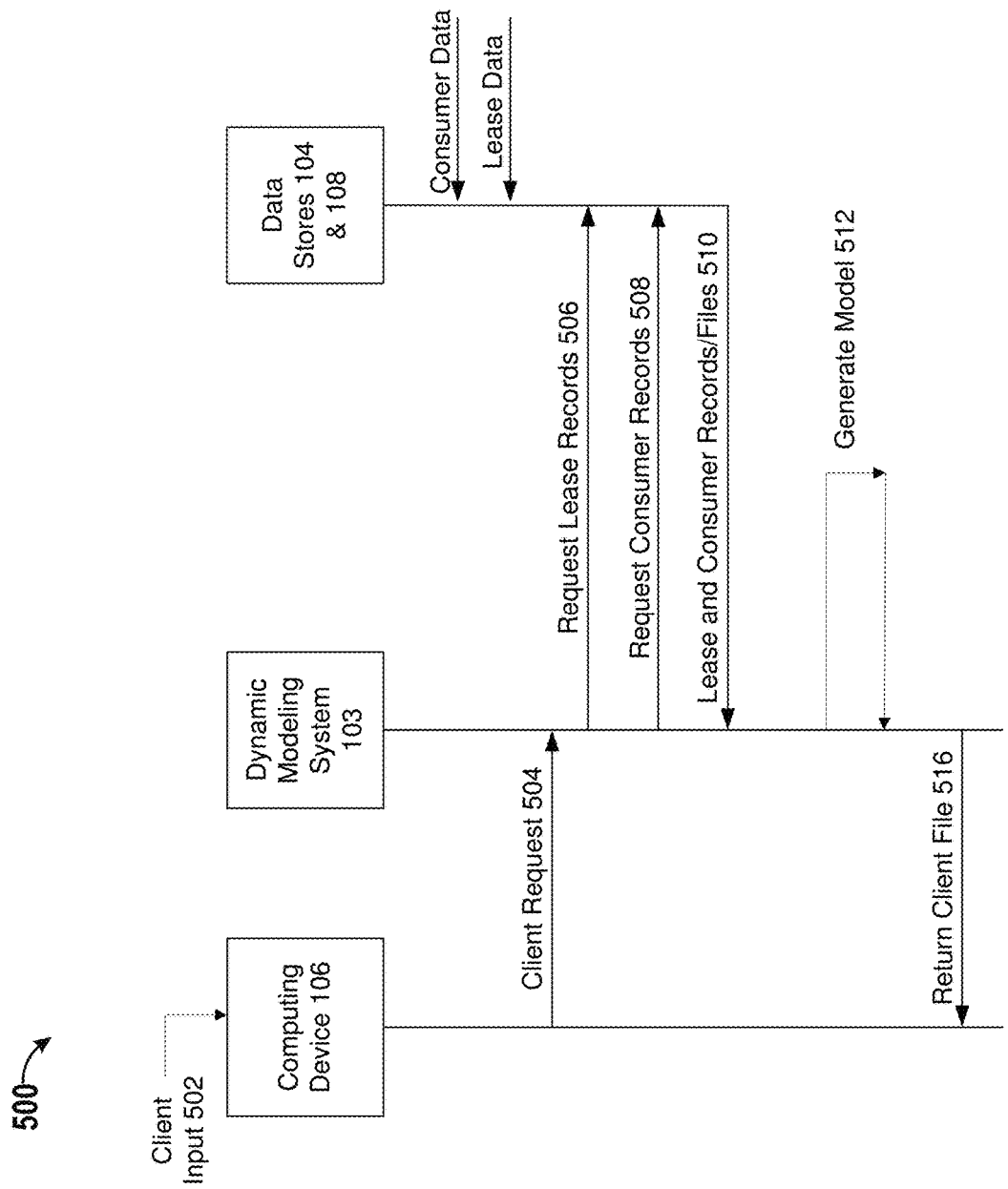
FIG. 5 is one embodiment of a communication flow diagram depicting communications passing between various components of the system of FIG. 2A for dynamically identifying conditions.

FIG. 5 is a one embodiment of communication flow diagram 500 depicting communications exchanged between various components of the system 100 of FIG. 2A under the example use case. The communication flow diagram 500 illustrates several components of the system 100. The diagram 500 includes the computing device 106, the data stores 104 and 108, and the dynamic modeling system 103. Though not shown, each of the computing device 106, the data stores 104 and 108, and the dynamic modeling system 103 may be coupled via a network (not shown), such as the network 110 of FIG. 2A. Accordingly, each of the depicted components may be configured to communicate over a network connection, for example.

In one embodiment, the computing device 106 is configured to receive a client input 502. Similarly, the data stores 104 and 108 may be configured to receive or obtain the lease file and/or the marketing file. In such a case, the computing device 106 may transmit/receive communications to/from the dynamic modeling system 103 via the network 110 and relay those communications from/to the client device (not shown). The data stores 104 and 108 may transmit/receive communications from/to the dynamic modeling system 103 via the network 110 and relay those communications from/to the sources of the marketing file and the lease file. Although the example shown in FIG. 5 includes only three described components, the present application is not so limited and FIG. 5 could alternatively include any number of components.

Initial signaling may be performed by the computing device 106 and the data stores 104 and 108 to obtain or receive the information described herein. In a subsequent action, the computing device 106 interprets the client input 502 as being a request to process information from multiple sources and generate dynamic models based on the information from the multiple sources (for example, identify a listing of vehicles coming off lease with corresponding marketing information). In view of the client input 502, the computing device 106 may transmit the client request 504 to the dynamic modeling system 103.

In response to the client request 504 received from the computing device 106, the dynamic modeling system 103 may generate a request for lease records 506 to the data store 104 requesting lease records or the lease file and a request for marketing records 508 to the data store 108 requesting marketing records or the marketing file. In some embodiments, where the client input 502 designates a geographic region in which the client is interested or concerned, such geographic information is also communicated over the network. The data stores 104 and 108 may provide the responses to the generated requests to the dynamic modeling system 103 in lease and marketing records/files 510.

The dynamic modeling system 103 then generates a model algorithm and then applies the model algorithm to generate a client file for communication back to the computing device 106, for example, via the communication 516.

IX. Data File—Example Use Case—Vehicle Data

FIG. 6 is an example of a portion of data stored in a lease file 600, in accordance with an exemplary embodiment of the example use case. As described herein, the lease file 600 may include entries with corresponding details. For example, the details may include a lease end (or lease maturity) date, owner zip code information, and vehicle information. The vehicle information may include vehicle make, vehicle type, vehicle segment, vehicle model, and vehicle manufacturer columns. An additional column may indicate a total number of vehicles with matching vehicle information and zip code information that come off lease at the specified lease maturity date. Accordingly, the data in the lease file 600 may provide for identifying a quantity of vehicles in a particular zip code(s) and having particular lease maturity date(s). In some embodiments, the lease file may not include specific user information to identify the user as such information may not be available and/or may not be permitted to be shared.

FIG. 7 is an example of a portion of data stored in a marketing file 700, in accordance with an exemplary embodiment. As described herein, the marketing file 700 may include entries with corresponding details. For example, the details may include location information (for example, zip code information), a location qualifier (for example, rural/urban geography), marketing name and address information, and classification information or codes. Accordingly, the data in the marketing file 700 may provide for identifying contact information for owners of vehicle that are coming off lease when the marketing file 700 is used in conjunction with the lease file 600.

X. User Interfaces—Example Use Case—Vehicle Data

Figure 8:
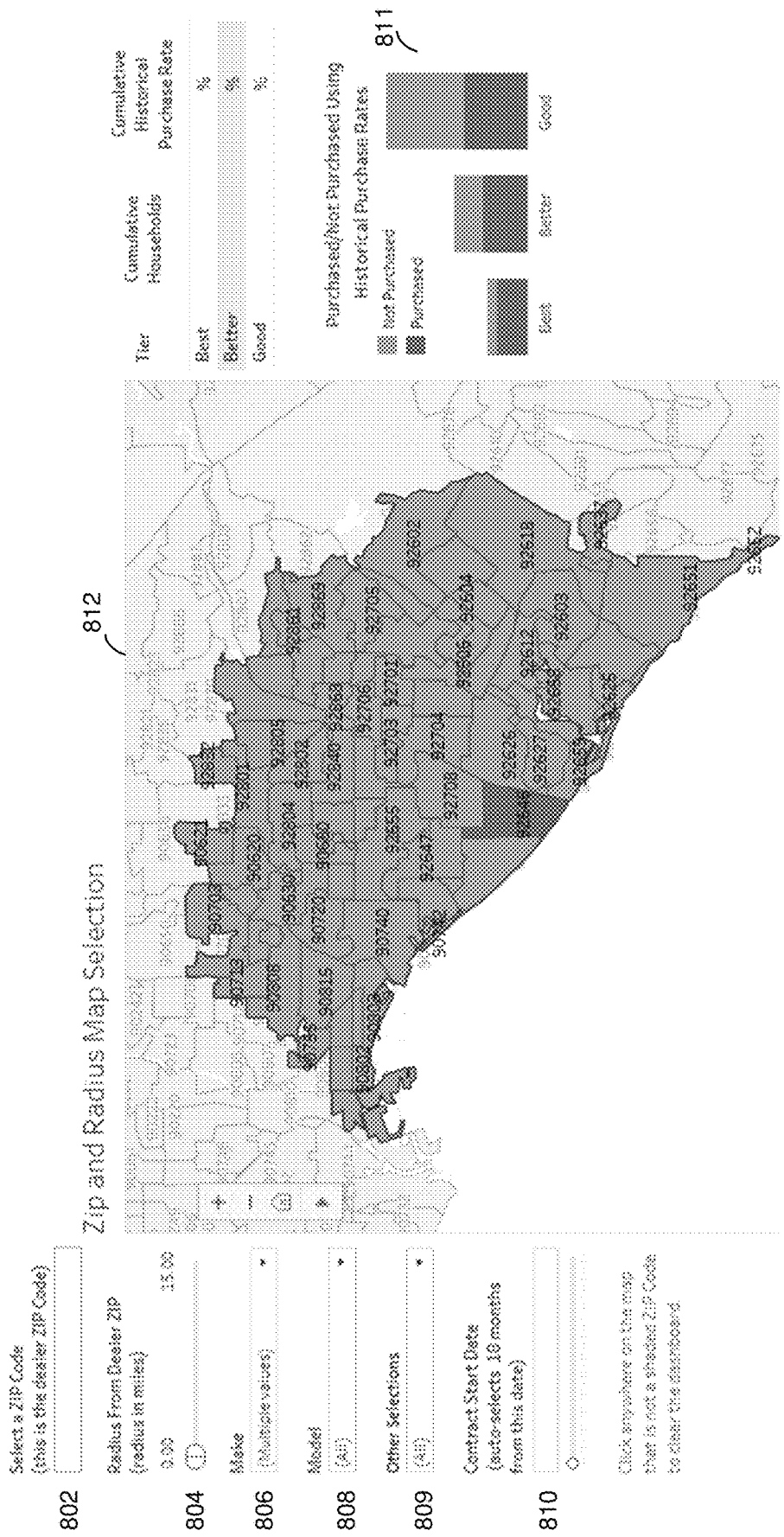
FIG. 8 is an example of a selection or initialization screen for an off lease tool usable by a user, in accordance with an exemplary embodiment.

FIG. 8 is an example of a selection or initialization screen 800 for an off-lease tool usable by a client for input selection, in accordance with an exemplary embodiment. The off-lease tool may provide the client with an ability to review records for vehicles that are coming off-lease in a particular geographic radius around a single dealer rooftop in a selected zip code, in a particular custom geographic territory for the single dealer rooftop, or in a particular geographic radius around multiple dealer rooftops in a selected zip code.

The example initialization screen 800 may include various values that are user customizable. A first value 802 may correspond with a zip code based on which the user wants the off-lease tool to generate a report of percentage of all vehicles likely coming off-lease. In some embodiments, the zip code selected by the user may be centrally located in a particular geographic region. For example, the value 802 may default to the zip code of the user (for example, of a dealer rooftop).

The example initialization screen 800 further includes a radius value 804. The radius value 804 may indicate a radius around the zip code value 802. In some embodiments, the radius value 804 may be, for example, in a range of 0 to 10 miles and may be user selectable with a manually entered value or with a slider bar to adjust the value. The range may instead be in a range of 0 to 20 miles or any other range. For example, the radius may be set at 3 miles or 5 miles or 10 miles.

The example initialization screen 800 also includes a selection 806 between searching by particular makes or by market segment. When the selection 806 indicates make, then the user may use a vehicle detail selection 808 (for example, a multiple selection drop down menu) to identify one or more vehicle makes which the user wants to use in the report generated by the off-lease tool. For example, the user may select one or more manufacturers (for example, Ford, GM, Lincoln, and so forth) that best fits the user market and dealer target audience (for example, competitors, and so forth). When the selection 806 indicates segment, then a particular segment of vehicles (for example, luxury, and so forth) may be selected, which may automatically identify or select particular vehicle makes and models to search for as coming off-lease.

The example initialization screen 800 also includes a selection 809 for "other selections." In some embodiments, the selection 809 may include additional criteria for historical review and comparison in the geographic area shown in the map 812. In some embodiments, this additional criteria may comprise monthly payment band percentages or other customer attributes. In some embodiments, the additional criteria selected in the selection 809 may be graphically shown, for example in the graphs 811. The graphs 811 may show relationships for the additional criteria of selection 809. The values for the graphs 811 may correspond to the good, better, and best tiers, where the sizes of the purchased vs. the not purchased graph indicators are representative historical purchase rates of the selected audience. For example, when the cumulative households values are 133, 209, and 458 for the best, better, and good values, respectively, the cumulative 2017 historical purchase rates may be 71%, 58%, and 41%, respectively. These values may correspond to the values shown in the graphs 811. For example, 71% of 133 may be the 94 purchased records as compared to 133 cumulative, 58% may be the 122 purchased records as compared to the 209 cumulative households, and 41% may be the 187 purchased records as compared to the total 458 cumulative households. The other portions of the graphs 811 include representations of the not purchased records as compared to the respective cumulative households. In the future, the selection 809 could be included as available filters, such as monthly payment band percentages and other customer attributes.

The example initialization screen 800 also includes a date 810 (for example, month and year) from which vehicles coming off-lease will be identified within an 18-month window. In some embodiments, the 18-month window may be user selectable or adjustable to any value less than or greater than 18-months (for example, between 6-months and 30-months).

A map 812 of the initialization screen 800 identifies zip codes that will be searched. For example, the zip code identified in zip code value 802 may be shaded with a first shade or pattern and positioned generally in a center of the map 812. The map 812 further identifies zip codes that fall within the radius value 804 around the zip code identified in the zip code value 802. For example, these identified zip codes that fall within the radius may be shaded with a second shade or pattern (or the first shade or pattern). In some embodiments, only zip codes that fall entirely within the radius value 804 may be shaded or identified. In some embodiments, any zip code that falls at least partially within the radius value 804 may be shaded or identified. In the map 812, the zip code 92646 may be the selected zip code value 802 and the shaded zip codes surrounding the 92646 zip code are the zip codes that will be searched households with for likely vehicles coming off-lease.

In some embodiments, the client may individually select (or hover over) each shaded zip code to see information specific to the selected zip code.

Figure 9:
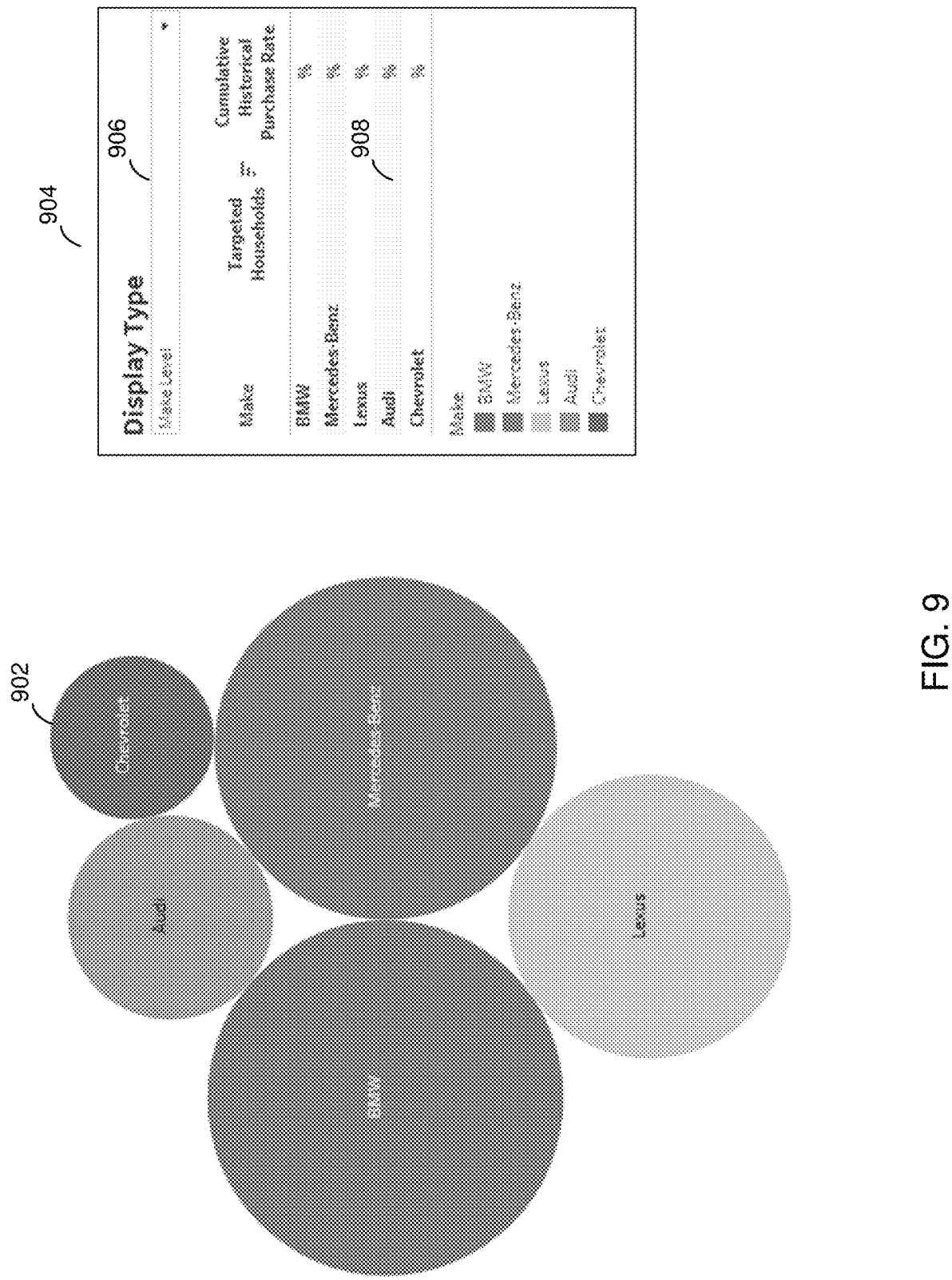
FIG. 9 is an example of a breakdown ranking or listing of a number of targeted households, identified by make, having a vehicle coming off lease in a specified geographic region from the off lease tool of FIG. 8, in accordance with an exemplary embodiment.

FIG. 9 is an example of a breakdown ranking or listing of a number of targeted households, identified by make, having a vehicle coming off lease in a specified geographic region from the off lease tool of FIG. 8, in accordance with an exemplary embodiment. FIG. 9 includes a graph 902 depicting a cumulative targeted households for various makes in a particular geographic area based on the selection of zip codes from the map 812. In some embodiments, the graph 902 may include various representations of values for comparison. The geographic area with which the graph 902 and chart 904 relate may be represented by the map 812.

The graph 902 may include, as shown, circles of varying sizes or areas, where the size or area of the circle is indicative of a corresponding values, where a larger size corresponds to a larger value and a smaller size corresponds to a smaller value. The chart 904 shows an example of a listing 908 of makes (as selected by selection 806) and corresponding target households and cumulative historical purchase rate values for the geographic area corresponding to zip codes and off lease information from a mapped area (for example, map 812). The chart 906 may show the indicated makes sorted by a number of target households or cumulative historical purchase rate for the mapped area of map 812. The chart 908 includes a column for the number of target households and a column for the cumulative historical purchase rate. This is one data visualization example. There are a multitude of ways to view the data based on the selected criteria(s). The selected criteria by selection 906 include, but are not limited to, household counts, historical purchase rates, purchase timing, vehicle segments, and so forth FIG. 10 is an embodiment of an ROI tool showing a calculated breakdown of vehicle and household metrics, in accordance with an exemplary embodiment. For example, the breakdown shows how the information presented in the map 812 and graph 902 and the charts 904 and 906 may be beneficial to the user. For example, the user can use the information presented in the breakdown to determine or estimate how much it would cost to contact all target households which would include likely reaching the households (or a subset) that have vehicles coming off lease in the zip codes identified in the chart 904. For example, with a number of target households identified in chart 904, when the client spends an amount contacting or marketing to each household, the total cost of contacting all households would be a product of the number of target households identified and the amount spent contacting or marketing to each household. Assuming a specific number of sales and a gross profit per sale, the user can determine a total gross expected profit of a product of the specific number of sales and the gross profit per sale. By deducting fees for the services for providing the information in the map 812 and graph 902 and charts 904 and 906, the client can determine a return on their investment (program costs, marketing costs, and so forth).

Figure 11A:
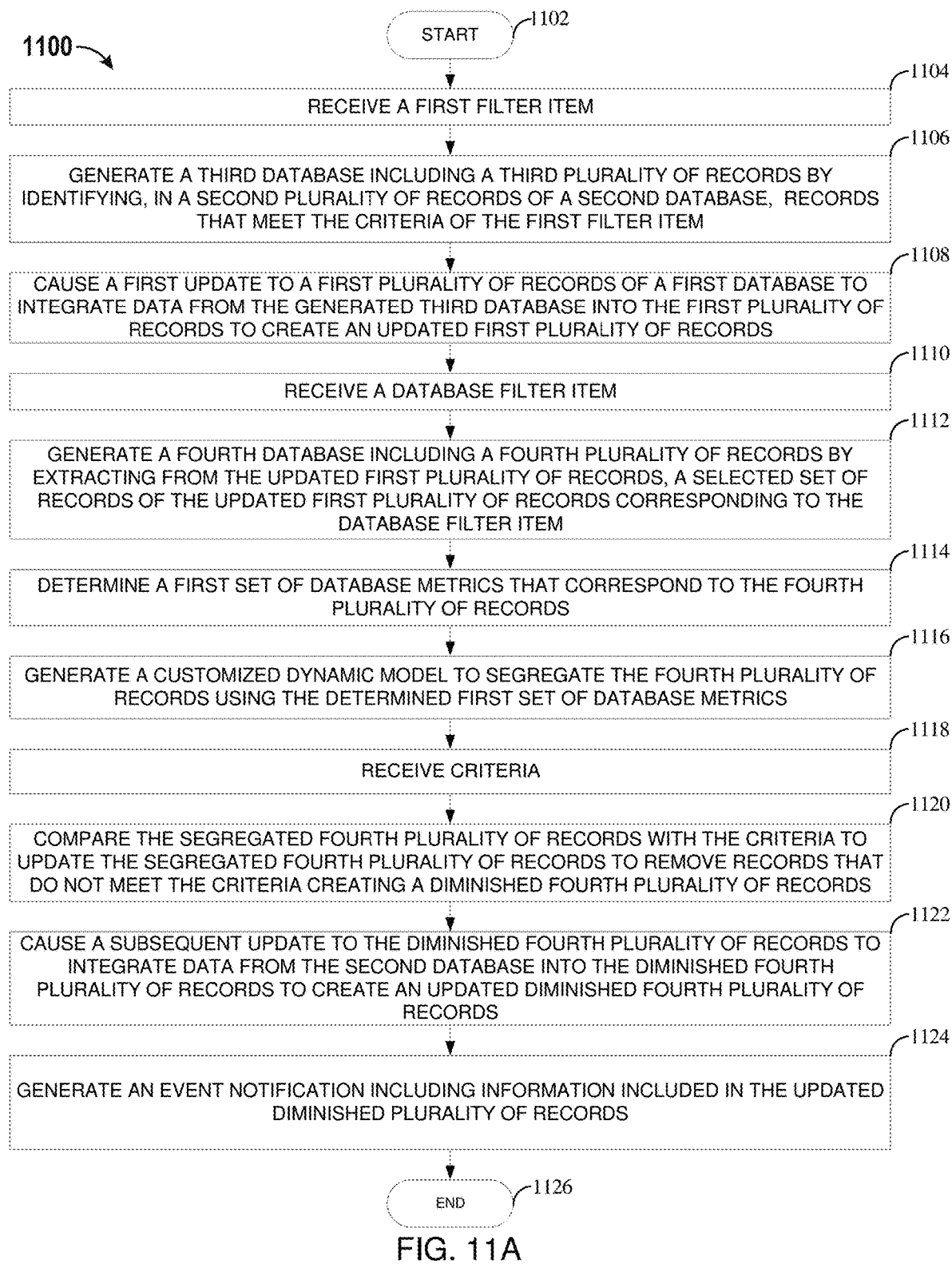
FIGS. 11A and 11B are flow charts for methods of processing data using dynamic models, in accordance with exemplary embodiments.
Figure 11B:
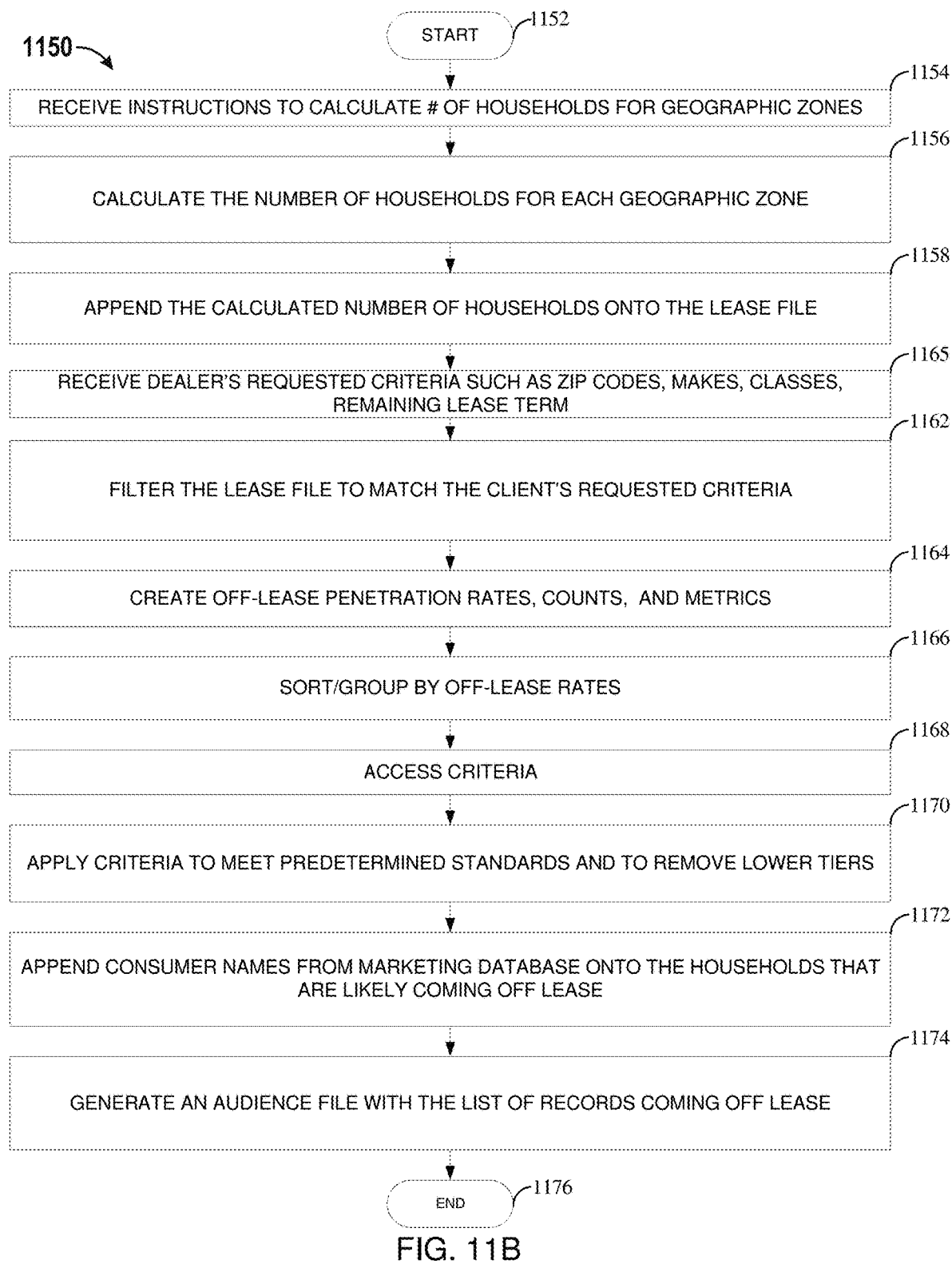

FIGS. 11A and 11B are flow charts for methods of processing data using dynamic models, in accordance with exemplary embodiments. In some embodiments, any of the components described herein (for example, the CPU 202, the I/O interfaces and devices 204, the user interface module 214, and/or the mass storage device 210) of the dynamic modeling system 103 as shown in FIG. 2B) may perform either or both of these methods. The method 1100 of FIG. 11A begins at block 1102.

At block 1104, the CPU 202 may receive a first filter item. In some embodiments, the first filter item may comprise one or more filter values, selections, or inputs as received from a user of the dynamic modeling system 103 via the user interface module 214. At block 1106, the CPU 202 may generate a third database including a third plurality of records by identifying, in a second plurality of records of a second database (for example, the marketing database), records that meet the criteria of the first filter item. At block 1108, the CPU 202 may cause a first update to a first plurality of records of a first database (for example, the lease file) to integrate data from the generated third database into the first plurality of records to create an updated first plurality of records. At block 1110, the CPU 202 may receive a database filter item, which may correspond to a predetermined criteria as received from the mass storage device 210 or inputs received via the user interface module 214. At block 1112, the CPU 202 may generate a fourth database including a fourth plurality of records by extracting from the updated first plurality of records, a selected set of records of the updated first plurality of records corresponding to the database filter item. At block 1114, the CPU 202 may determine a first set of database metrics that correspond to the fourth plurality of records. At block 1116, the CPU 202 may generate a customized dynamic model to segregate the fourth plurality of records using the determined first set of database metrics. At block 1118, the CPU 202 may receive criteria corresponding to predetermined rules or filters. At block 1120, the CPU 202 may compare the segregated fourth plurality of records with the criteria to update the segregated fourth plurality of records to remove records that do not meet the criteria creating a diminished fourth plurality of records. At block 1122, the CPU 202 may cause a subsequent update to the diminished fourth plurality of records to integrate data from the second database into the diminished fourth plurality of records to create an updated diminished fourth plurality of records. At block 1124, the CPU 202 may generate an event notification including information included in the updated diminished plurality of records.

The method 1150 of FIG. 11B begins at block 1152. At block 1154, the CPU 202 may receive instructions from a user to calculate a number of households for one or more geographic zones. At block 1156, the CPU 202 may calculate the number of households for each geographic zone based on information in a marketing database. At block 1158, the CPU 202 may append the calculated number of households onto a lease file. At block 1160, the CPU 202 may receive user's requested criteria such as zip codes, makes, classes, and/or remaining lease term. At block 1562, the CPU 202 may filter the lease file to match the client's requested criteria. At block 1564, the CPU 202 may create off-lease penetration rates, counts, and metrics. At block 1566, the CPU 202 may sort/group by off-lease rates. At block 1168, the CPU 202 may access criteria corresponding to predetermined limits, and so forth. At block 1170, the CPU 202 may apply the criteria to meet predetermined standards and to remove lower tiers. At block 1172, the CPU 202 may append consumer names from the marketing database onto the households that are likely coming off lease. At block 1174, the CPU 202 may generate an audience file with the records coming off lease.

XI. Operation of the System—Example Use Case—End of Loan

Figure 12:
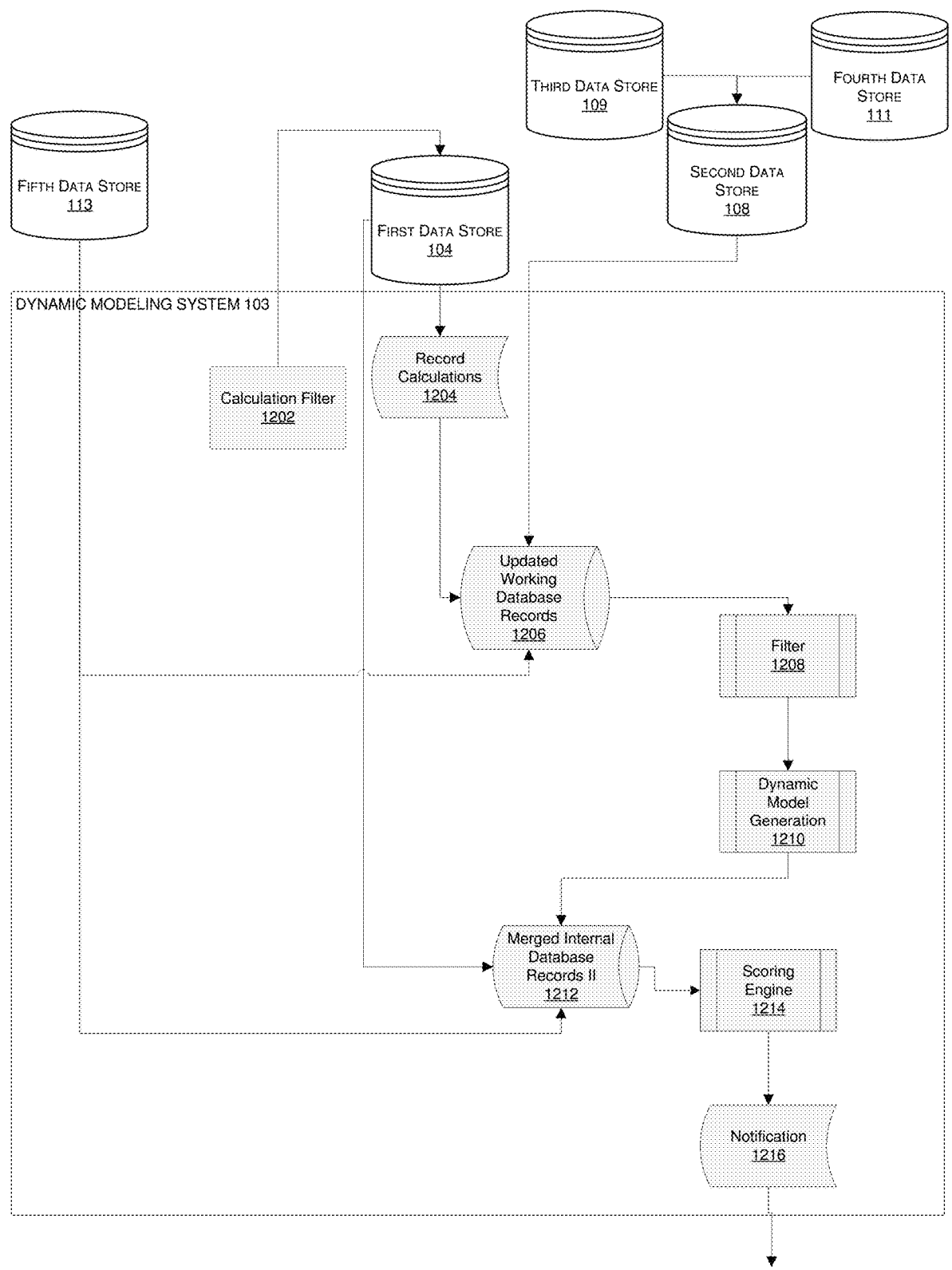
FIG. 12 is a block or data flow diagram of the database system for providing electronic notifications regarding database records, according to an alternate embodiment.

FIG. 12 is a block or data flow diagram of another database system, which may be implemented by the dynamic modeling system 103 and/or other computing systems, for dynamically generating models for processing data sourced from various databases and providing electronic notifications regarding database records, according to another alternate embodiment.

At block 1202, the dynamic modeling system 103 accesses a calculation filter update data item. Accessing the calculation filter update data item may comprise receiving an input requesting the calculation, etc. The calculation filter update data item, as described above in relation to the dynamic modeling system 103, may include, for example, instructions to perform specific calculations on database records stored by the system in the first data store 104. Examples of such data items are described below. The system implements the calculation filter update data item on records in the first data store 104. For example, the system queries the first data store 104 for specific sets of data and performs calculations on the data to automatically generate a set of record calculations 1204. Using an example use case for identifying specific events (for example, vehicles coming off loan), the calculate filter update may comprise instructions to calculate a number of households in a geographic zone.

In some embodiments, if the first data store 104 stores information about a population such that the calculation filter update data item may execute calculations on specific subsets of the population. For example, using an example use case for identifying vehicles coming off loan (where prospective clients are identified based on when an existing vehicle loan is estimated to end), the first data store 104 may be a consumer demographics or marketing database that stores data on individual consumers as well as information on households, as described above in relation to FIG. 1.

At block 1204, the dynamic modeling system 103 generates and stores the record calculations, such as, for example, the calculations along with the corresponding geographic area indicator. For the example use case above, the stored record calculations may include the numbers of households in a plurality of (or single) geographic zones. In some embodiments, the stored data includes one or more (or all) items included in the corresponding database record of the first data store 104. These calculations may be reprocessed as the data in the first data store 104 is updated, for example, daily, weekly, monthly, bi-monthly, bi-annually, annually, every 28 days, or according to other schedules, as noted above in relation to FIG. 1.

Advantageously, storing the calculations and the corresponding geographic area indicators/information in the records calculation 1204 can speed up later processing by the system, such as, for example, the merging, analysis, dynamic generation of custom models, and/or scoring of one or more records. For example, as described below, by storing a count of the designated categories, such as, for example the households within a specific zip code, those records can be more quickly merged with other data sets that are organized at the zip code level.

The system may also include a second data store 108 which comprises a large set of data which is stored differently from the data in the first data store 104. Using the example use case, the second data store 108 includes customer loan data from a third data store 109 and vehicle purchase data from a fourth data store 111. The second data store 108 may thus comprise loan and purchase data which has been extracted from, for example, an auto market database and then matched to third party data. In some embodiments, the loan and purchase data in the second data store 108 comprises vehicle leasing data and/or loan data. In some embodiments, the loan and purchase data is generated by extracting data from an auto market database which includes data sources such as state department motor vehicle data, manufacturer data, and so forth. The loan and purchase data from the respective data stores 109 and 111 may extract household-level records of vehicles that have a loan that recently ended or that ends in the near future, where "near future" means a user or client set or defined amount of time. In some embodiments, the vehicles associated with records in the loan and purchase data are vehicles coming off loan in the near future.

The extracted data may include, for example, vehicle make, vehicle type, vehicle model, vehicle manufacturer, as well as the vehicle owner location such as zip code and/or zip code+4 area. The extracted records are then matched to third party data and/or consumer data in the first data store 104 to determine when that household's vehicle loan is about to expire (such as, for example, the month and year, or the day, month, and year, or the quarter and year. The loan and purchase data in the second data store 108 may also include information on the vehicle segment of the vehicle, such as, for example, economy car, sport scar, luxury car, and so forth. In some embodiments, the loan and purchase data does not include any owner-identifying information such as name, street address, or social security number, but instead only indicates that a vehicle within a household in a zip code+4 area is coming off loan at a certain or expected date or within a certain period.

The second data store 108 may be updated, for example, on various defined schedules and conditions, similar to the first data store 104.

The dynamic modeling system 103 may then access a set of data from the second data store 108 and merge those records with the record calculations created in block 1204 at the block 1206. In some embodiments, the dynamic modeling system 103 may also access a set of data from a fifth data store 113 that includes the geographic data when creating the updated working database records 1206. In some embodiments, as noted above, the geographic data in the fifth data store 113 includes or provides location details such as households information, zip code+4, census tract, longitude and/or latitude information, block group, block level, and so forth. The geographic data may be used in the modeling process (for example, in the merged internal database records 1206 below) to generate models and/or perform other analysis specific to a geographic region and/or be appended to the working aggregation files (for example, in the merged internal database records II 1212 below) to generate and/or enrich an audience profile. In some embodiments, the merged internal database records 1206 are stored in a separate file from the second data store 108 and the first data store 104 (and the fifth data store 113), whereas in other embodiments, the merged internal database records 1206 are stored in one of the first data store 104 and the second data store 108 (and/or the fifth data store 113). In some embodiments, there may be some advantages to storing the merged internal database records 1206 in a separate file from the first data store 104 and the second data store 108 (and the fifth data store 113). For example, storing the merged internal database records 1206 separately is advantageous when the accessed set of data is a smaller data set in comparison to the complete set of records in the second data store 108 or, as another example, when the merged internal database records 1206 are stored as a file or in a system that can be more readily read and accessed than the second data store 108. In some embodiments, the merged internal database records 1206 are stored locally within the dynamic modeling system 103, whereas in other embodiments, the merged internal database records 1206 are stored remotely from the dynamic modeling system 103, such as in an external database or in one of the first data store 104 and the second data store 108 (and/or the fifth data store 113). If separate from the first data store 104 and the second data store 108, the merged internal database records 1206 may be processed by the dynamic modeling system 103 without having to further communicate with the first data store 104 or the second data store 108 (or other external data stores) to process the merged internal database records 1206.

Using the example use case, the second data store 108 may include vehicle loan data that is provided at the household level such that a subset of that household data may be aggregated at a geographic level, such as the zip code level, and merged with the record calculations 1204 that may represent a count of the number of households within a specific zip code set to create merged internal database records 1206. The merged internal database records 1206 may then store data on each zip code set which indicates the number of households in each zip code as well as the households within those zip codes which have a vehicle loan that is about to expire.

The system may then apply a filter 1208 using a set of criteria which is stored in or accessed by the dynamic modeling system 103. The filter 1208 may be used to access a filtered subset of data from the merged internal database records 1206. In some embodiments, the subset of the data is stored as a separate database (not shown) from the merged internal database records 1206, whereas in other embodiments, the filtered subset of the data is stored in a temporary memory location (not shown), such as RAM or buffer memory to be accessed for use in the dynamic model generation 1210.

In some embodiments, one or more criteria of the filter 1208 are based on user or client-provided criteria. For example, the user may utilize a computing device to interface with the dynamic modeling system 103 and request information on vehicles of a specific make and class and/or for drivers within a specific set of zip codes as well as those vehicles coming off loan. In addition, the user may provide other parameters, such as, for example, manufacturer options, model, vehicle class, luxury/non-luxury categorization, loan details or parameters, or other categorizations or options. For example, the user may also provide instruction to include "comparable" options or events, such as, for example, if the user indicated a Toyota Corolla, the system may also include Honda Civic as a "comparable option". The user may also provide instruction to include "upsell/cross-sell" options, such as, for example, if the user indicated a Toyota Corolla, the system may also include Toyota Prius as an "upsell/cross-sell" options even though they may not be considered comparable.

The dynamic modeling system 103 is able to dynamically receive such criteria in real-time and then access the filtered subset of the merged internal database records 1206 dynamically so that the filtered subset accounts for any newly updated criteria from the user. The dynamic modeling system 103 may also aggregate the filtered records from merged internal data base records 1206 to the selected user-provided criteria. Using the example use case, the filter may include criteria from a vehicle dealer requesting information about specific vehicle makes within certain zip codes where the vehicles have loans that expire within a defined amount of time or time period, for example, Lexus vehicles within zip codes 60119, 60134, 60175, and 60176 that have loans that expired within the last 3 months or that expire within the next 3 months. After the dynamic modeling system 103 applies the filter, the data set now includes household information for the selected zip codes 60119, 60134, 60175, and 60176. The dynamic modeling system 103 may then aggregate the data using the selected criteria to provide overall calculations including, for example, the number of Lexus vehicle having loans that expired in the last three months or expiring in the next three months, the number of total vehicle loans that have or are expiring in the selected zip codes in the last three months or expiring in the next three months, and the number of total households in each zip code in the four selected zip codes, and/or the number of target households in each zip code in the four selected zip codes.

The dynamic modeling system 103 may perform various counts, calculations, metrics, or other analyses of the filtered subset. As one example, the dynamic modeling system 103 may calculate an "off loan" rate by comparing the total number of households within the selected zip codes with the total number of households that have expired or expiring loans within the zip codes and which also meet the selected vehicle criteria, if any. In some embodiments, if there are any groups that have less than a certain number of households (for example, 4, 10, or 50) or groups that have an event percentage greater than or equal to a certain number criteria (for example, 95%, 98%, or 100%), then the dynamic modeling system can combine groups within, for example, the same zip codes in order to increase the group size to at least the set number of householders and create an off loan percentage that meets the percentage criteria.

In some embodiments, the dynamic modeling system 103 stores the aggregated household data at the geographic/parameter level such that a record is created for each geographical/parameter combination and the total number of households with an expired or expiring loan that matches the set of parameters is calculated. Storing the data at this level helps improve the processing speed and memory allocation which can be important for use when generating the models using this data.

In addition, the dynamic modeling system 103 may dynamically generate and apply a modeling algorithm that groups the filtered subset based on the filter criteria to determine a prediction or a likelihood estimation 1210. The dynamic modeling system 103 may utilize the filter criteria to generate the custom model. Using the example above, the dynamic modeling system 103 may take the filtered set of vehicle data for a specific set of zip codes (which includes the household count information and the off loan percentage) to dynamically generate a custom modeling algorithm that groups together households by optimizing their likelihood of having the expired or expiring loan and being associated with certain models and makes within a specific time frame to generate a new model that calculates the likelihood of a specific household coming off loan a given time frame. In some embodiments, the dynamic modeling system 103 sorts the geographical zones by the off loan percentages, and creates tiered groups of zones. For example, the tiered groups of zones maybe based on the off loan percentage where tier A may be zones with off loan percentage of >65% but <100%, tier B may be zones with an off loan percentage of >30% but <=65%, tier C may be zones with an off loan percentage of <=30%. In some embodiments, the dynamic modeling system 103 removes or flags zones that do not meet the acceptable tier levels or off loan percentages.

Depending on the embodiment, the dynamic modeling systems discussed herein may use various techniques for generating models, such as machine learning techniques that may include artificial intelligence such as neural networks, genetic algorithms, clustering, or the like. Machine learning may be performed using a training set of data. The training data may be used to generate the model that best characterizes a feature of interest using the training data. In some implementations, the class of features may be identified before training. In such instances, the model may be trained to provide outputs most closely resembling the target class of features. In some implementations, no prior knowledge may be available for training the data. In such instances, the model may discover new relationships for the provided training data. Such relationships may include similarities between data elements such as transactions or transaction categories as will be described in further detail below.

The dynamic modeling system 103 may also apply various rules to determine whether the data meets predetermined criteria or error levels. In some embodiments, the dynamic modeling system 103 removes, discards, or ignores data that does not meet such criteria or error levels. The remaining data may represent a working data set which can then be stored in a temporary memory location, such as RAM or buffer memory or in a permanent memory.

The dynamic modeling system 103 may then merge the working data set with data from the first data store 104 to generate merged internal database records II 1212. In some embodiments, the merged internal database records II 1212 also includes data merged from the fifth data store 113, which includes the geographic data. For example, the geographic data may be appended to the results from the working data set to assist in generating scoring details and/or add other value based on the geographic details. In some embodiments, the merged internal database records II 1212 are stored as a new database whereas in other embodiments, they are stored in or within the merged internal database records 1206. Using the example use case above, the dynamic modeling system 103 may merge the selected geographic groups with marketing data or with records from the first data store 104 to provide marketing information for the set of households in the selected zones or zip codes. In some embodiments, the marketing information is provided for all of the households in the selected zip codes, whereas in other embodiments, the marketing information is only provided for a subset of the households in the selected zip codes.

At 1214, the dynamic modeling system 103 may then generate a model score for each record and append the scores onto the records or groups of records. However, it is recognized that in other embodiments, scores are not included as the fact that the record remains within the merged internal database records II 1212 indicates that the dynamically generated custom model has determined that they are a viable contact. Using the example above, the dynamic modeling system 103 may then append a score onto each record to indicate whether that specific record is in one of the selected geographic groups where some subset of the households within the group likely have an expired loan or an expiring loan for the selected vehicle make(s). The scores may include tier indicators, an estimated accuracy rate, a number, an alphanumeric identifier, or any variety of scoring indicator.

At 1216, the dynamic modeling system 103 may generate an output file on a periodic basis, for example daily, weekly, monthly, bimonthly, quarterly, semiannually, and so forth) or on demand based on records being identified for the merged internal database records II 1212 and send a notification alert or notification package. The generated notification package or alert may comprise a digital and/or electronic message. The notification package may include an indication of the corresponding records from the merged internal database records II 1212 along with their corresponding scores, and any other data items from the corresponding record. In other embodiments, the notification package may be an indication to the user that user should access the dynamic modeling system 103 to review the records from the merged internal database records II 1212 and/or the scores. The notification may be sent to the user that provided the filter criteria, and/or to any other recipient indicated by the user or the notification package. Further, the notification package may be delivered by any appropriate mode. Using the example above, the dynamic modeling system 103 may send a notification package that comprises information on households that most likely have an expired or expiring loan as well as a score that indicates the relative likelihood. The notification package may indicate the households that are located within the better performing geographical areas. The notification package may include one or more of the following fields for each household: name, address, city, state, zip code+4, period during which the event is experienced, score, and/or tier.

In some embodiments, the alert and/or notification is automatically transmitted to a device operated by the user associated with corresponding notification, as described in relation to FIG. 1 above, and will not be described again here.

In various implementations, filter criteria changes may be made continuously, in real-time or substantially real-time, and/or in batch. In various implementations, record changes may be evaluated continuously, in real-time or substantially real-time, and/or in batch. In various implementations, notification may be generated and/or sent continuously, in real-time or substantially real-time, and/or in batch.

In various implementations, the first data store 104, the second data store 108, the third data store 109, the fourth data store 111, and the fifth data store 113, the record calculations 1204, the merged internal database records 1206, the merged internal database records II 1212, and/or any combination of these databases or other databases and/or data storage devices of the system may be combined and/or separated into individual databases.

XII. Generating Dynamic Models—Example Use Case—Vehicle and Client Data

Figure 13:
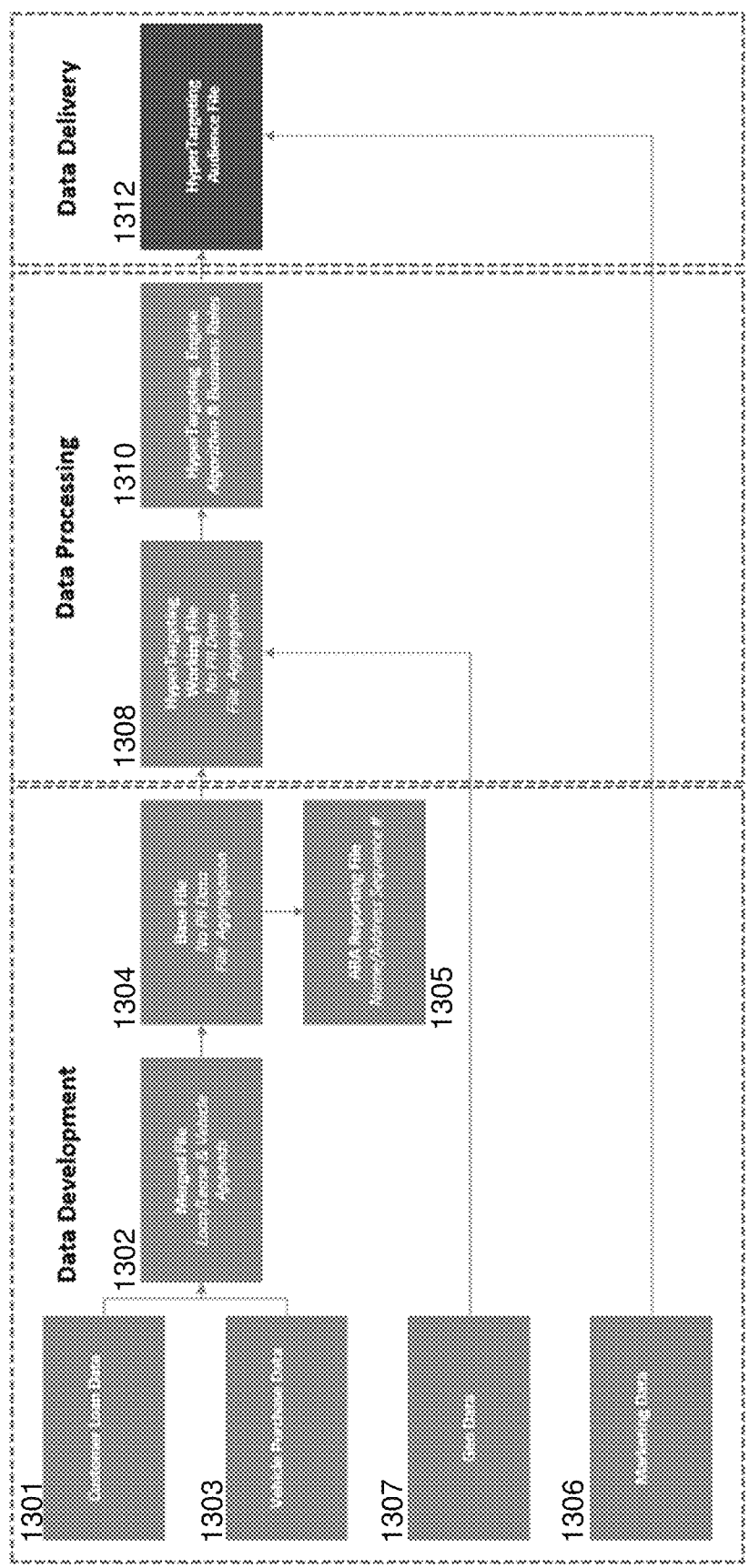
FIG. 13 is an example of one embodiment of a flowchart for processing information from multiple sources and generating dynamic models based on the data from the sources.

FIG. 13 is an example of one embodiment of a flowchart for a method, process, or data flow diagram 1300 for processing information from multiple sources and generating dynamic models based on the data from the sources. The method 1300 includes various blocks used to process information from multiple sources and generating dynamic models based on the information from the multiple sources. The method 1300 may be run simultaneously, in an overlapping manner, or sequentially based on inputs or requests from multiple dealers, manufacturers, or other entities that are each accessing the dynamic modeling system 103 via one or more terminals 102 or computing devices 106. The various blocks of the method 1300 may be performed by one or more components of the dynamic modeling system 103 as described in relation to FIG. 2B. For example, one or more blocks of the method 1300 may be performed by one of the processor 202, the modeling module 215 (or one of the models generated by the dynamic modeling system 103), the data stores 104, 108, 109, 111, and/or 113, the quality module 217, or the report module 216. In some embodiments, one or more of the blocks of the method 1300 are implemented by one or more of the other components of the dynamic modeling system 103, as referenced in FIG. 2B. In some embodiments, the blocks of the method 1300 are performed in a sequential manner, while in other embodiments, the blocks of the method 1300 may be performed in a non-sequential manner, regardless of the terminology used to describe the method 1300 herein. A person having ordinary skill in the art will appreciate that the method 1300 may be implemented by other suitable devices and systems. Although the method 1300 is described herein with reference to a particular order, in various aspects, blocks herein may be performed in a different order, or omitted, and additional blocks may be added.

As shown, the method 1300 may comprise four data input or source blocks: at block 1301, the method 1300 comprises receiving, accessing, or generating a customer loan data file, at block 1303, the method 1300 comprises receiving, access, or generating a vehicle purchase data file, and at block 1302, the received loan data file and vehicle purchase data file are merged. At block 1304, the merged loan data and vehicle purchase data is parsed to remove any unnecessary or undesirable data. At block 1306, the method 1300 comprises receiving or accessing a marketing database. At block 1307, the method 1300 comprises receiving or accessing geographic data file. At block 1305, an analysis block provides a historical review of purchase rates in the records being analyzed in the method 1300. For example, the block 1305 allows for verification and/or identification of what combinations of inputs have resulted in purchases. The block 1305 analysis may provide information that integrates how historical purchase rates can be used to understand the inputs can be analyzed to predict future purchases. Each of these data input, analysis, or source blocks will be described in further detail below.

In some embodiments, the method 1300 may begin at or include block 1302, where the loan and purchase data files are received or accessed. For example, obtaining or accessing the loan and purchase data files may comprise reviewing or accessing one or more data files, database, or reports 1301 and 1303 that include a listing of loan and purchase data information (for example, loan information and/or vehicle information regarding vehicle that have loans that expire within a time period around a date). Information used to generate the one or more reports of the loan and purchase data files may include information from vehicle databases (for example, new vehicle registration databases associated with state departments of motor vehicles ("DMVs") and/or from third party archives (for example, providing dates and other details regarding entrance into loans, and so forth). For example, one or more fields may be extracted from the vehicle database and used in conjunction with information from the third party archives to identify the parameters of vehicle loans (for example, expiration of loan, loan payments, etc.) for entries in the customer loan data and/or vehicle purchase data file. Accordingly, the loan and purchase data file may be generated based on information received from one or more other databases. In some embodiments, the third party data is already included in the loan and purchase data file and/or the various source databases. In some embodiments, the loan and purchase data file may include title state, vehicle information (for example, year, make, model, and so forth), loan term, loan maturity date, loan payment, among others. In some embodiments, the loan maturity date may be calculated based on a reporting period date (for example, a range of dates for which customer loan and/or vehicle purchase records are compiled and searched).

In some embodiments, the block 1302 may be performed by one of the processor 202, the user interface module 214, the I/O interfaces and device 204, and so forth. In some embodiments, the loan and purchase data file may comprise data from the data store 104 that relates to vehicles that are coming off loan within a period of time. In some embodiments, obtaining or accessing the loan and purchase data file may comprise or be based on receiving an input or request from the user about target potential clients.

For example, the user may request a listing of households or people in a particular geographic area or region that are likely to have vehicle loans that are expiring or maturing within a particular time period. In some embodiments, the request may include details of the geographic area to be searched as well as the time period to search. In some embodiments, the request may also include additional information such as details of make, model, or type of vehicle that the households or people currently have loans for, which may be used for filtering. The request may also include a request for information for the households or people identified in the geographic area that has a strong likelihood of having consumers that may meet the requirements of the request. In some embodiments, as described herein, the user may comprise one or more of a dealer, manufacturer, financial service provider, or a related entity. Obtaining or generating the consumer loan and/or vehicle purchase file may further comprise the dynamic modeling system 103 submitting a request to the customer loan and/or vehicle purchase data store based on the request received from the user. For example, the request to the customer loan and/or vehicle purchase data store may include the time period to be searched. In some embodiments, the request to the customer loan and/or vehicle purchase data store also includes the geographic area from which data is requested.

In response to the request to the data store including the loan and purchase data file, the dynamic modeling system 103 may receive loan and/or vehicle data that includes details of one or more vehicles that are coming off loan in the identified time period. The details for each vehicle may include manufacturer information, model information, zip code information (potentially including zip code+4 information) and a quantity for that vehicle (or similar vehicles) that exists in that zip code. The received data from the data store may be used to generate a loan file that is further processed by the dynamic modeling system 103.

At block 1306, a marketing database may be obtained or generated from data received from the marketing database. Similarly, block 1306 may also be performed by one of the processor 202, the user interface module 214, the I/O interfaces and device 204, and so forth. In some embodiments, the marketing database 1306 may comprise data from the marketing database that relates to households or consumers within a geographic area or region. The marketing data available from the marketing database may include demographic or similar data for every household in the United States. In some embodiments, obtaining or generating the marketing database may comprise or be based on receiving an input or request from the user about target potential clients. For example, the user may request the listing of households or people in a particular geographic area or region that are likely to have vehicles coming off loan within a particular time period, as discussed herein. Obtaining or generating the marketing database may further comprise the dynamic modeling system 103 submitting a request to the marketing database based on the request received from the user. For example, the request to the marketing database may include the time period to be searched. In some embodiments, the request to the marketing database also includes the geographic area from which vehicle and/or user data is requested.

In response to the request to the marketing database, the dynamic modeling system 103 may receive or access marketing data that includes address information, contact information, names, and zip code for households in the geographic area. The received data from the marketing database may form the marketing database that is further processed by the dynamic modeling system 103.

At block 1308, the dynamic modeling system 103 calculates a total number of households in each zip code+4. In some embodiments, the total number of households may be calculated based on one or more of the customer loan data, vehicle purchase, and marketing data obtained, accessed, or generated by the dynamic modeling system 103. In other embodiments, other geographic sets could be used, such as zip code, a collection of zip codes, zip codes within a county, and so forth. The data from the marketing database may be summarized and otherwise aggregated based on geographical areas or regions to calculate the number of households in each geographical area or region.

Also at block 1308, the dynamic modeling system 103 may merge data from the marketing database and data from the loan and purchase and geographic data files. In some embodiments, this may involve merging the number of households calculated into the customer loan and/or vehicle purchase file. The data may be merged so that the merged data file includes (for each geographic area) the number of households in the geographic area and the vehicle and/or user information in the geographic area. In some embodiments, the merging of these files and the calculation of the total number of households may be done on a regular basis, for example, quarterly, monthly, weekly, daily, hourly, and so forth or in some batch mode so that the merged data file is ready for when the user request is received. In other embodiment the merging and calculating may be done after receipt of the user request.

The various details from the user request may be identified. For example, one or more of the identified geographic area, makes, models, classes, and time period may be identified from the user request. At block 1310, these criteria may be applied via, for example a filter, to the merged loan and purchase data file and marketing database (for example, the merged data file) to filter the merged data file to only include data based on the user request (for example, only showing the requested makes, models, and so forth). By filtering the merged data file, the dynamic modeling system 103 may be able to focus on only data relevant to the user's specific request and reduces processing of unnecessary or worthless information.

Also at block 1310, the dynamic modeling system 103 may create various audience metrics to provide to the user. For example, the dynamic modeling system 103 may calculate or create various metrics based on the merged data file. For example, the dynamic modeling system 103 may create event percentage metrics. Based on the merged data file (which includes the number of households in the geographic area having vehicles coming off loan and the total number of households in the geographic area), the off loan percentage metrics may be calculated. For example, an off loan percentage rate may be calculated based on dividing the number of households having vehicles coming off loan by the total number of households in the geographic area. As one example, the off loan percentage for each zip code+4 may be defined as the total number of vehicles coming off loan in that zip code+4 that match the user's criteria divided by the number of households in that zip+4.

The merged data file may be reviewed or processed by the dynamic modeling system 103 to confirm that each zip code+4 is only listed one time in the merged data file (for example, that there are no duplicates in the file). The dynamic modeling system 103 may also confirm a value indicating the total number of vehicles coming off loan is cumulative for each zip code+4 so that all vehicles coming off loan are carried through when records are merged or consolidated. In some embodiments, the dynamic modeling system 103 may apply an aggregation algorithm to form one or more zones to meet pre-defined criteria. For example, if one of the zip code+4 zones only includes 3 households when at least 4 households are required or desired, then the dynamic modeling system 103 may aggregate that zip code+4 zone with another zip code+4 zone, for example, selecting the second zip code+4 zone that gets the closest to the minimum 4 households.

As another example, if there are any groups that have less than four households or an off loan percentage greater than or equal to 100%, then the dynamic modeling system 103 may combine zip code+4 regions within the same zip code in order to increase the group size to at least 4 (or some other pre-defined criteria) and/or to create an off loan percentage that is less than 100% (or some other pre-defined criteria). After zip code+4 areas are combined, the device calculates new off loan percentages for each remaining group. The dynamic modeling system 103 may utilize best matching algorithms or other algorithms to match up and aggregate each of the zones that do not meet the criteria. When creating the groups, the dynamic modeling system 103 may calculate the number of households left in the merged data file that have not already been assigned to a group (for example, total number of households in the merged data file minus the cumulative number of households) and then continue with the grouping until all of households have been assigned to a group. In other embodiments, there may be one or more households or zones that are not assigned to a group.

The dynamic modeling system 103 may also calculate the number of vehicles coming off loan in the group, the number of households in the group, and the off loan percentage within each group—the total number of vehicles coming off loan in the group divided by the total number of households in the group—which may be based on the user-identified criteria or overall based on the cumulative number of households. Any or all of these metrics may be provided to the user (for example, the audience). Some additional metrics include counts based on make, segment, and/or other vehicle and consumer attributes. In some embodiments, the historical purchase may be used to update one or more metrics or update how a metric is determined. For example, historical purchase rates may show how different combinations or weightings of inputs may change corresponding purchase rates and update the metrics to better provide predicted results based on historical results.

Also at block 1310, the dynamic modeling system 103 may dynamically generate and apply custom models based on the user's criteria to determine groups of households by optimizing their likelihood of having vehicles that come off loan. The models may be based on geographic areas and/or the calculated event rates. As one example, after the zones have been aggregated such that they comply with any rules or requirements from the user, the merged data file may then be sorted from high to low based on the calculated event percentage for each zone (or aggregated zone). Additionally, the dynamic modeling system 103 may generate other calculations such as, for example, a cumulative total number of households, a cumulative total number of vehicles coming off loan for each record in the merged data file, and/or the total number of households in the whole file and merge that total number back into every record on the file.

The groups may be sorted into various tiers, where the highest tier includes zones (or aggregated zones) within which the households are most likely to have a vehicle come off loan within the identified time period and where the lowest tier includes zones (or aggregated zones) within which the households are least likely to have a vehicle come off loan within the identified time period. The models may automatically make adjustments to the grouping.

Additionally at block 1310, one or more rules may be applied to the models and generated groups to confirm that any data requirements are met as such the model may be adjusted or calibrated to comply with predefined criteria. For example, the dynamic modeling system 103 may confirm that each created group includes at least four households as identified by the marketing database and has an off loan rate of less than 100%. In some embodiments, the dynamic modeling system 103 may confirm that the groups have more or less households and may establish an off loan rate threshold of any other value. The groups may be created with a goal of maximizing or increasing the off loan percentage within each group that is created.

Also at block 1310, additional data from the marketing database may be merged into the merged data file for the identified households for one or more tiers of groups. For example, the marketing database may merge households or records identified in the top tiered group (for example, the group with the most households likely to have a vehicle come off loan in the time period) with corresponding information, and so forth, and may not be merged into the households or records in lower tiers. In other embodiments, the marketing database data may be merged for all records in all groups.

Also at block 1310, the dynamic modeling system 103 may assign model scores to each record in the merged data file to indicate a likelihood that a specific record is coming off loan for the specific criteria. The model score may be based on the assigned tier and/or the zone in which the record is related. In some embodiments, the model scores may also indicate a confidence level that the record is correct or accurate. In some embodiments, records may be removed or reorganized in the groups based on the model scores and/or confidence levels.

Also at block 1310, the dynamic modeling system 103 performs quality checks on the records in the merged data file. The quality checks may confirm that only information meeting corresponding requirements is released to the user. The quality checks may also confirm that the records are appropriately grouped and that only records for the desired geographic area and for the identified makes, models, event, time period, and so forth, are included in the records generated for the user.

In some embodiments, historical purchase records may be used to update one or more aspects of assigning model scores to records. For example, historical purchase rates, etc., may show how different combinations or weightings of inputs may change corresponding purchase rates and update the scoring basis to better provide predicted results based on historical results. Thus, the scores would better reflect expected vehicle purchases, leases, etc.

In some embodiments, the quality checks may include verifying that there are no groups with event percentages greater than or equal to 100% and no groups with less than four households. An additional example quality check may include verifying a number of zip code+4 areas in the merged file is equal throughout the processing, that a total number of households is equal throughout the processing, and that a total number of vehicles coming off loan is equal throughout the processing.

At block 1312, the dynamic modeling system 103 generates the output notification package (for example, an electronic report) for the user including one or more of the records and/or groups for the identified geographic region, vehicle information, tier information (for example, the tiered group), and the model score. In some embodiments, the electronic report may be automatically transmitted to the user once generated by the dynamic modeling system 103. In some embodiments, the electronic report may be viewed by the user by accessing the electronic report via the dynamic modeling system 103. In some embodiments, the electronic report may be printed and electronically sent to the dynamic modeling system 103. Thus, the user may receive various information that can be used to target potential clients that are known (or known to be reasonably likely) to be coming off a loan in the desired time period.

XIII. User Interfaces—Example Use Case—Off Loan Data

Figure 14:
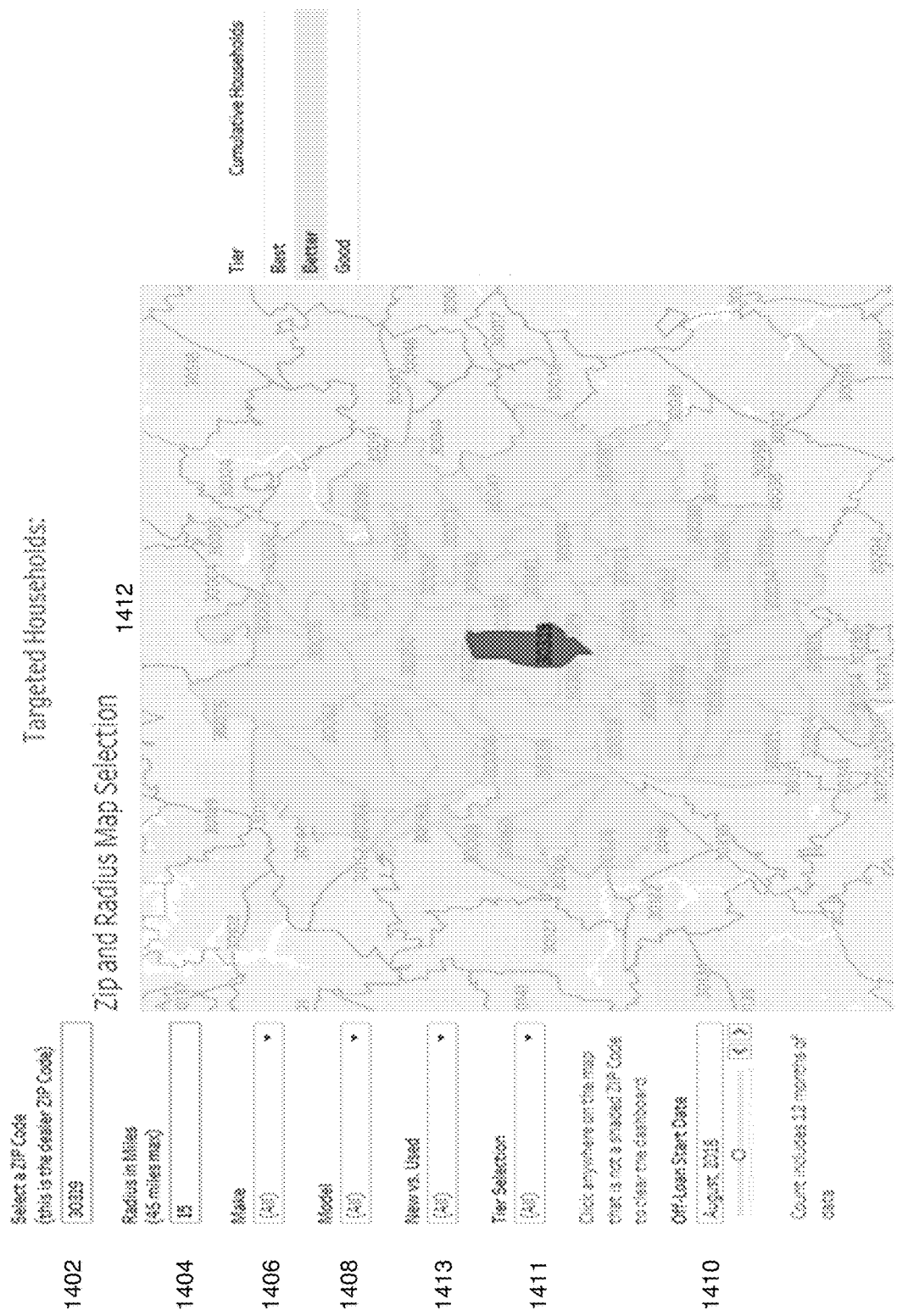
FIG. 14 is an example interactive user interface (or graphical user interface or "GUI") including screen that provides an off loan tool usable by a user for input selection, in accordance with an exemplary embodiment.

FIG. 14 is an example interactive user interface (or graphical user interface or "GUI") including screen 1400 that provides an off loan tool usable by a user for input selection, in accordance with an exemplary embodiment. Advantageously, the interactive user interface allows user to interact with various elements of the GUI, e.g., by touching or otherwise selecting and/or manipulating the elements, to receive input from the user and provide dynamic updates to the user via the GUI, such as in response to processing large amount of data based on inputs provided by the user via the GUI and providing real-time updates to the GUI in some embodiments.

In this embodiment, the off loan tool may provide the client with an ability to review a total number of targeted households having records for vehicles coming off loan in a particular geographic radius around a selected zip code in a particular period of time. The radius and selected zip code may correspond with a coverage area or radius around a single dealer rooftop or a particular geographic radius around multiple dealer rooftops in a selected zip code.

The example screen 1400 may include various values that are user customizable and that may initiate updates to the GUI in response to adjustment of the values. A first value 1402 may correspond with a zip code based on which the user wants the off loan tool to generate a report of percentages of all vehicles coming off loan in a period of time. In some embodiments, the zip code selected by the user may be centrally located in a particular geographic region. For example, the value 1402 may default to the zip code of the user (for example, of a dealer rooftop, manufacturer site, or financing service provider office, etc.).

The example screen 1400 further includes a radius value 1404. The radius value 1404 may indicate a radius around the zip code value 1402. In some embodiments, the radius value 1404 may be, for example, in a range of 0 to 45 miles and may be user selectable with a manually entered value or with a slider bar to adjust the value. The range may instead be in a range of 0 to 10 miles or 0 to 20 miles or any other range. For example, the radius may be set at increments of 0.5 miles or 1 mile or 5 miles. In some embodiments, the GUI may include a geometric (e.g., circular, oval, rectangular, etc.) or free form selection tool that allows the user to select an area of a map for analysis.

The example screen 1400 also includes a selection 1406 for selecting one or more vehicle makes. The selection 1406 of vehicle makes may utilize a multiple selection capable drop down menu that allows the user to identify one or more vehicle makes that the user wants to use in the report generated by the off loan tool. For example, the user may select one or more manufacturers (for example, Ford, GM, Lincoln, and so forth) that best fits the user market and target audience (for example, competitors, known clients, and so forth). Selection 1408 provides a multiple selection drop down menu by which the user selects one or more models associated with the one or more selected makes or manufacturers from selection 1406. By selection 1408, the user identifies one or more vehicle models which the user wants to use in the report generated by the off loan tool.

The example screen 1400 also includes a date 1410 selection menu that allows the user to select or identify a date or range of dates within which the user wishes to identify vehicles coming off loan having the selected vehicle attributes (for example, makes and models described above). In some embodiments, the date or range of dates may be a single day or a range of many weeks within, for example, an 18-month window, and may be identified with a slider tool or similar field.

The example screen 1400 includes a map 1412 that identifies zip codes that will be searched based on the entries in the values 1402 and 1404 described above. For example, the zip code identified in zip code value 1402 may be shaded with a first shade or pattern and positioned generally in a center of the map 1412. The map 1412 further identifies zip codes that fall around the zip code value 1402 and those zip codes that fall within the radius in value 1404 may be shaded with a second shade or pattern. In some embodiments, only zip codes that fall entirely within the radius value 1404 may be shaded or identified. In some embodiments, any zip code that falls at least partially within the radius value 1404 may be shaded or identified. In the map 1412, the zip code 30319 may be the selected zip code value 1402 and the shaded zip codes surrounding the 30319 zip code are the zip codes that will be searched for households with for events that occur.

The example screen 1400 shows a tier selection value 1411 that allows the user to select only those results that meet particular tiers. For example, the tiers may correspond to the tiered groups described above, where tiered groups of zones maybe based on the off loan percentage. For example, tier A may be the "best" tier including geographic zones with off loan percentage of >65% but <100%, tier B may be the "better" tier including geographic zones with an off loan percentage of >40% but <=65%; tier C may be the "good" tier including the geographic zones with an off loan percentage of <=40%. By selecting a particular tier, only those households that fall in the selected tier may be shown in the example screen 1400 and the resulting report.

The example screen 1400 also allows selections for new/used vehicles 1413 (allowing selection between new and used vehicles). In some embodiments, the client may individually select (or hover over) each shaded zip code to see information specific to the selected zip code.

Figure 15:
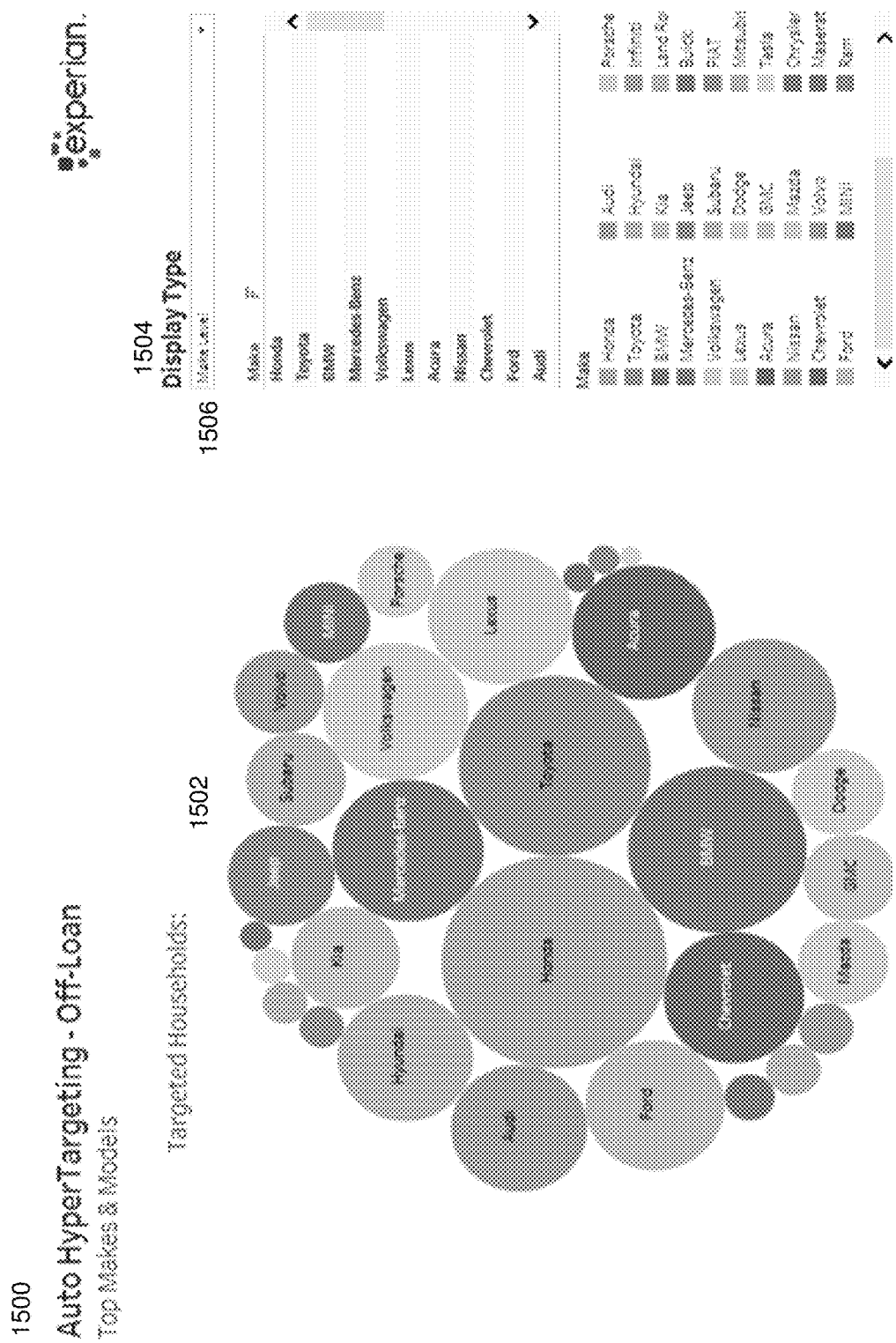
FIG. 15 is an example of a breakdown ranking or listing of a number of targeted households, identified by make, having a vehicle coming off loan in a specified geographic region from the off loan tool of FIG. 14, in accordance with an exemplary embodiment.

FIG. 15 is an example of a graphical and numerical display 1500 depicting a number of targeted households that have a vehicle coming off loan that occurs within a predefined time period that are within a particular geographic area identified by the zip code value 1402 and the radius value 1404 of FIG. 1. In some embodiments, the display 1500 may be presented to a user as part of a GUI that is displayed on a user's computing device. In some embodiments, the GUI may include various representations or values for comparison, such as interactive elements that are selectable to cause display of more detailed information regarding the selected item. The geographic area with which the display 1500 relates is indicated by the map 1412.

The display 1500 includes, as shown, a graph 1502 of circles of varying sizes or areas for a plurality automobile manufacturers, where the size or area of the circle is indicative of a corresponding value or number of vehicles by the respective manufacturer within the geographic area that have events identified by the system. For example, a larger sized circle corresponds to a larger number of vehicles by the respective manufacturer associated with an event within the geographic area and a smaller sized circle corresponds to a smaller number of vehicles by the respective manufacturer. The display 1500 include a table 1504 that provides the numbers of vehicles associated with each manufacturer and also provides the key associating each manufacturer with one of the circles on the graph 1502. In some embodiments, the manufacturers shown in the display 1500 may correspond to the selection 1406 of vehicle makes, such that the manufacturers shown on the display 1500 depends on the makes selected at the selection 1406.

Additionally, the display 1500 includes a drop down selector 1506 that allows a selection of one of the attributes that are selectable with the selectors 1406, 1408, 1411, and 1413 on the screen 1400 of FIG. 14. As such, the display 1500 can be used to show breakdowns according to any of the selections available on the screen 1400 for ease of review. Accordingly, the values and information shown in the table 1504 may change according to the data in the selections on the screen 1400. The table 1504 includes a column for the number of target households and a column for the breakdown being depicted (for example, the manufacturer, model, new/used, luxury/non-luxury, etc. This is one data visualization example. There are a multitude of ways to view the data based on the selected criteria(s), with other options including, but are not limited to, household counts, historical purchase rates, purchase timing, vehicle segments, and so forth.

Figure 16:
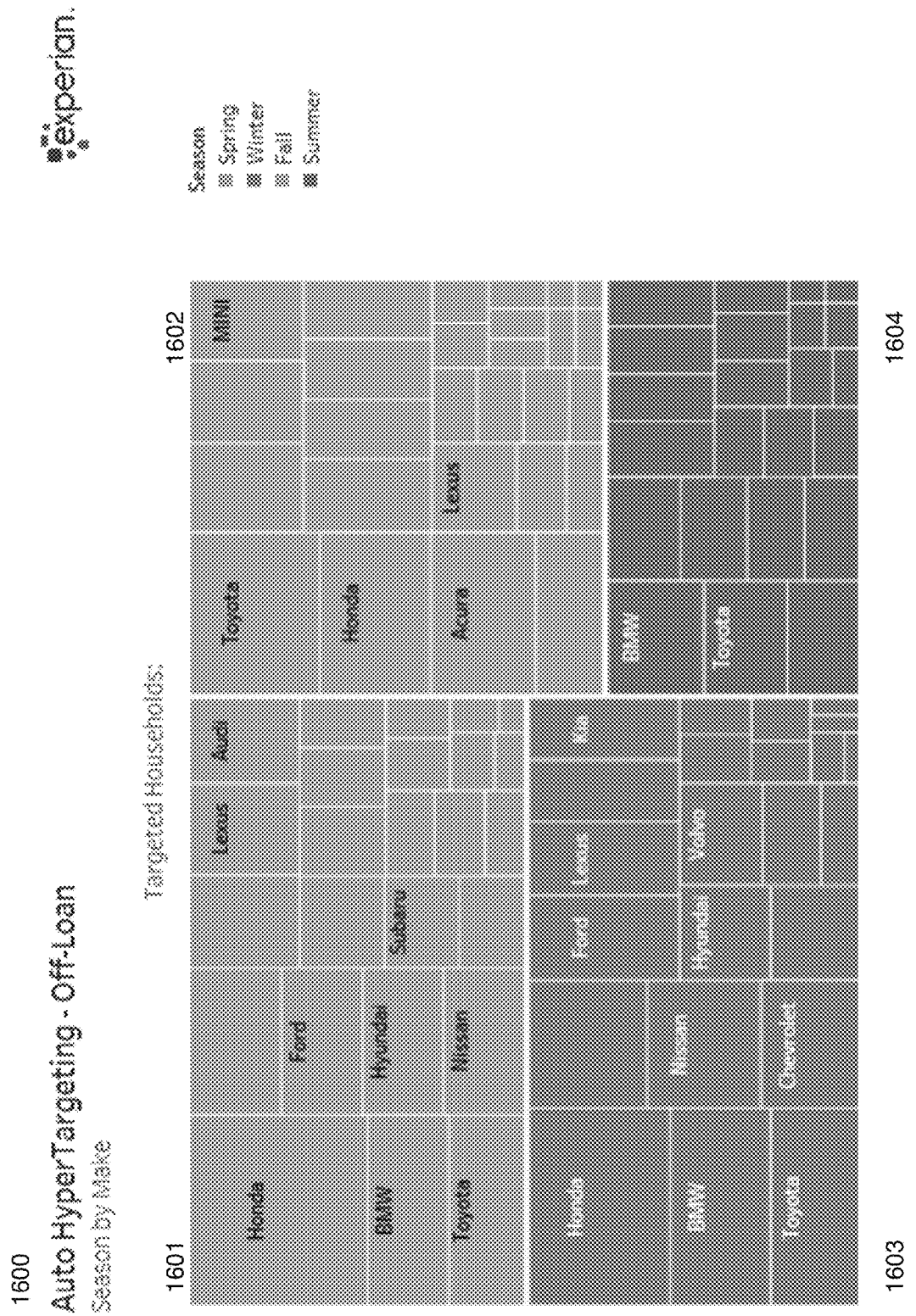
FIG. 16 is an example of a breakdown ranking or listing of the number of targeted households, identified by make, having a vehicle coming off loan in the specified geographic region in a specified season, in accordance with an exemplary embodiment.

FIG. 16 is an example of a breakdown 1600 of the number of targeted households associated with the one or more owner events in the specified geographic region shown on the graph 1500 of FIG. 15 according to vehicle make, where the one or more owner events occurs in a specified season. As shown, the breakdown 1600 includes four quadrants, one for each of the spring, winter, fall, and summer seasons. Each quadrant include sub-breakdowns that are divided according to the selected attribute from the screen 1400. For example, quadrant 1601, in the top left hand corner of the breakdown 1600, corresponds to the number of target households that experienced a vehicle or owner event having a vehicle from a particular manufacturer during the spring, while the quadrant 1602 in the top right hand corner is for the fall, the quadrant 1603 in the bottom left hand corner is for the winter, and the quadrant 1604 in the bottom right hand corner is for the summer. The areas or sizes of the sub-breakdowns correspond the quantity or number of vehicles for each make, similar to the sizes or areas of the circles in the graph 1502 of FIG. 15.

In some embodiments, given the limited area available for each sub-breakdown or season, only a subset of the total manufacturers from the display 1500 of FIG. 15 are shown. In the each of the sub-breakdowns of the breakdown 1600, the ~ top 25 manufacturers are shown. The breakdown 1600 also includes the total number of targeted households identified by the system and as shown in the screen 1400 and the display 1500.

Figure 17:
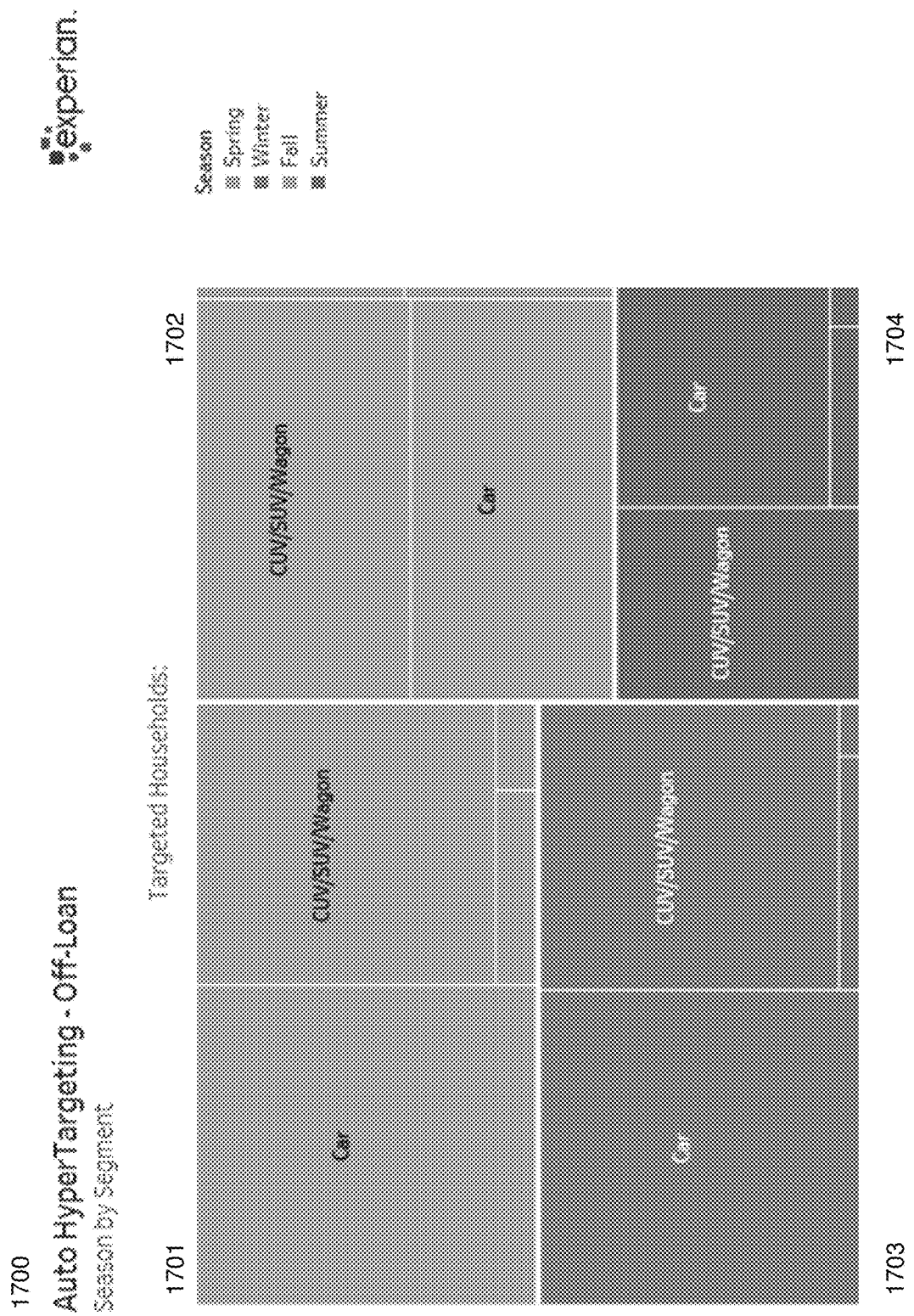
FIG. 17 is an example of a breakdown ranking or listing of the number of targeted households, identified by type, having a vehicle coming off loan in the specified geographic region in the specified season, in accordance with an exemplary embodiment.

FIG. 17 is an example of a breakdown 1700 of the number of targeted households associated with the one or more owner events in the specified geographic region shown on the graph 1500 of FIG. 15 according to vehicle type, where the one or more owner events occurs in a specified season. The breakdown 1700 may be displayed on a user device in response to the user selecting a specified geographic region of graph 1500, such as in real-time in response to the user selecting the region via a displayed GUI.

As shown, the breakdown 1700 includes four quadrants 1701-1704, one for each of the spring, winter, fall, and summer seasons. Each quadrant include sub-breakdowns that are divided according to the selected attribute from the screen 1400. For example, quadrant 1701, in the top left hand corner of the breakdown 1700, corresponds to the number of target households that experienced a vehicle or owner event having a vehicle of a particular vehicle type during the spring, while the quadrant 1702 in the top right hand corner is for the fall, the quadrant 1703 in the bottom left hand corner is for the winter, and the quadrant 1704 in the bottom right hand corner is for the summer. The areas or sizes of the sub-breakdowns correspond the quantity or number of vehicles for each vehicle type, similar to the sizes or areas of the circles in the graph 1502 of FIG. 15.

In some embodiments, given the limited area available for each sub-breakdown or season, only a subset of the total manufacturers from the display 1500 of FIG. 15 are shown. In the each of the sub-breakdowns of the breakdown 1700, the top 2 vehicle types are shown. The breakdown 1700 also includes the total number of targeted households identified by the system and as shown in the screen 1400 and the display 1500.

Figure 18A:
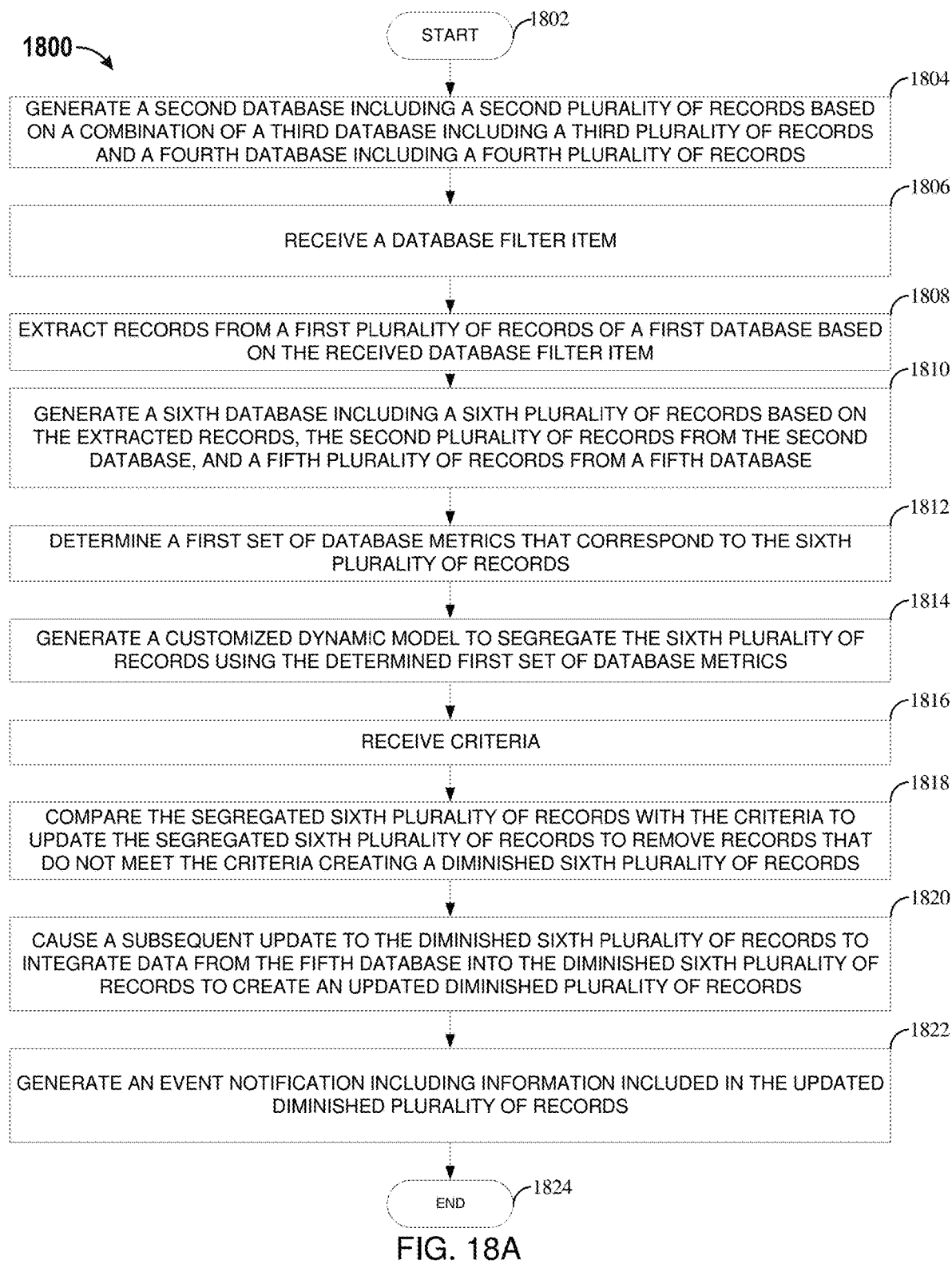
FIGS. 18A and 18B are flowcharts for methods of processing data using dynamic models, in accordance with exemplary embodiments.
Figure 18B:
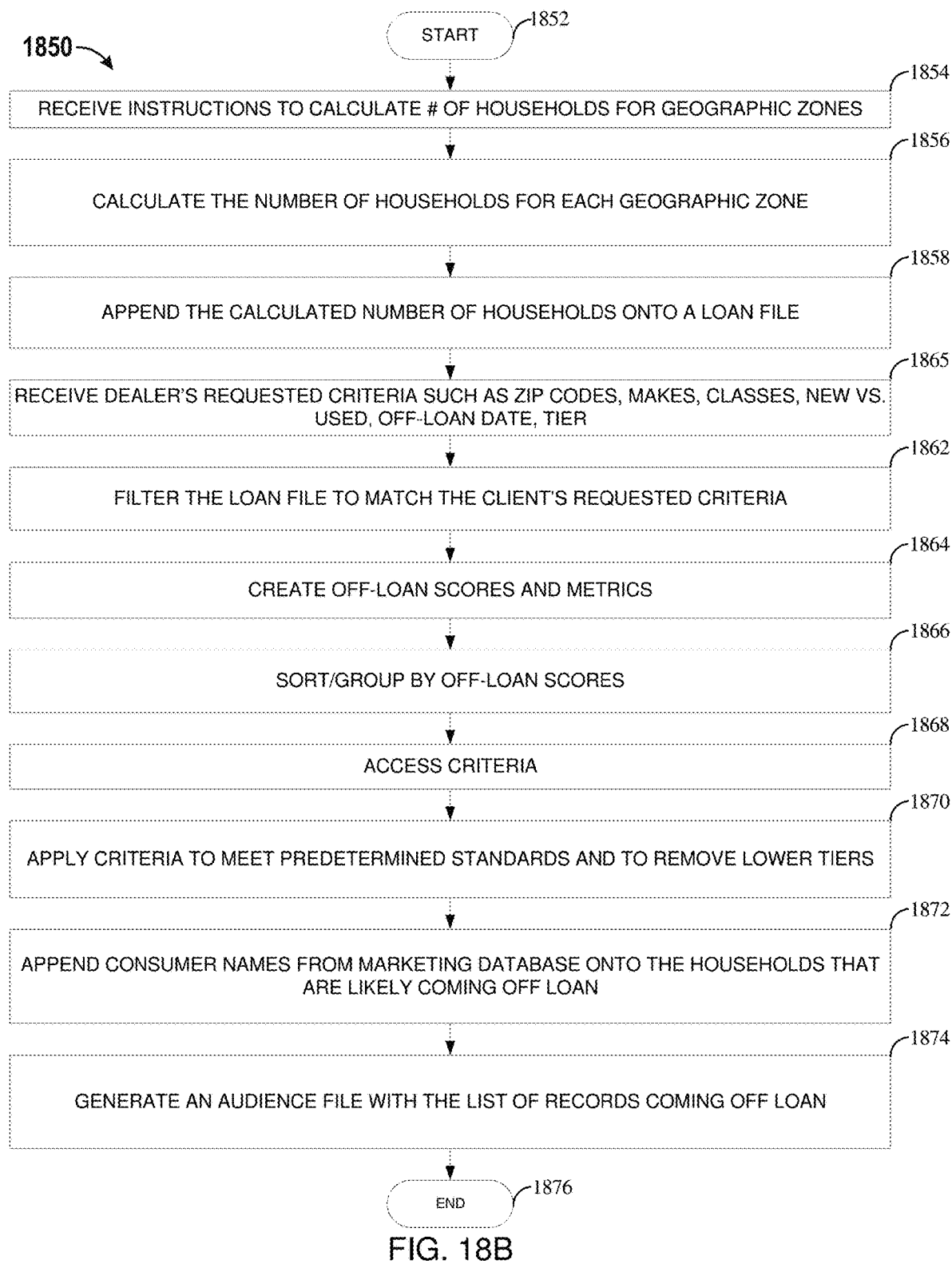

FIGS. 18A and 18B are flow charts for methods of processing data using dynamic models, in accordance with exemplary embodiments. In some embodiments, any of the components described herein (for example, the CPU 202, the I/O interfaces and devices 204, the user interface module 214, and/or the mass storage device 210) of the dynamic modeling system 103 as shown in FIG. 2B) may perform either or both of these methods. The method 1800 of FIG. 18A begins at block 1802.

At block 1804, the CPU 202 may generate a second database including a second plurality of records based on a combination of a third database including a third plurality of records and a fourth database including a fourth plurality of records. At block 1808, the CPU 202 may receive a database filter item. In some embodiments, the filter item may be received via the user interface module 214 and/or the I/O interfaces and device 204. For example, the first filter item comprises one or more filter values, selections, or inputs as received from a user of the dynamic modeling system 103 via the user interface module 214 or a predetermined criteria as received from the mass storage device 210. At block 1808, the CPU 202 may extract records from a first plurality of records of a first database based on the received database filter item. At block 1810, the CPU 202 may generate a sixth database including a sixth plurality of records based on the extracted records from the first data store 104 (for example, the marketing file), the second plurality of records from the second database (for example, vehicle loan records and data), and a fifth plurality of records from a fifth database (for example, geographic data). At block 1812, the CPU 202 may determine a first set of database metrics that correspond to the sixth plurality of records. At block 1814, the CPU 202 may generate a customized dynamic model to segregate the sixth plurality of records using the determined first set of database metrics. At block 1816, the CPU 202 may receive criteria corresponding to predetermined rules or filters. At block 1818, the CPU 202 may compare the segregated sixth plurality of records with the criteria to update the segregated sixth plurality of records to remove records that do not meet the criteria creating a diminished sixth plurality of records. At block 1820, the CPU 202 may cause a subsequent update to the diminished sixth plurality of records to integrate data from the fifth database into the diminished sixth plurality of records to create an updated diminished plurality of records. At block 1822, the CPU 202 may generate an event notification including information included in the updated diminished plurality of records.

The method 1850 of FIG. 18B begins at block 1852. At block 1854, the CPU 202 may receive instructions from a user to calculate a number of households for one or more geographic zones. At block 1856, the CPU 202 may calculate the number of households for each geographic zone based on information in a marketing database. At block 1858, the CPU 202 may append the calculated number of households onto a loan file. At block 1860, the CPU 202 may receive user's requested criteria such as zip codes, makes, classes, new vs. used, off-loan date, tier, and so forth. At block 1862, the CPU 202 may filter the loan file to match the client's requested criteria. At block 1864, the CPU 202 may create off-loan penetration rates, counts, and metrics. At block 1866, the CPU 202 may sort/group the data store by off-loan rates. At block 1868, the CPU 202 may access criteria corresponding to predetermined limits, and so forth. At block 1870, the CPU 202 may apply the criteria to meet predetermined standards and to remove lower tiers. At block 1872, the CPU 202 may append consumer names from the marketing database onto the households that are likely coming off loan. At block 1874, the CPU 202 may generate an audience file with the records coming off lease before ending at block 1876.

XIV. Operation of the System—Example Use Case—Vehicle Equity

Figure 19:
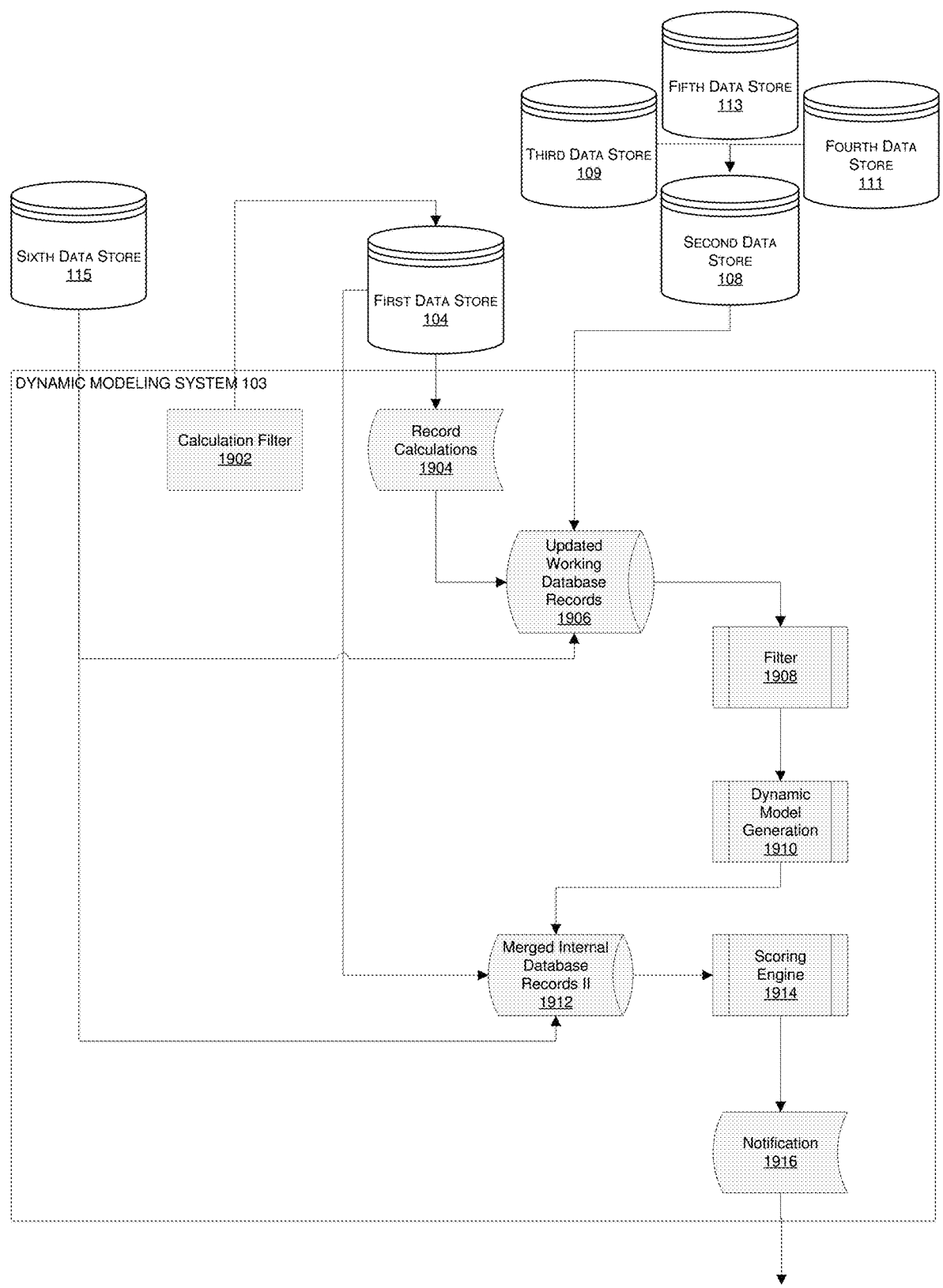
FIG. 19 is a block or data flow diagram of the database system for providing electronic notifications regarding database records, according to another alternate embodiment.

FIG. 19 is a block or data flow diagram of another database system, implemented by the dynamic modeling system 103, for dynamically generating models for processing data sourced from various databases and providing electronic notifications regarding database records, according to another alternate embodiment.

At 1902, the dynamic modeling system 103 accesses a calculation filter update data item. Accessing the calculation filter update data item may comprise receiving an input requesting the calculation, etc. The calculation filter update data item, as described above in relation to the dynamic modeling system 103, may include, for example, instructions to perform specific calculations on database records stored by the system in the first data store 104. Examples of such data items are described below. The system implements the calculation filter update data item on records in the first data store 104. For example, the system queries the first data store 104 for specific sets of data and performs calculations on the data to automatically generate a set of record calculations 1904. Using an example use case for identifying specific events (for example, identifying vehicle equity), the calculate filter update may comprise instructions to calculate a number of households in a geographic zone.

In some embodiments, the first data store 104 stores information about a population such that the calculation filter update data item may execute calculations on specific subsets of the population. For example, using an example use case for identifying equity in vehicles (where prospective clients are identified based on having an equity in one or more vehicles), the first data store 104 may be a consumer demographics or marketing database that stores data on individual consumers as well as information on households and vehicles owned in the household, as described in relation to FIG. 1.

At 1904, the dynamic modeling system 103 generates and stores the record calculations, such as, for example, the calculations along with the corresponding geographic area indicator. For the example use case above, the stored record calculations may include the numbers of households in a plurality of (or single) geographic zones. In some embodiments, the data store includes one or more (or all) items included in the corresponding database record of the first data store 104. These calculations may be reprocessed as the data in the first data store 104 is updated, for example, daily, weekly, monthly, bi-monthly, bi-annually, annually, every 28 days, or according to other schedules, similar to that described with reference to FIG. 1.

Advantageously, storing the calculations and the corresponding geographic area indicators in the records calculation 1904 can speed up later processing by the system, such as, for example, the merging, analysis, dynamic generation of custom models, and/or scoring of one or more records. For example, as described below, by storing a count of the designated categories, such as, for example the households within a specific zip code, those records can be more quickly merged with other data sets that are organized at the zip code level.

The system may also include a second data store 108 which comprises a large set of data which is stored differently from the data in the first data store 104. Using the example use case, the second data store 108 is a combination of one or more of a customer loan data store (for example, the third data store 109), a vehicle purchase data store (for example, the fourth data store 111), and a vehicle valuation data store (for example, the fifth data store 113), any or all of which comprise(s) vehicle debt data and/or vehicle valuation data which have been extracted from an auto market database, or similar, and then matched to third party data. In some embodiments, the second data store 108 comprises vehicle financial data and vehicle valuation data that, in combination, allow for a determination of an equity value for each corresponding vehicle. In some embodiments, the second data store 108 is generated by extracting data from an auto market database which includes data sources such as state department motor vehicle data, manufacturer data, and so forth. For example, the vehicle purchase data and/or the vehicle valuation data is extracted from vehicle services providers (for example, financial or insurance) or vehicle registration databases and is used to identify vehicles within the geographic area that have equity, meaning that the vehicle is worth more than any outstanding balance on the vehicle, via loan or otherwise. In some embodiments, the vehicles identified already have equity (for example, an equity that is greater than or equal to the amount owed or that will be greater than or equal to the amount owed in the near future, where the "near future" is user defined).

The extracted data may include, for example, vehicle make, vehicle type, vehicle model, vehicle manufacturer, as well as the vehicle owner location such as zip code and/or zip code+4 area. The extracted records are then matched to third party data and/or consumer data to determine the amount of equity earned in the particular vehicle(s) and, for example, when that equity amount exceeds a particular value or ratio to the amount owed on the particular vehicle(s). In some embodiments, the extracted records are matched to the third party data and/or consumer data to determine when the vehicle has equity (such as, for example, the month and year, or the day, month, and year, or the quarter and year). The extracted data may also include information on the vehicle segment of the particular vehicle, such as, for example, economy car, sports car, luxury car, and so forth. In some embodiments, the extracted data does not include any owner-identifying information such as name, street address, or social security number, but instead only indicates that a vehicle within a household in a zip code+4 area has an equity value at a certain date.

The second data store 108 may be updated, for example, on various defined schedules, similar to the first data store 104.

The dynamic modeling system 103 may then access a set of data from the second data store 108 and merge those records with the record calculations created in block 1904 at the block 1906. In some embodiments, the dynamic modeling system 103 may also access a set of data from a sixth data store 115 that includes the geographic data. In some embodiments, as noted above, the geographic data in the sixth data store 115 includes or provides location details such as households information, zip code+4, census tract, longitude and/or latitude information, block group, block level, and so forth. The geographic data may be used in the modeling process (for example, in the merged internal database records 1906 below) to generate models and/or perform other analysis specific to a geographic region and/or be appended to the working aggregation files (for example, in the merged internal database records II 1912 below) to generate and/or enrich an audience profile. In some embodiments, the merged internal database records 1906 are stored in a separate file from the second data store 108 and the first data store 104 (and the sixth data store 115), whereas in other embodiments, the merged internal database records 1906 are stored in one of the first data store 104 and the second data store 108 (and/or the sixth data store 115). In some embodiments, there may be some advantages to storing the merged internal database records 1906 in a separate file from the first data store 104 and the second data store 108 (and the sixth data store 115). For example, storing the merged internal database records 1906 separately is advantageous when the accessed set of data is a smaller data set in comparison to the complete set of records in the second data store 108 or, as another example, when the merged internal database records 1906 are stored as a file or in a system that can be more readily read and accessed than the second data store 108. In some embodiments, the merged internal database records 1906 are stored locally within the dynamic modeling system 103, whereas in other embodiments, the merged internal database records 1906 are stored remotely from the dynamic modeling system 103, such as in an external database or in one of the first data store 104 and the second data store 108 (and/or the sixth data store 115). If separate from the first data store 104 and the second data store 108, the merged internal database records 1906 may be processed by the dynamic modeling system 103 without having to further communicate with the first data store 104 or the second data store 108 (or other external data stores) to process the merged internal database records 1206.

Using the example use case, the second data store 108 may include vehicle equity and valuation data that is provided at the household level such that a subset of that household data may be aggregated at a geographic level, such as the zip code level, and merged with the record calculations 1904 that may represent a count of the number of households within a specific zip code set to create merged internal database records 1906. The merged internal database records 1906 may then store data on each zip code set which indicates the number of households in each zip code as well as the households within those zip codes which have a vehicle equity that is greater than or equal to a debt owed on the vehicle or that is about to have the vehicle equity that is greater than or equal to the debt owed.

The system may then apply a filter 1908 using a set of criteria which is stored in or accessed by the dynamic modeling system 103. The filter 1908 may be used to access a filtered subset of data from the merged internal database records 1906. In some embodiments, the subset of the data is stored as a separate database (not shown) from the merged internal database records 1906, whereas in other embodiments, the filtered subset of the data is stored in a temporary memory location (not shown), such as RAM or buffer memory to be accessed for use in the dynamic model generation 1910.

In some embodiments, one or more criteria of the filter 1908 are based on user or client-provided criteria. For example, the user may utilize a computing device to interface with the dynamic modeling system 103 and request information on vehicles of a specific make and class and/or for drivers within a specific set of zip codes as well as those vehicles having particular equity/debt relationships or ratios. In addition, the user may provide other parameters, such as, for example, manufacturer options, model, vehicle class, luxury/non-luxury categorization, equity/debt details or parameters, or other categorizations or options. For example, the user may also provide instruction to include "comparable" options or events, such as, for example, if the user indicated a Toyota Corolla, the system may also include Honda Civic as a "comparable option". The user may also provide instructions to include "upsell/cross-sell" options, such as, for example, if the user indicated a Toyota Corolla, the system may also include Toyota Prius as an "upsell/cross-sell" options even though they may not be considered comparable.

The dynamic modeling system 103 is able to dynamically receive such criteria in real-time and then access the filtered subset of the merged internal database records 1906 dynamically so that the filtered subset accounts for any newly updated criteria from the user. The dynamic modeling system 103 may also aggregate the filtered records from merged internal data base records 1906 to the selected user-provided criteria. Using the example use case, the filter may include criteria from a vehicle dealer requesting information about specific vehicle makes within certain zip codes where the vehicles have particular equity/debt relationships or ratios of will have such equity/debt relationships or ratios within a defined amount of time or time period. For example, the vehicle dealer may request Lexus vehicles within zip codes 60119, 60134, 60175, and 60176 that have or will have equity within the last 3 months or within the next 3 months. After the dynamic modeling system 103 applies the filter, the data set now includes household information for the selected zip codes 60119, 60134, 60175, and 60176. The dynamic modeling system 103 may then aggregate the data using the selected criteria to provide overall calculations including, for example, the number of Lexus vehicle having equity in the last three months or in the next three months, the number of total vehicle loans having equity in the last three months or in the next three months in the selected zip codes, and the number of total households in each zip code in the four selected zip codes, and/or the number of target households in each zip code in the four selected zip codes.

The dynamic modeling system 103 may perform various counts, calculations, metrics, or other analyses of the filtered subset. As one example, the dynamic modeling system 103 may calculate an equity percentage rate by comparing the total number of households within the selected zip codes with the total number of households that have equity/debt ratios that meet a threshold within the zip codes and which also meet the selected vehicle criteria, if any. In some embodiments, if there are any groups that have less than a certain number of households (for example, 4, 10, or 50) or groups that have an equity percentage rate greater than or equal to a certain number criteria (for example, 95%, 98%, or 100%), then the dynamic modeling system can combine groups within, for example, the same zip codes in order to increase the group size to at least the set number of households and create the equity percentage that meets the percentage criteria.

In some embodiments, the dynamic modeling system 103 stores the aggregated household data at the geographic/parameter level such that a record is created for each geographical/parameter combination and the total number of households with the desired equity that matches the set of parameters is calculated. Storing the data at this level helps improve the processing speed and memory allocation which can be important for use when generating the models using this data.

In addition, the dynamic modeling system 103 may dynamically generate and apply a modeling algorithm that groups the filtered subset based on the filter criteria to determine a prediction or a likelihood estimation 1910. The dynamic modeling system 103 may utilize the filter criteria to generate the custom model. Using the example above, the dynamic modeling system 103 may take the filtered set of vehicle data for a specific set of zip codes (which includes the household count information and the equity percentage) to dynamically generate a custom modeling algorithm that groups together households by optimizing their likelihood of having the desired equity and being associated with certain models and makes within a specific time frame to generate a new model that calculates the likelihood of a specific household having the desired equity. In some embodiments, the dynamic modeling system 103 sorts the geographical zones by the equity percentages, and creates tiered groups of zones. For example, the tiered groups of zones may be based on the equity percentage where tier A may be zones with equity percentage of >65% but <100%, tier B may be zones with an equity percentage of >30% but <=65%, tier C may be zones with an equity percentage of <=30%. In some embodiments, the dynamic modeling system 103 removes or flags zones that do not meet the acceptable tier levels or equity percentages.

Depending on the embodiment, the dynamic modeling systems discussed herein may use various techniques for generating models, such as machine learning techniques that may include artificial intelligence such as neural networks, genetic algorithms, clustering, or the like. Machine learning may be performed using a training set of data. The training data may be used to generate the model that best characterizes a feature of interest using the training data. In some implementations, the class of features may be identified before training. In such instances, the model may be trained to provide outputs most closely resembling the target class of features. In some implementations, no prior knowledge may be available for training the data. In such instances, the model may discover new relationships for the provided training data. Such relationships may include similarities between data elements such as transactions or transaction categories as will be described in further detail below.

The dynamic modeling system 103 may also apply various rules to determine whether the data meets predetermined criteria or error levels. In some embodiments, the dynamic modeling system 103 removes, discards, or ignores data that does not meet such criteria or error levels. The remaining data may represent a working data set which can then be stored in a temporary memory location, such as RAM or buffer memory or in a permanent memory.

The dynamic modeling system 103 may then merge the working data set with data from the first data store 104 to generate merged internal database records II 1912. In some embodiments, the merged internal database records II 1912 also includes data merged from the sixth data store 115, which includes the geographic data. For example, the geographic data may be appended to the results from the working data set to assist in generating scoring details and/or add other value based on the geographic details. In some embodiments, the merged internal database records II 1912 are stored as a new database whereas in other embodiments, they are stored in or within the merged internal database records 1906. Using the example use case above, the dynamic modeling system 103 may merge the selected geographic groups with marketing data or with records from the first data store 104 to provide marketing information for the set of households in the selected zones or zip codes. In some embodiments, the marketing information is provided for all of the households in the selected zip codes, whereas in other embodiments, the marketing information is only provided for a subset of the households in the selected zip codes.

At 1914, the dynamic modeling system 103 may then generate a model score for each record and append the scores onto the records or groups of records. However, it is recognized that in other embodiments, scores are not included as the fact that the record remains within the merged internal database records II 1912 indicates that the dynamically generated custom model has determined that they are a viable contact. Using the example above, the dynamic modeling system 103 may then append a score onto each record to indicate whether that specific record is in one of the selected geographic groups where some subset of the households within the group likely have a desired equity for the selected vehicle make(s). The scores may include tier indicators, an estimated accuracy rate, a number, an alphanumeric identifier, or any variety of scoring indicator.

At 1916, the dynamic modeling system 103 may also generate and may generate an output file on a periodic basis, for example daily, weekly, monthly, bimonthly, quarterly, semiannually, and so forth) and send a notification alert or notification package. The generated notification package or alert may comprise a digital and/or electronic message. The notification package may include an indication of the corresponding records from the merged internal database records II 1912 along with their corresponding scores, and any other data items from the corresponding record. In other embodiments, the notification package may be an indication to the user that user should access the dynamic modeling system 103 to review the records from the merged internal database records II 1912 and/or the scores. The notification may be sent to the user that provided the filter criteria, and/or to any other recipient indicated by the user or the notification package. Further, the notification package may be delivered by any appropriate mode. Using the example above, the dynamic modeling system 103 may send a notification package that comprises information on households that most likely have an equity as well as a score that indicates the relative likelihood. The notification package may indicate the households that are located within the better performing geographical areas. The notification package may include one or more of the following fields for each household: name, address, city, state, zip code+4, period during which the vehicle has equity, score, and/or tier.

In some embodiments, the alert and/or notification is automatically transmitted to a device operated by the user associated with corresponding notification, as described above in relation to FIG. 1.

In various implementations, filter criteria changes may be made continuously, in real-time or substantially real-time, and/or in batch. In various implementations, record changes may be evaluated continuously, in real-time or substantially real-time, and/or in batch. In various implementations, notification may be generated and/or sent continuously, in real-time or substantially real-time, and/or in batch.

In various implementations, the first data store 104, the second data store 108, the third data store 109, the fourth data store 111, the fifth data store 113, and the sixth data store 115, the record calculations 1904, the merged internal database records 1906, the merged internal database records II 1912, and/or any combination of these databases or other databases and/or data storage devices of the system may be combined and/or separated into individual databases.

XV. Generating Dynamic Models—Example Use Case—Equity and Debt Data

Figure 20:
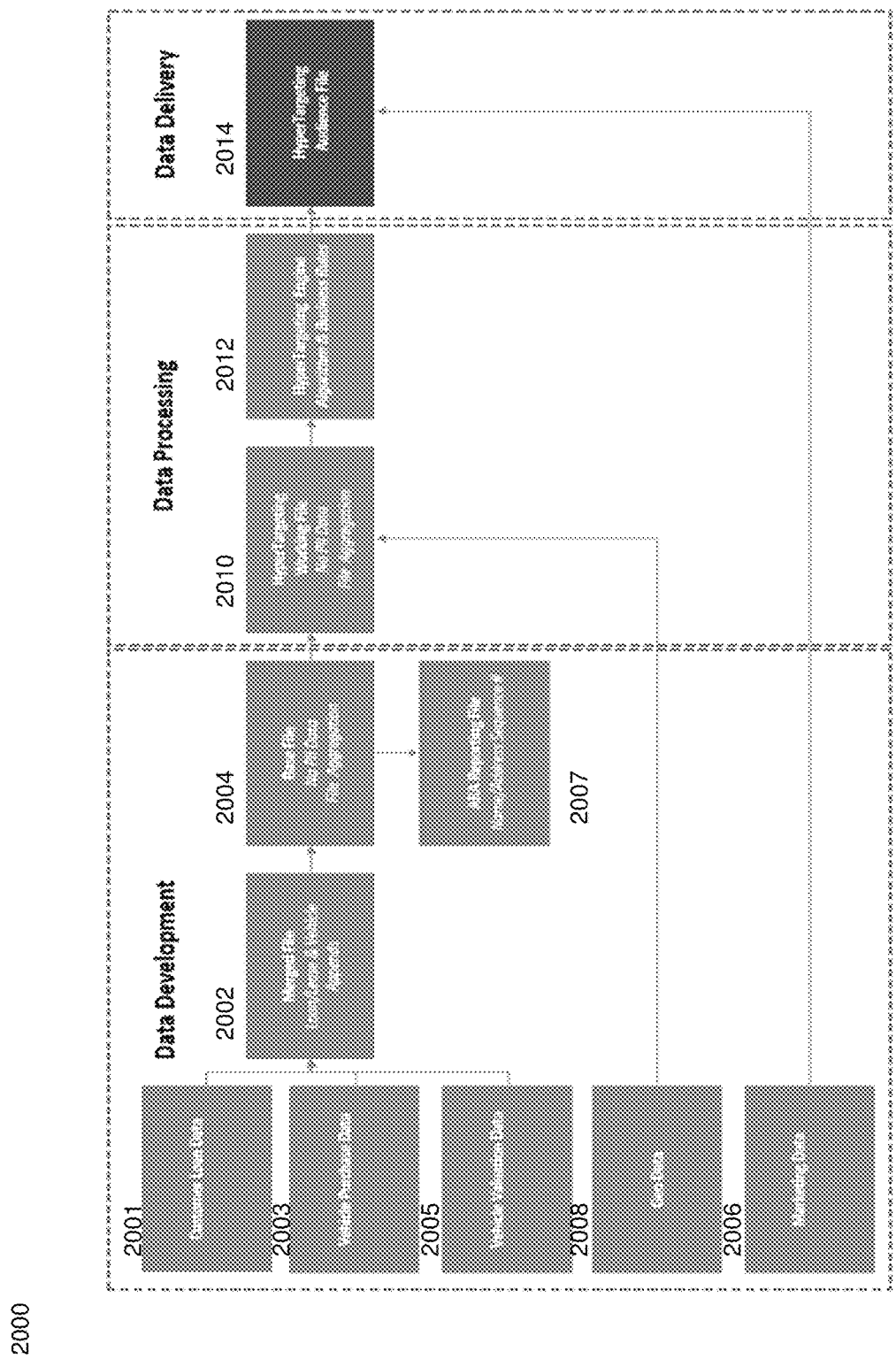
FIG. 20 is an example of one embodiment of a flowchart for processing information from multiple sources and generating dynamic models based on the data from the sources.

FIG. 20 is an example of one embodiment of a flowchart for a method, process, or data flow diagram 2000 for processing information from multiple sources and generating dynamic models based on the data from the sources. The method 2000 includes various blocks used to process information from multiple sources and generating dynamic models based on the information from the multiple sources. The method 2000 may be run simultaneously, in an overlapping manner, or sequentially based on inputs or requests from multiple dealers, manufacturers, or other entities that are each accessing the dynamic modeling system 103 via one or more terminals 102 or computing devices 106. The various blocks of the method 2000 may be performed by one or more components of the dynamic modeling system 103 as described in relation to FIG. 2B. For example, one or more blocks of the method 2000 may be performed by one of the processor 202, the modeling module 215 (or one of the models generated by the dynamic modeling system 103), the data stores 104, 108, 109, 111, 113, and/or 115, the quality module 217, or the report module 216. In some embodiments, one or more of the blocks of the method 2000 are implemented by one or more of the other components of the dynamic modeling system 103, as referenced in FIG. 2B. In some embodiments, the blocks of the method 2000 are performed in a sequential manner, while in other embodiments, the blocks of the method 2000 may be performed in a non-sequential manner, regardless of the terminology used to describe the method 2000 herein. A person having ordinary skill in the art will appreciate that the method 2000 may be implemented by other suitable devices and systems. Although the method 2000 is described herein with reference to a particular order, in various aspects, blocks herein may be performed in a different order, or omitted, and additional blocks may be added.

As shown, the method 2000 may comprise five data input or source blocks: at block 2001, the method 2000 comprises receiving, accessing, or generating a customer loan data file, at block 2003, the method 2000 comprises receiving, access, or generating a vehicle purchase data file, and at block 2005, the method 2000 comprises receiving, accessing, or generating a vehicle valuation data file, and at block 2002, the received loan data file, vehicle purchase data file, and vehicle valuation file are merged. At block 2004, the merged loan data, vehicle purchase data, and vehicle valuation data is parsed to remove any unnecessary or undesirable data. At block 2007, an analysis block provides a historical review of purchase rates in the records being analyzed in the method 2000. For example, the block 2007 allows for verification and/or identification of what combinations of inputs have resulted in purchases. The block 2007 analysis may provide information that integrates how historical purchase rates can be used to understand the inputs can be analyzed to predict future purchases.

At block 2006, the method 2000 comprises receiving or accessing a marketing database. At block 2008, the method 2000 comprises receiving or access geographic data file. Each of these data input, analysis, or source blocks will be described in further detail in relation to the method 2000 below.

In some embodiments, the method 2000 may begin at or include block 2002, where the loan data, vehicle purchase data, and/or vehicle valuation data are received or accessed from blocks 2001, 2003, and/or 2005. For example, obtaining or accessing the loan data, vehicle purchase data, and/or vehicle valuation data may comprise reviewing or accessing one or more data files, databases, or reports 2001, 2003, and 2005 that include a listing of customer loan data, vehicle purchase data, and vehicle valuation data or information (for example, loan and debt information and/or vehicle valuation information regarding vehicles that have equity within a time period around a date). Information used to generate the one or more reports of the loan data, vehicle purchase data, and/or vehicle valuation data may include information from vehicle databases (for example, new vehicle registration databases associated with state departments of motor vehicles ("DMVs") and/or from third party archives (for example, providing dates and other details regarding entrance into loans, loan payments, and so forth)). For example, one or more fields may be extracted from the vehicle database and used in conjunction with information from the third party archives to identify the parameters of vehicle loans (for example, expiration of loan, loan payments, equity, etc.) for entries in the customer loan data, vehicle purchase data, and vehicle valuation data file. Accordingly, the customer loan, vehicle purchase, and/or vehicle valuation file may be generated based on information received from one or more other databases. In some embodiments, the third party data is already included in the customer loan, vehicle purchase, and/or vehicle valuation file and/or the various source databases. In some embodiments, the customer loan, vehicle purchase, and/or vehicle valuation file may include title state, vehicle information (for example, year, make, model, and so forth), loan term, loan maturity date, loan payment, equity amount, amount owed, among others. In some embodiments, the loan maturity date or amount of equity or debt may be calculated based on a reporting period date (for example, a range of dates for which the customer loan, vehicle purchase, and/or vehicle valuation records are compiled and searched).

In some embodiments, the block 2002 may be performed by one of the processor 202, the user interface module 214, the I/O interfaces and device 204, and so forth. In some embodiments, the customer loan, vehicle purchase, and/or vehicle valuation file may comprise data from the data store 104 and/or 108 that relates to vehicles that have equity within a period of time. In some embodiments, obtaining or accessing the customer loan, vehicle purchase, and/or vehicle valuation file may comprise or be based on receiving an input or request from the user about target potential clients.

For example, the user may request a listing of households or people in a particular geographic area or region that are likely to have equity within a particular time period. In some embodiments, the request may include details of the geographic area to be searched as well as the time period to search. In some embodiments, the request may also include additional information such as details of make, model, or type of vehicle that the households or people currently have equity amounts for, which may be used for filtering. The request may also include a request for information for the households or people identified in the geographic area that has a strong likelihood of having consumers that may meet the requirements of the request. In some embodiments, as described herein, the user may comprise one or more of a dealer, manufacturer, financial service provider, or a related entity. Obtaining or generating the consumer loan, vehicle purchase, and/or vehicle valuation file may further comprise the dynamic modeling system 103 submitting a request to the customer loan, vehicle purchase, and/or vehicle valuation data stores based on the request received from the user. For example, the request to the customer loan, vehicle purchase, and/or vehicle valuation data store may include the time period to be searched. In some embodiments, the request to the customer loan, vehicle purchase, and/or vehicle valuation data store also includes the geographic area from which data is requested.

In response to the request to the customer loan and/or vehicle purchase data store, the dynamic modeling system 103 may receive loan, valuation, and/or vehicle data that includes details of one or more vehicles that have equity in the identified time period. The details for each vehicle may include manufacturer information, model information, zip code information (potentially including zip code+4 information) and a quantity for that vehicle (or similar vehicles) that exists in that zip code. The received data from the customer loan, vehicle purchase, and/or vehicle valuation data store may be used to generate an equity file that is further processed by the dynamic modeling system 103.

At block 2006, a marketing database may be obtained or generated from data received from the marketing database (for example, the first data store 104). Similarly, block 2006 may also be performed by one of the processor 202, the user interface module 214, the I/O interfaces and device 204, and so forth. In some embodiments, the marketing database 2006 may comprise data from the marketing database that relates to households or consumers within a geographic area or region. The marketing data available from the marketing database 2006 may include demographic or similar data for every household in the United States. In some embodiments, obtaining or generating the marketing database 2006 may comprise or be based on receiving an input or request from the user about target potential clients. For example, the user may request the listing of households or people in a particular geographic area or region that are likely to have vehicles having equity within a particular time period, as discussed herein. Obtaining or generating the marketing database 2006 may further comprise the dynamic modeling system 103 submitting a request to the marketing database 2006 based on the request received from the user. For example, the request to the marketing database 2006 may include the time period to be searched. In some embodiments, the request to the marketing database 2006 also includes the geographic area from which vehicle and/or user data is requested.

In response to the request to the marketing database, the dynamic modeling system 103 may receive or access marketing data that includes address information, contact information, names, and zip code for households in the geographic area. The received data from the marketing database may form the marketing database that is further processed by the dynamic modeling system 103.

At block 2010, the dynamic modeling system 103 calculates a total number of households in each zip code+4. In some embodiments, the total number of households may be calculated based on one or more of the customer loan data, vehicle purchase, vehicle valuation, and marketing data obtained, accessed, or generated by the dynamic modeling system 103. In other embodiments, other geographic sets could be used, such as zip code, a collection of zip codes, zip codes within a county, and so forth. The data from these databases may be summarized and otherwise aggregated based on geographical areas or regions to calculate the number of households in each geographical area or region.

Also at block 2010, the dynamic modeling system 103 may merge data from the marketing database and data from the customer loan, vehicle purchase, and/or vehicle valuation and geographic data files. In some embodiments, this may involve merging the number of households calculated into the customer loan, vehicle purchase, and/or vehicle valuation file. The data may be merged so that the merged data file includes (for each geographic area) the number of households in the geographic area and the vehicle and/or user information in the geographic area. In some embodiments, the merging of these files and the calculation of the total number of households may be done on a regular basis, for example, quarterly, monthly, weekly, daily, hourly, and so forth or in some batch mode so that the merged data file is ready for when the user request is received. In other embodiment the merging and calculating may be done after receipt of the user request.

The various details from the user request may be identified. For example, one or more of the identified geographic area, makes, models, classes, and time period may be identified from the user request. At block 2012, these criteria may be applied via, for example a filter, to the merged customer loan, vehicle purchase, and/or vehicle valuation file and marketing database (for example, the merged data file) to filter the merged data file to only include data based on the user request (for example, only showing the requested makes, models, and so forth). By filtering the merged data file, the dynamic modeling system 103 may be able to focus on only data relevant to the user's specific request and reduces processing of unnecessary or worthless information.

Also at block 2012, the dynamic modeling system 103 may create various audience metrics to provide to the user. For example, the dynamic modeling system 103 may calculate or create various metrics based on the merged data file. For example, the dynamic modeling system 103 may create event percentage metrics. Based on the merged data file (which includes the number of households in the geographic area having vehicles with equity and the total number of households in the geographic area), the equity percentage metrics may be calculated. For example, an equity percentage rate may be calculated based on dividing the number of households having vehicles having equity by the total number of households in the geographic area. As one example, the equity percentage for each zip code+4 may be defined as the total number of vehicles having the equity in that zip code+4 that match the user's criteria divided by the number of households in that zip+4.

The merged data file may be reviewed or processed by the dynamic modeling system 103 to confirm that each zip code+4 is only listed one time in the merged data file (for example, that there are no duplicates in the file). The dynamic modeling system 103 may also confirm a value indicating the total number of vehicles having the equity is cumulative for each zip code+4 so that all vehicles having the equity are carried through when records are merged or consolidated. In some embodiments, the dynamic modeling system 103 may apply an aggregation algorithm to form one or more zones to meet pre-defined criteria. For example, if one of the zip code+4 zones only includes 3 households when at least 4 households are required or desired, then the dynamic modeling system 103 may aggregate that zip code+4 zone with another zip code+4 zone, for example, selecting the second zip code+4 zone that gets the closest to the minimum 4 households.

As another example, if there are any groups that have less than four households or an equity percentage greater than or equal to 100%, then the dynamic modeling system 103 may combine zip code+4 regions within the same zip code in order to increase the group size to at least 4 (or some other pre-defined criteria) and/or to create an equity percentage that is less than 100% (or some other pre-defined criteria). After zip code+4 areas are combined, the device calculates new equity percentages for each remaining group. The dynamic modeling system 103 may utilize best matching algorithms or other algorithms to match up and aggregate each of the zones that do not meet the criteria. When creating the groups, the dynamic modeling system 103 may calculate the number of households left in the merged data file that have not already been assigned to a group (for example, total number of households in the merged data file minus the cumulative number of households) and then continue with the grouping until all of households have been assigned to a group. In other embodiments, there may be one or more households or zones that are not assigned to a group.

The dynamic modeling system 103 may also calculate the number of vehicles coming having the equity in the group, the number of households in the group, and the equity percentage within each group—the total number of vehicles having the equity in the group divided by the total number of households in the group—which may be based on the user-identified criteria or overall based on the cumulative number of households. Any or all of these metrics may be provided to the user (for example, the audience). In some embodiments, the historical purchase may be used to update one or more metrics or update how a metric is determined. For example, historical purchase rates may show how different combinations or weightings of inputs may change corresponding purchase rates and update the metrics to better provide predicted results based on historical results.

Also at block 2012, the dynamic modeling system 103 may dynamically generate and apply custom models based on the user's criteria to determine groups of households by optimizing their likelihood of having vehicles that have equity. The models may be based on geographic areas and/or the calculated event rates. As one example, after the zones have been aggregated such that they comply with any rules or requirements from the user, the merged data file may then be sorted from high to low based on the calculated equity percentage for each zone (or aggregated zone). Additionally, the dynamic modeling system 103 may generate other calculations such as, for example, a cumulative total number of households, a cumulative total number of vehicles having the equity for each record in the merged data file, and/or the total number of households in the whole file and merge that total number back into every record on the file.

The groups may be sorted into various tiers, where the highest tier includes zones (or aggregated zones) within which the households are most likely to have the equity/debt ratio greater than or equal to 1.0 and where the lowest tier includes zones (or aggregated zones) within which the households are least likely to have the equity within the identified time period. The models may automatically make adjustments to the grouping.

Additionally at block 2012, one or more rules may be applied to the models and generated groups to confirm that any data requirements are met as such the model may be adjusted or calibrated to comply with predefined criteria. For example, the dynamic modeling system 103 may confirm that each created group includes at least four households as identified by the marketing database and has an equity rate of less than 100%. In some embodiments, the dynamic modeling system 103 may confirm that the groups have more or less households and may establish an equity rate threshold of any other value. The groups may be created with a goal of maximizing or increasing the equity percentage within each group that is created.

At block 2014, additional data from the marketing database may be merged into the merged data file for the identified households for one or more tiers of groups. For example, the marketing database may merge households or records identified in the top tiered group (for example, the group with the most households likely to have the equity in the time period) with corresponding information, and so forth, and may not be merged into the households or records in lower tiers. In other embodiments, the marketing database data may be merged for all records in all groups.

Also at block 2014, the dynamic modeling system 103 may assign model scores to each record in the merged data file to indicate a likelihood that a specific record has the equity for the specific criteria. The model score may be based on the assigned tier and/or the zone in which the record is related. In some embodiments, the model scores may also indicate a confidence level that the record is correct or accurate. In some embodiments, records may be removed or reorganized in the groups based on the model scores and/or confidence levels.

Also at block 2014, the dynamic modeling system 103 performs quality checks on the records in the merged data file. The quality checks may confirm that only information meeting corresponding requirements is released to the user. The quality checks may also confirm that the records are appropriately grouped and that only records for the desired geographic area and for the identified makes, models, event, time period, and so forth, are included in the records generated for the user.

In some embodiments, historical purchase records may be used to update one or more aspects of assigning model scores to records. For example, historical purchase rates, etc., may show how different combinations or weightings of inputs may change corresponding purchase rates and update the scoring basis to better provide predicted results based on historical results. Thus, the scores would better reflect expected vehicle purchases, leases, etc.

In some embodiments, the quality checks may include verifying that there are no groups with equity percentages greater than or equal to 100% and no groups with less than four households. An additional example quality check may include verifying a number of zip code+4 areas in the merged file is equal throughout the processing, that a total number of households is equal throughout the processing, and that a total number of vehicles coming having the equity is equal throughout the processing.

At block 2014, the dynamic modeling system 103 generates the output notification package (for example, an electronic report) for the user including one or more of the records and/or groups for the identified geographic region, vehicle information, tier information (for example, the tiered group), and the model score. In some embodiments, the electronic report may be automatically transmitted to the user once generated by the dynamic modeling system 103. In some embodiments, the electronic report may be viewed by the user by accessing the electronic report via the dynamic modeling system 103. In some embodiments, the electronic report may be printed and electronically sent to the dynamic modeling system 103. Thus, the user may receive various information that can be used to target potential clients that are known (or known to be reasonably likely) to have an equity in the desired time period.

XVI. User Interfaces—Example Use Case—Equity Data

Figure 21:
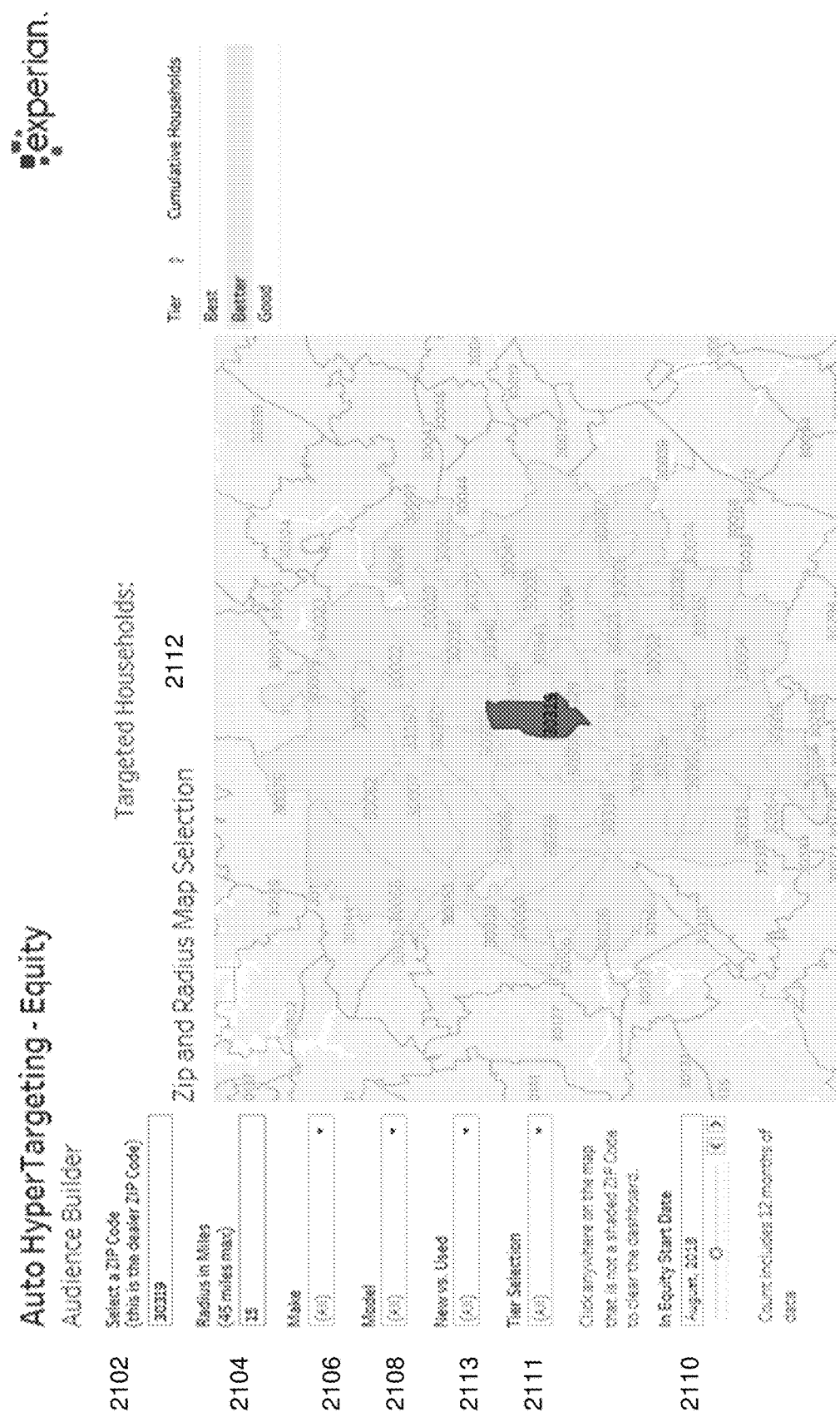
FIG. 21 is an example interactive user interface (or graphical user interface or "GUI") including screen that provides an off loan tool usable by a user for input selection, in accordance with an exemplary embodiment.

FIG. 21 is an example interactive user interface (or graphical user interface or "GUI") including screen 2100 that provides an off loan tool usable by a user for input selection, in accordance with an exemplary embodiment. Advantageously, the interactive user interface allows user to interact with various elements of the GUI, e.g., by touching or otherwise selecting and/or manipulating the elements, to receive input from the user and provide dynamic updates to the user via the GUI, such as in response to processing large amount of data based on inputs provided by the user via the GUI and providing real-time updates to the GUI in some embodiments.

In this embodiment, the equity tool may provide the client with an ability to review records for vehicles having the equity in a particular geographic radius around a selected zip code in a particular period of time. The radius and selected zip code may correspond with a coverage area or radius around a single dealer rooftop or a particular geographic radius around multiple dealer rooftops in a selected zip code.

The example screen 2100 may include various values that are user customizable and that may initiate updates to the GUI in response to adjustment of the values. A first value 2102 may correspond with a zip code based on which the user wants the equity tool to generate a report of percentages of all vehicles having the equity in a period of time. In some embodiments, the zip code selected by the user may be centrally located in a particular geographic region. For example, the value 2102 may default to the zip code of the user (for example, of a dealer rooftop, manufacturer site, or financing service provider office, etc.).

The example screen 2100 further includes a radius value 2104. The radius value 2104 may indicate a radius around the zip code value 2102. In some embodiments, the radius value 2104 may be, for example, in a range of 0 to 45 miles and may be user selectable with a manually entered value or with a slider bar to adjust the value. The range may instead be in a range of 0 to 10 miles or 0 to 20 miles or any other range. For example, the radius may be set at increments of 0.5 miles or 1 mile or 5 miles. In some embodiments, the GUI may include a geometric (e.g., circular, oval, rectangular, etc.) or free form selection tool that allows the user to select an area of a map for analysis.

The example screen 2100 also includes a selection 2106 for selecting one or more vehicle makes. The selection 2106 of vehicle makes may utilize a multiple selection capable drop down menu that allows the user to identify one or more vehicle makes that the user wants to use in the report generated by the equity tool. For example, the user may select one or more manufacturers (for example, Ford, GM, Lincoln, and so forth) that best fits the user market and target audience (for example, competitors, known clients, and so forth). Selection 2108 provides a multiple selection drop down menu by which the user selects one or more models associated with the one or more selected makes or manufacturers from selection 2006. By selection 2008, the user identifies one or more vehicle models which the user wants to use in the report generated by the equity tool.

The example screen 2100 also includes a date 2110 selection menu that allows the user to select or identify a date or range of dates within which the user wishes to identify vehicles having the equity and having the selected vehicle attributes (for example, makes and models described above). In some embodiments, the date or range of dates may be a single day or a range of many weeks within, for example, an 18-month window.

The example screen 2100 includes a map 2112 that identifies zip codes that will be searched based on the entries in the values 2102 and 2104 described above. For example, the zip code identified in zip code value 2102 may be shaded with a first shade or pattern and positioned generally in a center of the map 2112. The map 2112 further identifies zip codes that fall around the zip code value 2102 and those zip codes that fall within the radius in value 2104 may be shaded with a second shade or pattern. In some embodiments, only zip codes that fall entirely within the radius value 2104 may be shaded or identified. In some embodiments, any zip code that falls at least partially within the radius value 2104 may be shaded or identified. In the map 2112, the zip code 30319 may be the selected zip code value 2102 and the shaded zip codes surrounding the 30319 zip code are the zip codes that will be searched for households with vehicle equity.

The example screen 2100 shows a tier selection value 2111 that allows the user to select only those results that meet particular tiers. For example, the tiers may correspond to the tiered groups described above, where tiered groups of zones maybe based on the equity percentage. For example, tier A may be the "best" tier including geographic zones with equity percentage of >65% but <100%, tier B may be the "better" tier including geographic zones with an equity percentage of >40% but <=65%; tier C may be the "good" tier including the geographic zones with an equity percentage of <=40%. By selecting a particular tier, only those households that fall in the selected tier may be shown in the example screen 2100 and the resulting report.

The example screen 2100 also allows selections for new/used vehicles 2113 (allowing selection between new and used vehicles.

In some embodiments, the client may individually select (or hover over) each shaded zip code to see information specific to the selected zip code.

Figure 22:
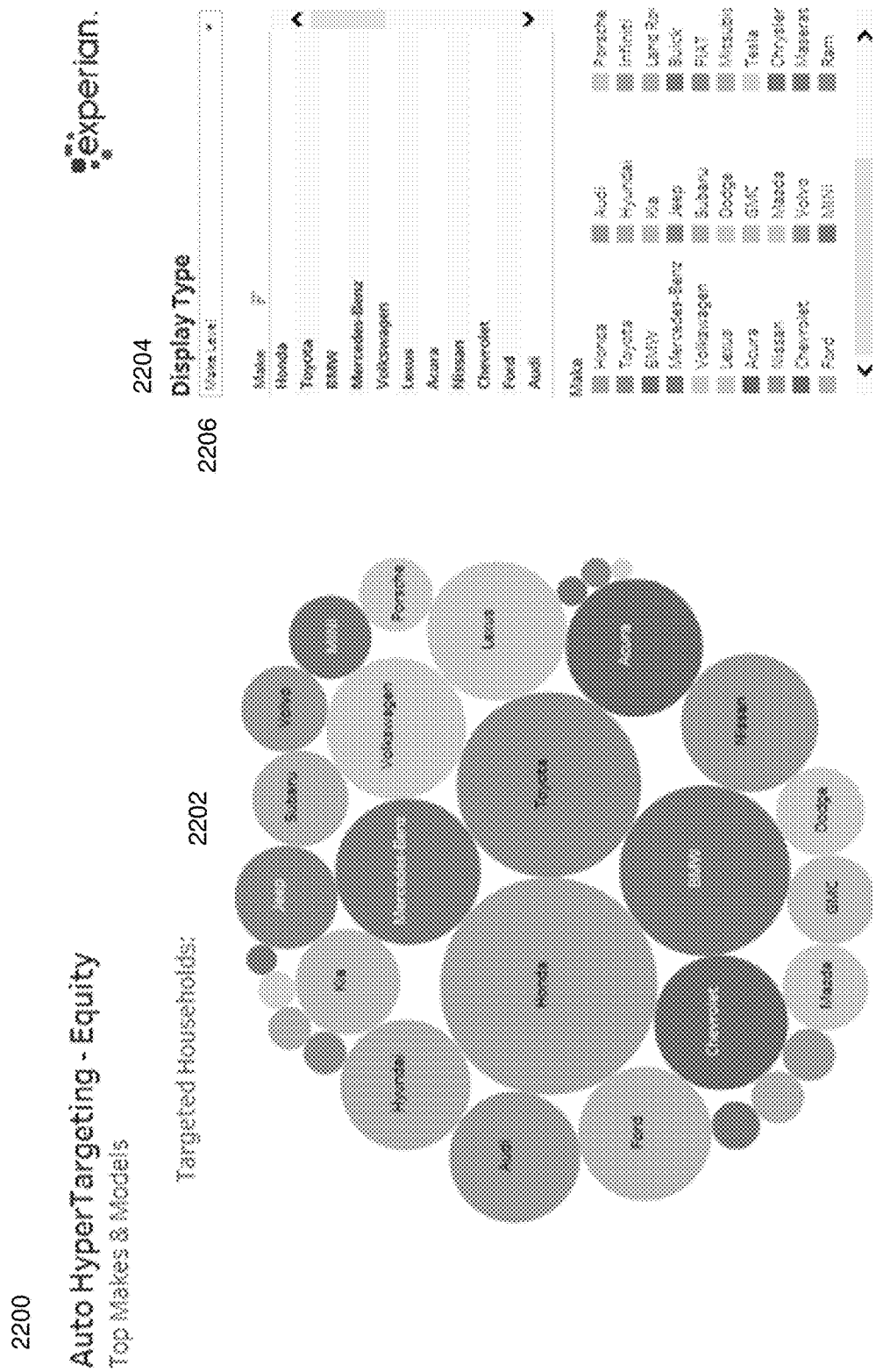
FIG. 22 is an example of a breakdown ranking or listing of a number of targeted households, identified by make, having a vehicle having a specified equity in a specified geographic region from the equity tool of FIG. 21, in accordance with an exemplary embodiment.

FIG. 22 is an example of a graphical and numerical display 2200 depicting a number of targeted households that have a vehicle equity within a predefined time period that are within a particular geographic area identified by the zip code value 2102 and the radius value 2104 of FIG. 21. In some embodiments, the display 2200 may be presented to a user as part of a GUI that is displayed on a user's computing device. In some embodiments, the GUI may include various representations or values for comparison, such as interactive elements that are selectable to cause display of more detailed information regarding the selected item. The geographic area with which the display 2200 relates is indicated by the map 2112.

The display 2200 includes, as shown, a graph 2202 of circles of varying sizes or areas for a plurality automobile manufacturers, where the size or area of the circle is indicative of a corresponding value or number of vehicles by the respective manufacturer within the geographic area that have events identified by the system. For example, a larger sized circle corresponds to a larger number of vehicles by the respective manufacturer associated with an event within the geographic area and a smaller sized circle corresponds to a smaller number of vehicles by the respective manufacturer. The display 2200 includes a table 2204 that provides the numbers of vehicles associated with each manufacturer and also provides the key associating each manufacturer with one of the circles on the graph 1502. In some embodiments, the manufacturers shown in the display 2200 may correspond to the selection 2106 of vehicle makes, such that the manufacturers shown on the display 2200 depends on the makes selected at the selection 2106.

Additionally, the display 2200 includes a drop down selector 2206 that allows a selection of one of the attributes that are selectable with the selectors 2106, 2108, 2110, 2111, and 2113 on the screen 2100 of FIG. 21. As such, the display 2200 can be used to show breakdowns according to any of the selections available on the screen 2100 for ease of review. Accordingly, the values and information shown in the table 2204 may change according to the data in the selections on the screen 2100. The table 2204 includes a column for the number of target households and a column for the breakdown being depicted (for example, the manufacturer, model, fuel type, luxury/non-luxury, etc. This is one data visualization example. There are a multitude of ways to view the data based on the selected criteria(s), with other options including, but are not limited to, household counts, historical purchase rates, purchase timing, vehicle segments, and so forth.

Figure 23:
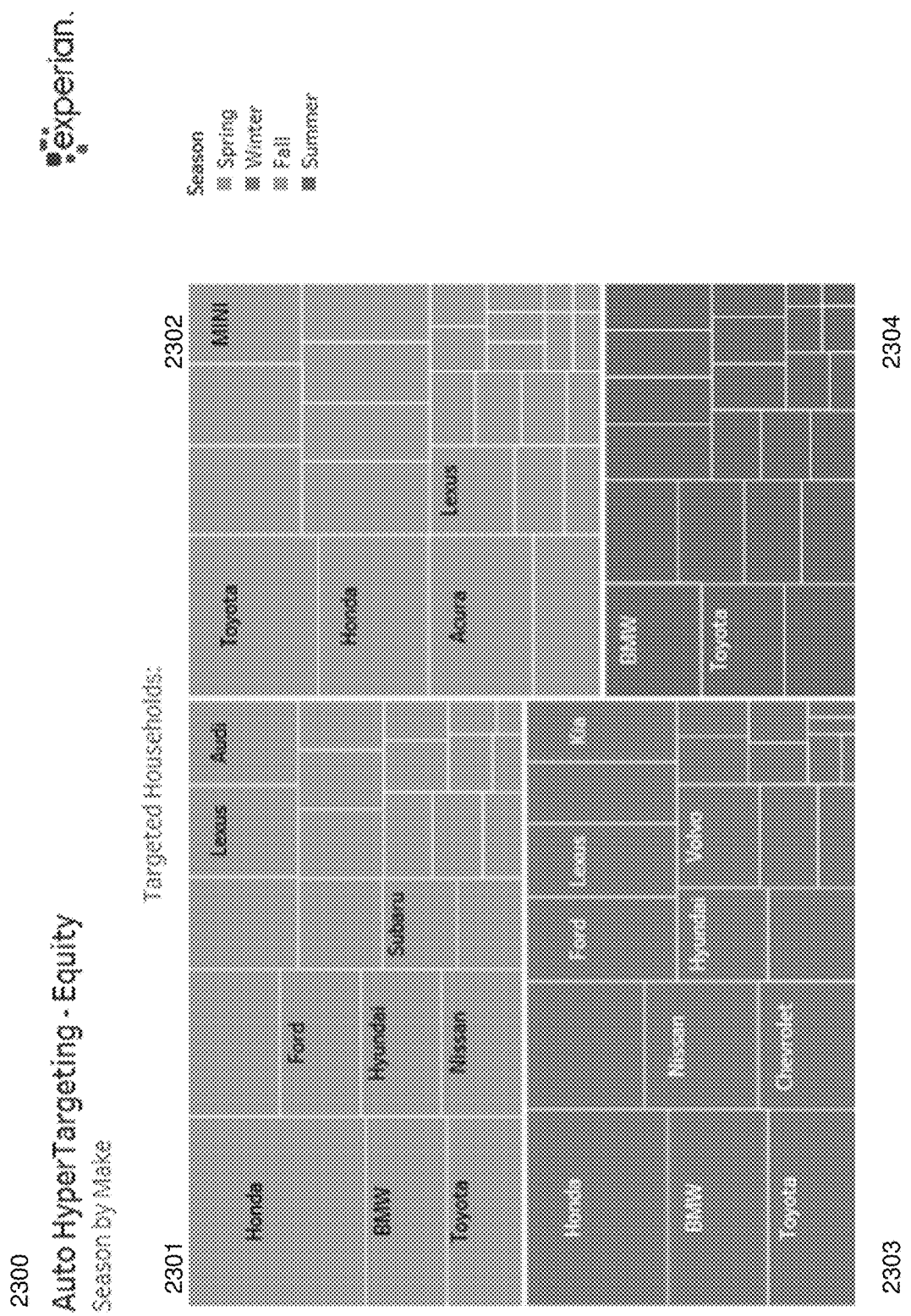
FIG. 23 is an example of a breakdown ranking or listing of the number of targeted households, identified by make, having a vehicle having the specified equity in the specified geographic region and in a specified season, in accordance with an exemplary embodiment.

FIG. 23 is an example of a breakdown 2300 of the number of targeted households associated with the equity in the specified geographic region shown on the graph 2100 of FIG. 21 according to vehicle make, where the vehicle purchase date being in a specified season. As shown, the breakdown 2300 includes four quadrants, one for each of the spring, winter, fall, and summer seasons. Each quadrant include sub-breakdowns that are divided according to the selected attribute from the screen 2100. For example, quadrant 2301, in the top left hand corner of the breakdown 2300, corresponds to the number of target households that have the equity and being a vehicle from a particular manufacturer purchased during the spring, while the quadrant 2302 in the top right hand corner is for the fall, the quadrant 2303 in the bottom left hand corner is for the winter, and the quadrant 2304 in the bottom right hand corner is for the summer. The areas or sizes of the sub-breakdowns correspond the quantity or number of vehicles for each make, similar to the sizes or areas of the circles in the graph 2102 of FIG. 21.

In some embodiments, given the limited area available for each sub-breakdown or season, only a subset of the total manufacturers from the display 2200 of FIG. 22 are shown. In the each of the sub-breakdowns of the breakdown 2300, the ~top 25 manufacturers are shown. The breakdown 2300 also includes the total number of targeted households identified by the system and as shown in the screen 2100 and the display 2200.

Figure 24:
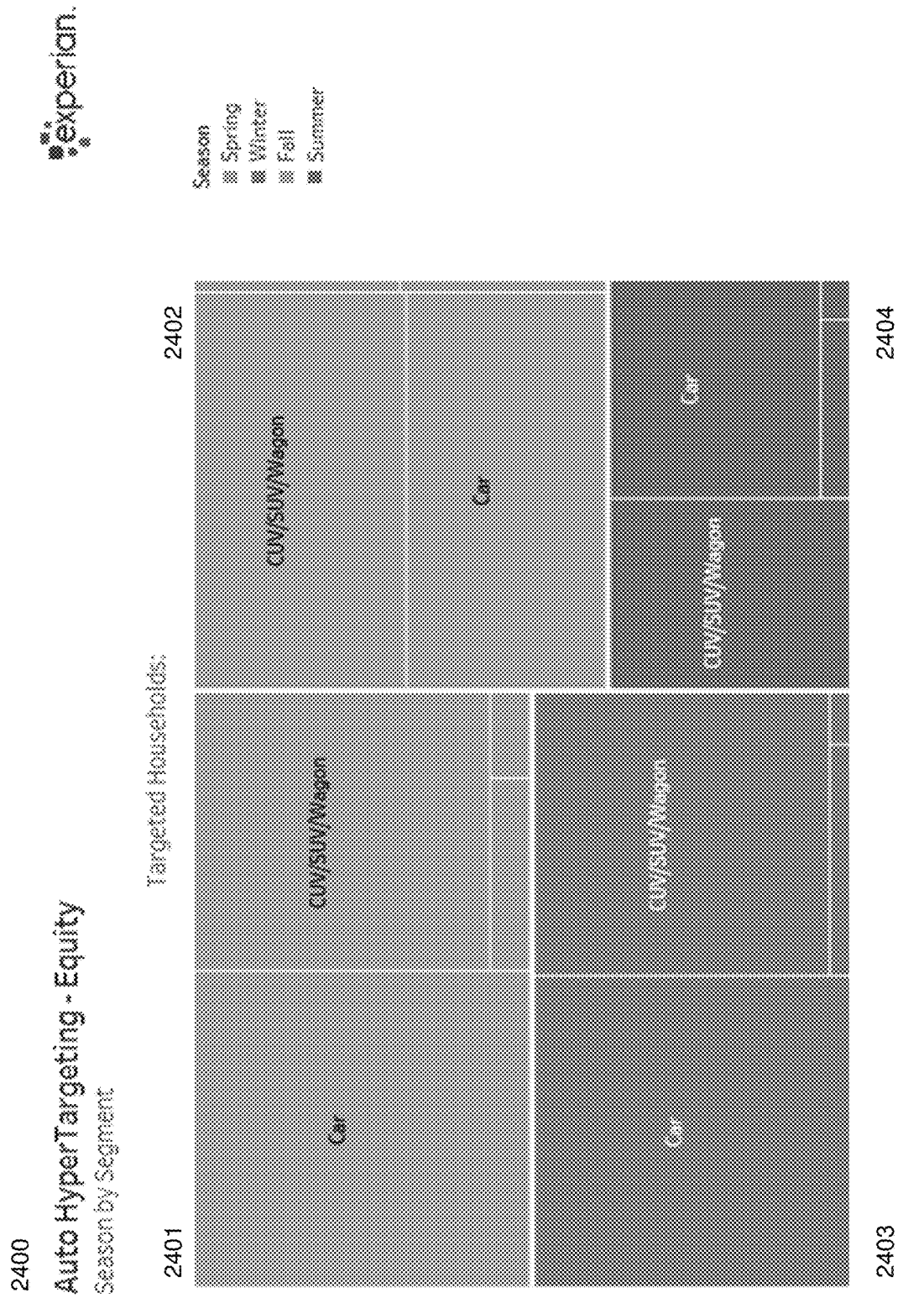
FIG. 24 is an example of a breakdown ranking or listing of the number of targeted households, identified by type, having a vehicle having the specified equity in the specified geographic region in the specified season, in accordance with an exemplary embodiment.

FIG. 24 is an example of a breakdown 2400 of the number of targeted households associated with the one or more owner events in the specified geographic region shown on the graph 2200 of FIG. 22 according to vehicle type, where the one or more owner events occurs in a specified season. The breakdown 2400 may be displayed on a user device in response to the user selecting a specified geographic region of graph 2200, such as in real-time in response to the user selecting the region via a displayed GUI.

As shown, the breakdown 2400 includes four quadrants 2401-2404, one for each of the spring, winter, fall, and summer seasons. Each quadrant include sub-breakdowns that are divided according to the selected attribute from the screen 1400. For example, quadrant 2401, in the top left hand corner of the breakdown 2400, corresponds to the number of target households that have the equity and being a vehicle of a particular vehicle type purchased during the spring, while the quadrant 2402 in the top right hand corner is for vehicles purchased in the fall, the quadrant 2403 in the bottom left hand corner is for vehicles purchased in the winter, and the quadrant 2404 in the bottom right hand corner is for vehicles purchased in the summer. The areas or sizes of the sub-breakdowns correspond the quantity or number of vehicles for each vehicle type, similar to the sizes or areas of the circles in the graph 2202 of FIG. 22.

In some embodiments, given the limited area available for each sub-breakdown or season, only a subset of the total manufacturers from the display 2200 of FIG. 22 are shown. In the each of the sub-breakdowns of the breakdown 2400, the top 2 vehicle types are shown. The breakdown 2400 also includes the total number of targeted households identified by the system and as shown in the screen 2100 and the display 2200.

Figure 25A:
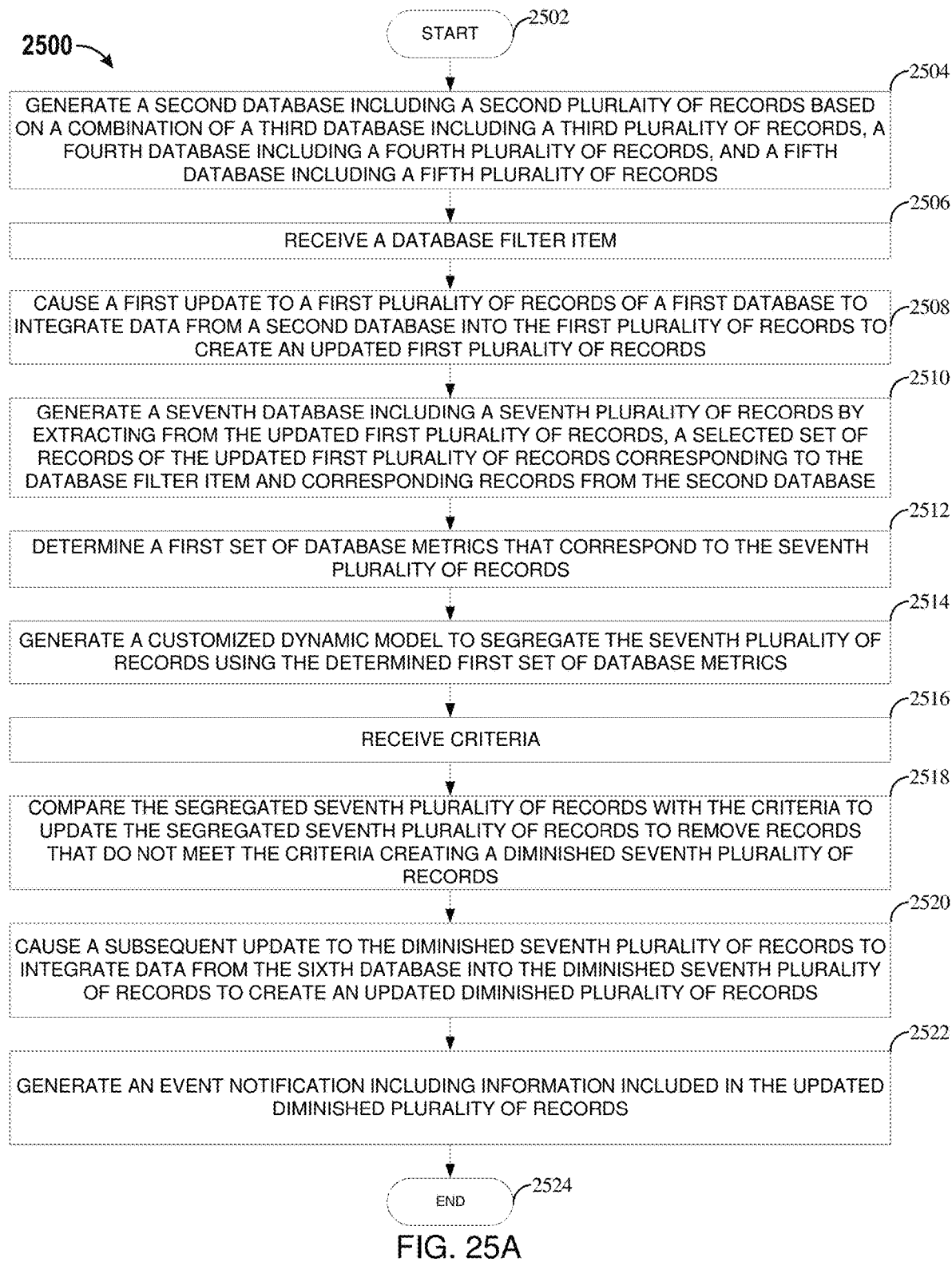
FIGS. 25A and 25B are flow charts for methods of processing data using dynamic models, in accordance with exemplary embodiments.
Figure 25B:
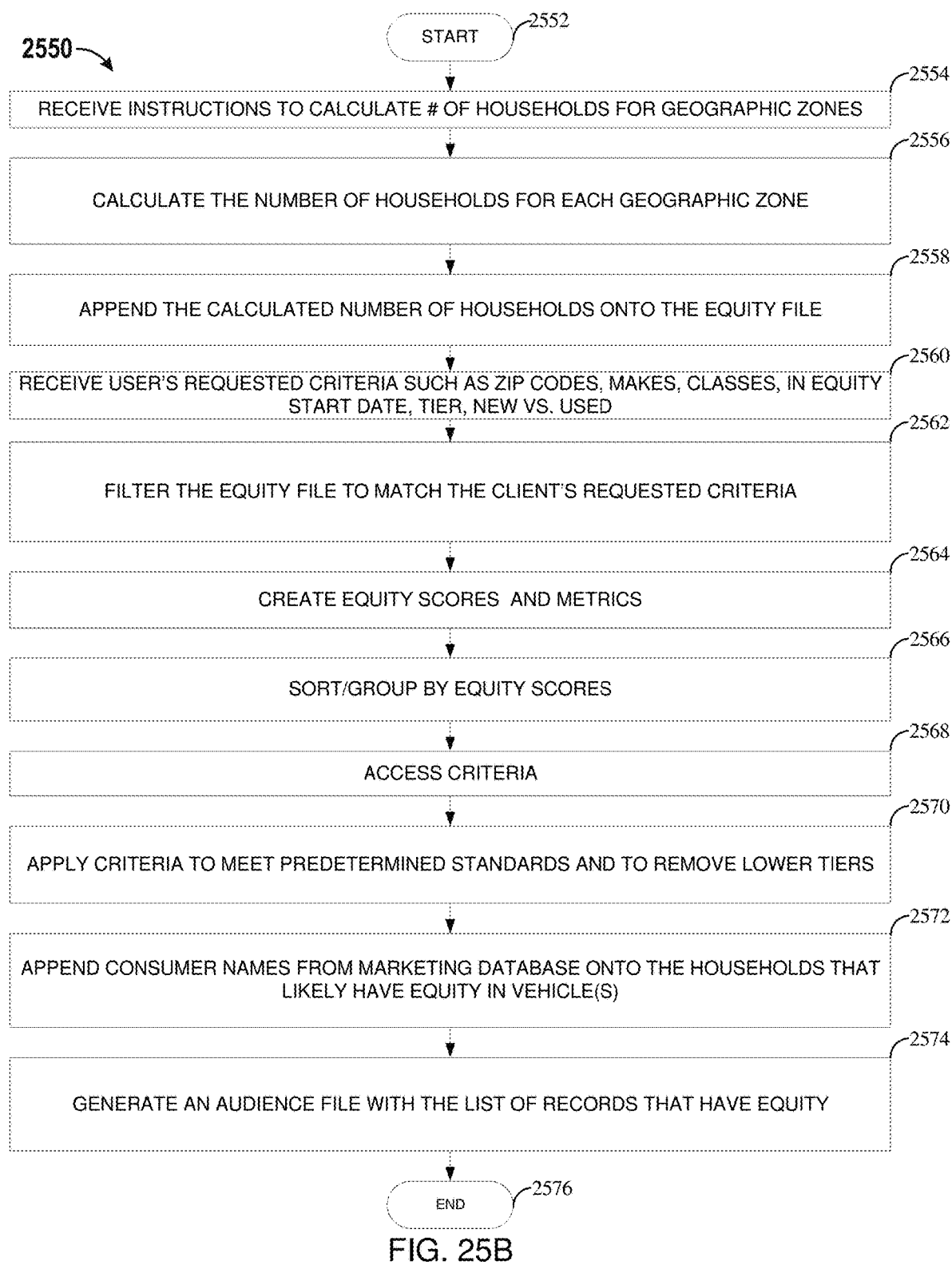

FIGS. 25A and 25B are flow charts for methods of processing data using dynamic models, in accordance with exemplary embodiments. In some embodiments, any of the components described herein (for example, the CPU 202, the I/O interfaces and devices 204, the user interface module 214, and/or the mass storage device 210) of the dynamic modeling system 103 as shown in FIG. 2B) may perform either or both of these methods. The method 2500 of FIG. 25A begins at block 2502.

At block 2504, the CPU 202 may generate a second database including a second plurality of records based on a combination of a third database including a third plurality of records, a fourth database including a fourth plurality of records, and a fifth database including a fifth plurality of records. At block 2506, the CPU 202 may receive a database filter item. In some embodiments, the filter item may be received via the user interface module 214 and/or the I/O interfaces and device 204. For example, the first filter item comprises one or more filter values, selections, or inputs as received from a user of the dynamic modeling system 103 via the user interface module 214 or a predetermined criteria as received from the mass storage device 210. At block 2508, the CPU 202 may cause a first update to a first plurality of records of a first database to integrate data from a second database into the first plurality of records to create an updated first plurality of records. At block 2510, the CPU 202 may generate a seventh database including a seventh plurality of records by extracting from the updated first plurality of records, a selected set of records of the updated first plurality of records corresponding to the database filter item and corresponding records from the second database.

At block 2512, the CPU 202 may determine a first set of database metrics that correspond to the seventh plurality of records. At block 2514, the CPU 202 may generate a customized dynamic model to segregate the seventh plurality of records using the determined first set of database metrics. At block 2516, the CPU 202 may receive criteria corresponding to predetermined rules or filters. At block 2518, the CPU 202 may compare the segregated seventh plurality of records with the criteria to update the segregated seventh plurality of records to remove records that do not meet the criteria creating a diminished seventh plurality of records. At block 2520, the CPU 202 may cause a subsequent update to the diminished seventh plurality of records to integrate data from the sixth database into the diminished seventh plurality of records to create an updated diminished plurality of records. At block 2522, the CPU 202 may generate an event notification including information included in the updated diminished plurality of records.

The method 2550 of FIG. 25B begins at block 2552. At block 2554, the CPU 202 may receive instructions from a user to calculate a number of households for one or more geographic zones. At block 2556, the CPU 202 may calculate the number of households for each geographic zone, for example, based on information in a marketing database. At block 2558, the CPU 202 may append the calculated number of households onto an equity file. At block 2560, the CPU 202 may receive user's requested criteria such as zip codes, makes, classes, new vs. used, in equity start date, tier, and so forth. At block 2562, the CPU 202 may filter the equity file to match the client's requested criteria. At block 2564, the CPU 202 may create equity penetration rates, counts, and metrics. At block 2566, the CPU 202 may sort/group the data store by equity rates. At block 2568, the CPU 202 may access criteria corresponding to predetermined limits, and so forth. At block 2570, the CPU 202 may apply the criteria to meet predetermined standards and to remove lower tiers. At block 2572, the CPU 202 may append consumer names from the marketing database onto the households that have equity in vehicle(s). At block 2574, the CPU 202 may generate an audience file with the list of records that have equity before ending at block 2576.

XVII. Example Use Case—Vehicle and Client Data

As noted above, the system 100 may be used in a variety of environments to perform database updates and to dynamically generate custom models. As one non-limiting example which is discussed above and herein, the system 100 may be used to process client (or consumer) data. Parties in vehicle sales (for example, dealers, manufacturers, lenders, and so forth) are always looking for new clients, customers, or purchasers. In some instances, the new clients may be people who are in the market for a new vehicle, either to buy, lease, etc. As noted above, some efforts for bringing in potential clients includes sending pre-screening offers to invite or encourage the potential clients to visit a dealership or browse an inventory for the new vehicle to purchase or lease. Other efforts may involve reviewing records to identify the potential customers who recently experienced or will soon experience an event that may cause them to require or desire the new vehicle and who, thus, may be interested in purchasing or leasing in the near future. In some embodiments, identifying potential relationships with new and/or existing clients may utilize both the vehicle data described above and client data.

However, as noted above regarding the vehicle data, such efforts may be expensive, inefficient, and time consuming (for example, involving time consuming data processing and computations), and the same applies equally to the client data. Furthermore, the results of such efforts to identify potential clients may be unreliable with regard to efficacy of accurately identifying potential clients, especially when particular details of the potential clients are desired. For example, potential clients may need or want a new vehicle soon, need service and/or parts for an existing vehicle, desire aftermarket accessories for an existing vehicle, be ready to purchase a warranty for an existing or new vehicle, need or be interested in switching insurance companies or in obtaining financial services. Records regarding details of life and/or vehicle events of the potential clients may be available but may be integrated with pieces of useful information that cannot be aggregated or analyzed with other details to generate overall useful client information. For example, when trying to identify potential clients based on recent or near future life and/or vehicle events, various public records and analysis thereof may provide partial names of potential clients, details of the recent or expected life or vehicle events, and/or scores ranking the reliability of the records and analysis. However, as with the vehicle data, these records and analysis of the client data may not include all details needed to be of value to the dealer. For example, such records may fail to provide a potential client's full name or address, details regarding the recent or expected life event, details regarding current vehicle ownership, and so forth. Furthermore, there may not be any associations between the existing records, so the available information identified above may not be available for all the potential client's for whom existing records exist. For example, existing records may show that John retired in May 2018 but not include any details regarding previous income, current vehicle ownership/leasing status and/or details, or John's third party score. Similarly, records may provide details regarding Mary's third party score and current vehicle ownership status but not include any information regarding Mary's current vehicle warranty end date or recent or expected service. Further, even when there exists some data sources that have full information, regulatory restrictions may exist that limit who has access those data sources and requirements regarding the kinds of communications (for example, that only firm offers) are available if such data sources (such as third party data bases) are accessed.

Thus, dealers, manufacturers, and other service providers (for example, insurance, warranty, and/or financial services providers) that are generally interested in details of correspond needs in a particular geographic area and/or relating to particular vehicle types, makes, or models, etc., may not be able to fully use the information from existing records and will be unable to target particular potential clients (for example, those within particular zip codes, having experienced or soon to experience a particular life or vehicle event, or needing a service or part for a particular vehicle type, make, or model). Records including such useful details may not currently exist and may not be generated with accuracy under current regulatory frameworks.

Records from some sources may provide details regarding the potential clients, such as household information, as well as events in the potential clients' lives (life events, vehicle events, third party events, and so forth). These records may be analyzed individually and in combination with each other to generate predictive models. These sources may not include specific third party file data, and thus are not subject to the third party regulations. Thus, these sources may be used to generate models to apply to the various life and vehicle events and to generate new insights for services and products that may be desirable to the prospective clients. For example, such modeling may identify which geographic regions have a large percentage of consumers that are likely to be ready to lease or purchase a vehicle or in need of one or more of parts or services for existing vehicles, in view of recent or expected life or vehicle (or other) events. The modeling may dynamically leverage data from various sources to apply predictive insights that increase revenue opportunities by generating customized sets of geographic regions (for example, 90211, zip codes XXXXX+YYYY and GGGGG+HHHH) that the dealers, manufacturers, and service providers may want to target. However, there may still be some constraints on how the data can be used. In addition, the data that is needed from the client events and/or vehicle events may not interface well with some of the vehicle data sources.

By comparing and analyzing the various databases, associations between particular life and/or vehicle events and corresponding purchase or lease of vehicles, purchase of parts, and/or purchase of services for existing vehicles may be identified and exploited. Furthermore, various factors, as described above, suggest that future growth in used and new vehicles sales and leases, automotive parts, and automotive or financial services may involve attracting clients from competitors and protecting existing market share. The dynamic modeling described herein may allow for identification and/or targeting of particular geographic areas that increases benefit for the dealer, manufacturer, parts providers, and/or service providers (for example, by identifying those having a higher likelihood to leave a competitor) without having to overtax the dealer or manufacturer's computing systems.

As noted above, targeting may be generated based on third party events, vehicle events, life events, or other client or vehicle data to generate triggering events. Systems and methods may use such triggering events to identify potential targets, where a target is a potential client that is identified as someone likely to lease or purchase a vehicle (new or used) in a given geographic region within a given timeframe.

Thus, hyper targeting (as described herein) may create customized outputs based on dynamic modeling applied to various inputs. The inputs may include one or more of geographic regions, variable time periods, selected vehicle information (for example, make, model, type, and so forth), selected client information, and third party, life, and/or vehicle events. Outputs may be further be scored or ranked based on expected accuracy.

XVIII. Operation of the System—Example Use Case—Vehicle Owners

Figure 26:
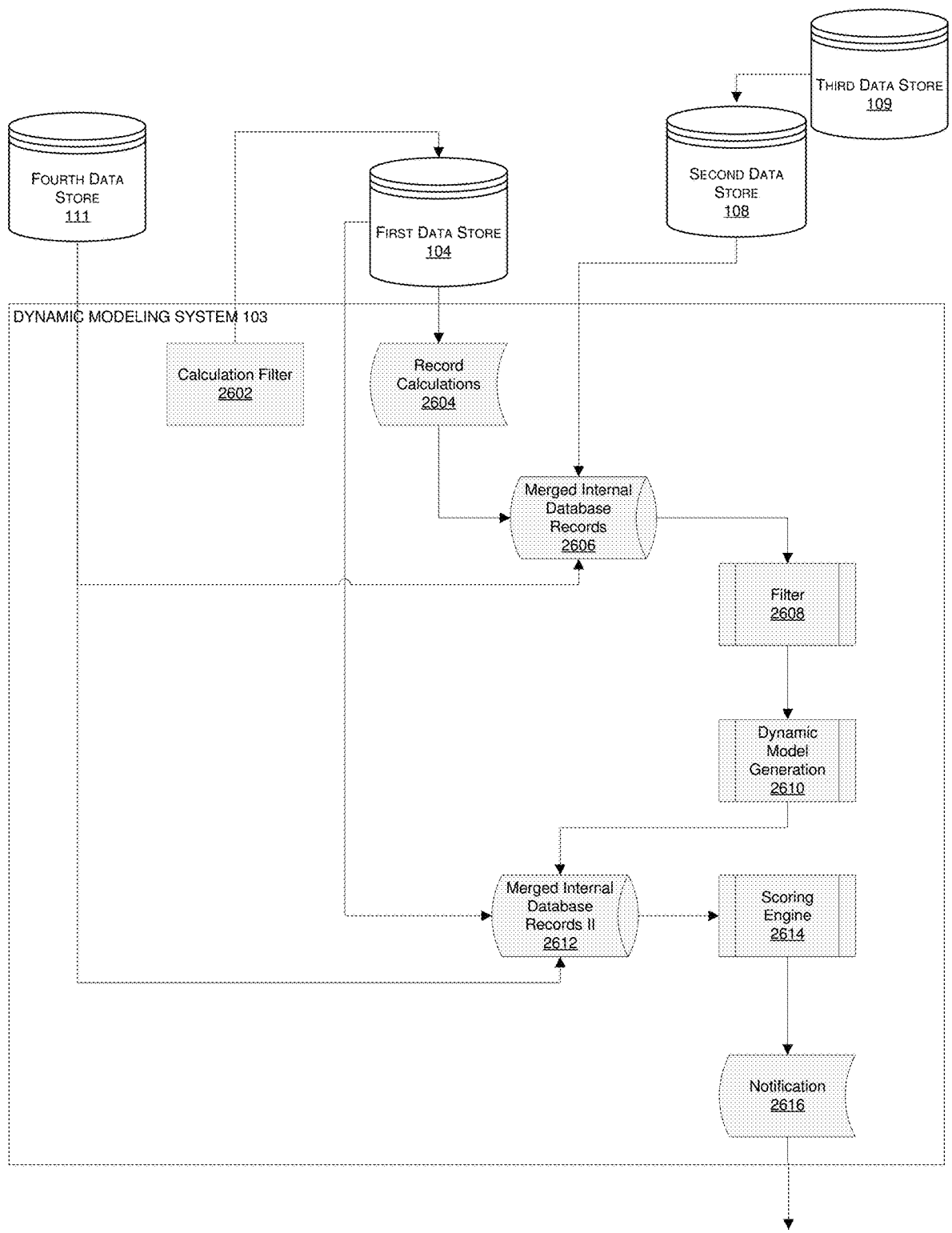
FIG. 26 is a block or data flow diagram of the database system for providing electronic notifications regarding database records, according to another alternate embodiment.

FIG. 26 is a block or data flow diagram of another database system, implemented by the dynamic modeling system 103, for dynamically generating models for processing data sourced from various databases and providing electronic notifications regarding database records, according to another alternate embodiment.

At 2602, the dynamic modeling system 103 accesses a calculation filter update data item. Accessing the calculation filter update data item may comprise receiving an input requesting the calculation, etc. The calculation filter update data item, as described above in relation to the dynamic modeling system 103, may include, for example, instructions to perform specific calculations on database records stored by the system in the first data store 104. Examples of such data items are described below. The system implements the calculation filter update data item on records in the first data store 104. For example, the system queries the first data store 104 for specific sets of data and performs calculations on the data to automatically generate a set of record calculations 2604. Using an example use case for identifying specific events (for example, identifying owner events), the calculate filter update may comprise instructions to calculate a number of households in a geographic zone.

In some embodiments, if the first data store 104 stores information about a population such that the calculation filter update data item may execute calculations on specific subsets of the population. For example, using an example use case for identifying owner or vehicle events (where prospective clients are identified based on experiencing an owner or vehicle event), the first data store 104 may be a consumer demographics or marketing database that stores data on individual consumers as well as information on households and vehicles owned in the household. Further, a database record in such a first data store 104 may represent a person, and may include the person's name, address, city, county, state, country, and/or zip code. Further, the database record may be associated with a unique identifier (for example, a key value and/or index value). The system may determine that the calculation filter update data item includes instructions to perform a count of the number of people or households within a specific geographic area, such as, for example, number of households within an identified geographic area, zip code, zip code+4 area, city, county, state, set of 5 specific zip codes, set of zip codes that begin with digits XY, and so forth.

At 2604, the dynamic modeling system 103 generates and stores the record calculations, such as, for example, the calculations along with the corresponding geographic area indicator. For the example use case above, the stored record calculations may include the numbers of households in a plurality of (or single) geographic zones. In some embodiments, the stored data includes one or more (or all) items included in the corresponding database record of the first data store 104. These calculations may be reprocessed as the data in the first data store 104 is updated, for example, daily, weekly, monthly, bi-monthly, bi-annually, annually, every 28 days, or according to other schedules. In some embodiments, the calculations may be reprocessed on demand or whenever a specific threshold of change has been detected, as noted above in relation to FIG. 1. In some embodiments, the calculations may be reprocessed as determined by the third party owner of the first data store 104.

Advantageously, storing the calculations and the corresponding geographic area indicators in the records calculation 2604 can speed up later processing by the system, such as, for example, the merging, analysis, dynamic generation of custom models, and/or scoring of one or more records. For example, as described below, by storing a count of the designated categories, such as, for example the households within a specific zip code, those records can be more quickly merged with other data sets that are organized at the zip code level.

The system may also include a second data store 108 which comprises a large set of data which is stored differently from the data in the first data store 104. Using the example use case, the second data store 108 is a vehicle data store which comprises vehicle data which has been extracted from an auto market database. In some embodiments, the vehicle data extracted from the auto market database is then matched to third party data. In some embodiments, the vehicle data store comprises vehicle leasing data and/or loan data. In some embodiments, the vehicle data store is generated by extracting data from an auto market database which includes data sources such as state department motor vehicle data, manufacturer data, and so forth. The vehicle data store extracts household-level records of vehicles. In some embodiments, the vehicles associated with records in the vehicle data store are vehicles coming off lease, coming off loan, that recently experienced a particular event, or that are expecting a particular event in the near future.

The extracted data may include, for example, vehicle make, vehicle type, vehicle model, vehicle manufacturer, as well as the vehicle owner location such as zip code and/or zip code+4 area. The extracted records are then matched to third party data and/or consumer data to determine when that household's vehicle lease or loan is about to expire (such as, for example, the month and year, or the day, month, and year, or the quarter and year), or when someone in that household experiences or is expected to experience a particular owner event (such as, for example, birth of a child or career change), or when that household has a vehicle that experiences is expected to experience the particular vehicle event (such as, for example, damage, title change, and so forth). The vehicle data store may also include information on the vehicle segment of the vehicle, such as, for example, economy card, sport car, luxury car, and so forth. In some embodiments, the vehicle data store does not include any owner-identifying information such as name, street address, or social security number, but instead only indicates that a vehicle within a household in a zip code+4 area experiences an event or that an owner within the household experiences an event within a certain date range.

The second data store 108 may be updated, for example, on various defined schedules, similar to the first data store 104. In some embodiments, the second data store 108 may be updated on demand or whenever a specific threshold of change has been detected (for example, 2% of the records have been updated, 0.8% of the certain fields of the records have been updated, and so forth). In some embodiments, the calculations maybe reprocessed as determined by the owner of the second data store 108.

The dynamic modeling system 103 may then access a set of data from the second data store 108 and merge those records with the record calculations created in block 2604 at the block 2606. In some embodiments, the dynamic modeling system 103 may also access a set of data from a fourth data store 111 that includes geographic data. In some embodiments, as noted above, the geographic data in the fourth data store 111 includes or provides location details such as households information, zip code+4, census tract, longitude and/or latitude information, block group, block level, and so forth. The geographic data may be used in the modeling process (for example, in the merged internal database records 2606 below) to generate models and/or perform other analysis specific to a geographic region and/or be appended to the working aggregation files (for example, in the merged internal database records II 2612 below) to generate and/or enrich an audience profile. In some embodiments, the merged internal database records 2606 are stored in a separate file from the second data store 108 and the first data store 104 (and/or the fourth data store 111), whereas in other embodiments, the merged internal database records 2606 are stored in one of the first data store 104 and the second data store 108 (and/or the fourth data store 111). In some embodiments, there may be some advantages to storing the merged internal database records 2606 in a separate file from the first data store 104 and the second data store 108. For example, storing the merged internal database records 2606 separately is advantageous when the accessed set of data is a smaller data set in comparison to the complete set of records in the second data store 108 or, as another example, when the merged internal database records 2606 are stored as a file or in a system that can be more readily read and accessed than the second data store 108. In some embodiments, the merged internal database records 2606 are stored locally within the dynamic modeling system 103, whereas in other embodiments, the merged internal database records 2606 are stored remotely from the dynamic modeling system 103, such as in an external database or in one of the first data store 104 and the second data store 108. If separate from the first data store 104 and the second data store 108, the merged internal database records 2606 may be processed by the dynamic modeling system 103 without having to further communicate with the first data store 104 or the second data store 108 to process the merged internal database records 2606.

Using the example use case, the second data store 108 may include vehicle data that is provided at the household level such that a subset of that household data may be aggregated at a geographic level, such as the zip code level, and merged with the record calculations 2604 that may represent a count of the number of households within a specific zip code set to create merged internal database records 2606. The merged internal database records 2606 may then store data on each zip code set which indicates the number of households in each zip code as well as the households within those zip codes which have a vehicle event that recently or is expected to occur (such as, for example, a lease or loan that is about to expire or a recent accident) or an owner event that recently or is expected to occur (such as, for example, a birth of a child or address change).

The system may then apply a filter 2608 using a set of criteria which is stored in or accessed by the dynamic modeling system 103. The filter 2608 may be used to access a filtered subset of data from the merged internal database records 2606. In some embodiments, the subset of the data is stored as a separate database (not shown) from the merged internal database records 2606, whereas in other embodiments, the filtered subset of the data is stored in a temporary memory location (not shown), such as RAM or buffer memory to be accessed for use in the dynamic model generation 2610.

In some embodiments, one or more criteria of the filter 2608 are based on user or client-provided criteria. For example, the user may utilize a computing device to interface with the dynamic modeling system 103 and request information on vehicles of a specific make and class and/or for drivers within a specific set of zip codes as well as those vehicles and/or drivers having recently experience a particular event. In addition, the user may provide other parameters, such as, for example, manufacture options, model, vehicle class, luxury/non-luxury categorization, type of personal or vehicular event, or other categorizations or options. For example, the user may also provide instruction to include "comparable" options or events, such as, for example, if the user indicated a major vehicle accident event, the system also includes vehicle fire events or other events with similar outcomes but, perhaps, different causes, as a "comparable option".

The dynamic modeling system 103 is able to dynamically receive such criteria in real-time and then access the filtered subset the merged internal database records 2606 dynamically so that the filtered subset accounts for any newly updated criteria from the user. The dynamic modeling system 103 may also aggregate the filtered records from merged internal data base records 2606 to the selected user-provided criteria. Using the example use case, the filter may include criteria from a vehicle dealer requesting information about specific vehicle makes within certain zip codes where the vehicles' owners recently moved into the area, for example, Lexus vehicles within zip codes 60119, 60134, 60175, and 60176 whose owners moved into the respective zip code within the last 6 months. After the dynamic modeling system 103 applies the filter, the data set now includes household information for the selected zip codes 60119, 60134, 60175, and 60176. The dynamic modeling system 103 may then aggregate the data using the selected criteria to provide overall calculations including, for example, the number of Lexus vehicle having owners that moved into one of the selected zip codes in the last six months, the number of total vehicle having owners that moved into one of the selected zip codes in the last six months, and the number of total households in each zip code in the four selected zip codes, and/or the number of target households in each zip code in the four selected zip codes.

The dynamic modeling system 103 may perform various counts, calculations, metrics, or other analyses of the filtered subset. As one example, the dynamic modeling system 103 may calculate an "event" rate by comparing the total number of households within the selected zip codes with the total number of households that experienced, are experiencing, or are expected to experience the particular event within the zip codes and which also meet the selected vehicle criteria, if any. In some embodiments, if there are any groups that have less than a certain number of households (for example, 4, 10, or 50) or groups that have an event percentage greater than or equal to a certain number criteria (for example, 95%, 98%, or 100%), then the dynamic modeling system can combine groups within, for example, the same zip codes in order to increase the group size to at least the set number of householders and create an event percentage that meets the percentage criteria.

In some embodiments, the dynamic modeling system 103 stores the aggregated household data at the geographic/parameter level such that a record is created for each geographical/parameter combination and the total number of households with a vehicle or owner that experienced, is experiencing, or is expected to experience the event that matches the set of parameters is calculated. Storing the data at this level helps improve the processing speed and memory allocation which can be important for use when generating the models using this data.

In addition, the dynamic modeling system 103 may dynamically generate and apply a modeling algorithm that groups the filtered subset based on the filter criteria to determine a prediction or a likelihood estimation 2610. The dynamic modeling system 103 may utilize the filter criteria to generate the custom model. Using the example above, the dynamic modeling system 103 may take the filtered set of vehicle data for a specific set of zip codes (which includes the household count information and the event percentage) to dynamically generate a custom modeling algorithm that groups together households by optimizing their likelihood of having experienced or expecting to experience a personal or vehicle event and being associated with certain models and makes within a specific time frame to generate a new model that calculates the likelihood of a specific household experiencing the event in a given time frame. In some embodiments, the dynamic modeling system 103 sorts the geographical zones by the event percentages, and creates tiered groups of zones. For example, the tiered groups of zones maybe based on the event percentage where tier A may be zones with event percentage of >65% but <100%, tier B may be zones with an event percentage of >60% but <=65%, tier C may be zones with an event percentage of <=30%. In some embodiments, the dynamic modeling system 103 removes or flags zones that do not meet the acceptable tier levels or event percentages.

Depending on the embodiment, the dynamic modeling systems discussed herein may use various techniques for generating models, such as machine learning techniques that may include artificial intelligence such as neural networks, genetic algorithms, clustering, or the like. Machine learning may be performed using a training set of data. The training data may be used to generate the model that best characterizes a feature of interest using the training data. In some implementations, the class of features may be identified before training. In such instances, the model may be trained to provide outputs most closely resembling the target class of features. In some implementations, no prior knowledge may be available for training the data. In such instances, the model may discover new relationships for the provided training data. Such relationships may include similarities between data elements such as transactions or transaction categories as will be described in further detail below.

The dynamic modeling system 103 may also apply various rules to determine whether the data meets predetermined criteria or error levels. In some embodiments, the dynamic modeling system 103 removes, discards, or ignores data that does not meet such criteria or error levels. The remaining data may represent a working data set which can then be stored in a temporary memory location, such as RAM or buffer memory or in a permanent memory.

The dynamic modeling system 103 may then merge the working data set with data from the first data store 104 to generate merged internal database records 2612. In some embodiments, the merged internal database records II 2612 also includes data merged from the fourth data store 111, which includes the geographic data. For example, the geographic data may be appended to the results from the working data set to assist in generating scoring details and/or add other value based on the geographic details. In some embodiments, the merged internal database records II 2612 are stored as a new database whereas in other embodiments, they are stored in or within the merged internal database records 2606. Using the example use case above, the dynamic modeling system 103 may merge the selected geographic groups with marketing data or with records from the first data store 104 to provide marketing information for the set of households in the selected zones or zip codes. In some embodiments, the marketing information is provided for all of the households in the selected zip codes, whereas in other embodiments, the marketing information is only provided for a subset of the households in the selected zip codes.

At 2614, the dynamic modeling system 103 may then generate a model score for each record and append the scores onto the records or groups of records. However, it is recognized that in other embodiments, scores are not included as the fact that the record remains within the merged internal database records II 2612 indicates that the dynamically generated custom model has determined that they are a viable contact. Using the example above, the dynamic modeling system 103 may then append a score onto each record to indicate whether that specific record is in one of the selected geographic groups where some subset of the households within the group are likely experiencing a specific and having the selected vehicle make(s). The scores may include tier indicators, an estimated accuracy rate, a number, an alphanumeric identifier, or any variety of scoring indicator.

At 2616, the dynamic modeling system 103 may also generate and may generate an output file on a periodic basis, for example daily, weekly, monthly, bimonthly, quarterly, semiannually, and so forth) or on demand based on records being identified for the merged internal database records 2612 and send a notification alert or notification package. The generated notification package or alert may comprise a digital and/or electronic message. The notification package may include an indication of the corresponding records from the merged internal database records 2612 along with their corresponding scores, and any other data items from the corresponding record. In other embodiments, the notification package may be an indication to the user that user should access the dynamic modeling system 103 to review the records from the merged internal database records II 2612 and/or the scores. The notification may be sent to the user that provided the filter criteria, and/or to any other recipient indicated by the user or the notification package. Further, the notification package may be delivered by any appropriate mode. Using the example above, the dynamic modeling system 103 may send a notification package that comprises information on households that are most likely to be experiencing the specific event as well as a score that indicates the relative likelihood. The notification package may indicate the households that are located within the better performing geographical areas. The notification package may include one or more of the following fields for each household: name, address, city, state, zip code+4, period during which the event is experienced, score, and/or tier.

In some embodiments, the alert and/or notification is automatically transmitted to a device operated by the user associated with corresponding notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (for example, a browser, a mobile application, and so forth). For example, receipt of the alert and/or notification may automatically activate an application on the device, such as a messaging application (for example, SMS or MMS messaging application), a standalone application (for example, a vehicle dealership application or vehicle financing application used by a financial agency), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the system so that the user can log in to the system and view the alert and/or notification. Alternatively, the alert and/or notification may include a URL of a webpage (or other online information) associated with the alert and/or notification, such that when the device (for example, a mobile device) receives the alert, a browser (or other application) is automatically activated and the URL included in the alert and/or notification is accessed via the Internet.

In some implementations, the alert and/or notification may be automatically routed directly to an interactive user interface where it may be viewed and/or evaluated by a user. In another example, the alert and/or notification may be automatically routed directly to a printer device where it may be printed in a report for review by a user. In another example, the alert and/or notification may be automatically routed directly to an electronic work queue device such that information from the notification may automatically be displayed to a user, and optionally information from the notification may be automatically used, for example, to contact (for example, dial a phone number) persons represented in the notification. In a further example, the alert and/or notification may be automatically routed as input to an external system (for example, to be fed into a marketing campaign management system, a dealer management system, or a customer relationship management system).

In various implementations, filter criteria changes may be made continuously, in real-time or substantially real-time, and/or in batch. In various implementations, record changes may be evaluated continuously, in real-time or substantially real-time, and/or in batch. In various implementations, notification may be generated and/or sent continuously, in real-time or substantially real-time, and/or in batch.

In various implementations, the first data store 104, the second data store 108, the record calculations 2604, the merged internal database records 2606, the merged internal database records II 2612, and/or any combination of these databases or other databases and/or data storage devices of the system may be combined and/or separated into additional databases.

XIX. Generating Dynamic Models—Example Use Case—Vehicle and Client Data

Figure 27:
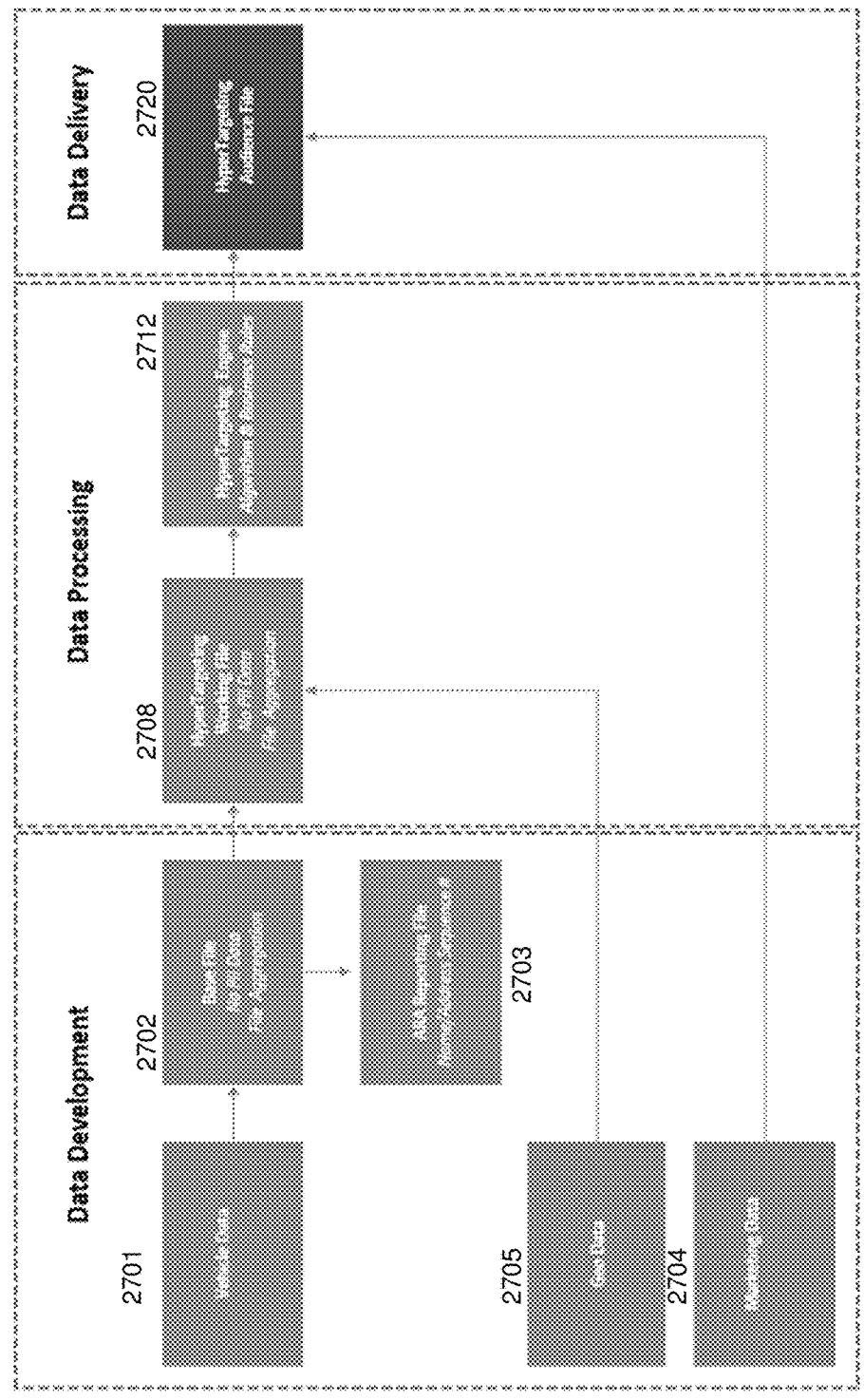
FIG. 27 is an example of one embodiment of a flowchart for processing information from multiple sources and generating dynamic models based on the data from the sources.

FIG. 27 is an example of one embodiment of a flowchart for a method, process, or data flow diagram 2700 for processing information from multiple sources and generating dynamic models based on the data from the sources. The method 2700 includes various blocks used to process information from multiple sources and generating dynamic models based on the information from the multiple sources. The method 2700 may be run simultaneously, in an overlapping manner, or sequentially based on inputs or requests from multiple dealers, manufacturers, service or part providers, or other entities that are each accessing the dynamic modeling system 103 via one or more terminals 102 or computing devices 106. The various blocks of the method 2700 may be performed by one or more components of the dynamic modeling system 103 as described in relation to FIG. 2B. For example, one or more blocks of the method 2700 may be performed by one of the processor 202, the modeling module 215 (or one of the models generated by the dynamic modeling system 103), the data stores 104 and/or 108, the quality module 217, or the report module 216. In some embodiments, one or more of the blocks of the method 2700 are implemented by one or more of the other components of the dynamic modeling system 103, as referenced in FIG. 2B.

In some embodiments, the blocks of the method 2700 are performed in a sequential manner, while in other embodiments, the blocks of the method 2700 may be performed in a non-sequential manner, regardless of the terminology used to describe the method 2700 herein. A person having ordinary skill in the art will appreciate that the method 200 may be implemented by other suitable devices and systems. Although the method 2700 is described herein with reference to a particular order, in various aspects, blocks herein may be performed in a different order, or omitted, and additional blocks may be added.

As shown, the method 2700 may comprise three data input or source blocks: at block 2701, the method 2700 comprises receiving, accessing, or generating a vehicle data and/or user data file and at block 2702, the received vehicle data and/or user data file is parsed to remove any unnecessary or undesirable data. At block 2703, an analysis block provides a historical review of purchase rates in the records being analyzed in the method 2700. For example, the block 2703 allows for verification and/or identification of what combinations of inputs have resulted in purchases. The block 2703 analysis may provide information that integrates how historical purchase rates can be used to understand the inputs can be analyzed to predict future purchases. At block 2704, the method 2700 comprises receiving or accessing a marketing database. Each of these data input, analysis, or source blocks will be described in further detail in relation to the method 2700 below.

In some embodiments, the method 2700 may begin at or include block 2702, where the vehicle and/or user file is received or accessed. For example, obtaining or accessing the vehicle and/or user file may comprise reviewing or accessing one or more data files, database, or reports 2701 that include a listing of vehicle and/or user information (for example, vehicles and/or users that experience a particular event within a particular time period. Information used to generate the one or more reports of the vehicle and/or user file may include information from vehicle databases (for example, new vehicle registration databases associated with state departments of motor vehicles ("DMVs")), from social media or similar sources or archives, and/or from third party archives (for example, providing dates and/or details of events, and so forth). For example, one or more fields may be extracted from the vehicle database and used in conjunction with information from the social media or third party archives to identify the parameters of the event (for example, type of event and date of the event) for entries in the vehicle and/or user file. Accordingly, the vehicle and/or user file may be generated based on information received from one or more other databases. In some embodiments, the third party data is already included in the vehicle and/or user file and/or the various source databases. In some embodiments, the vehicle and/or user file may include title state, vehicle information (for example, year, make, model, and so forth), user information, and event information (for example type of event and/or date of event occurrence), among others. In some embodiments, the event occurrence date may be calculated based on a reporting period date (for example, a range of dates for which vehicle and/or user records are compiled and searched).

In some embodiments, the block 2702 may be performed by one of the processor 202, the user interface module 214, the I/O interfaces and device 204, and so forth. In some embodiments, the vehicle and/or user file may comprise data from the data store 104 that relates to vehicles and users. In some embodiments, obtaining or accessing the vehicle or user file may comprise or be based on receiving an input or request from the user about target potential clients.

For example, the user may request a listing of households or people in a particular geographic area or region that are likely to have events that occur within a particular time period. In some embodiments, the request may include details of the geographic area to be searched as well as the time period to search. In some embodiments, the request may also include additional information such as details of make, model, or type of vehicle that the households or people currently are associated with, which may be used for filtering. The request may also include a request for information for the households or people identified in the geographic area that has a strong likelihood of having consumers that may meet the requirements of the request. In some embodiments, as described herein, the user may comprise one or more of a dealer, manufacturer, part provider, service provider, or a related entity. Obtaining or generating the vehicle and/or user file may further comprise the dynamic modeling system 103 submitting a request to the vehicle and/or user data store based on the request received from the user. For example, the request to the vehicle and/or user data store may include the time period to be searched. In some embodiments, the request to the vehicle and/or user data store also includes the geographic area from which data is requested.

In response to the request to the lease data store, the dynamic modeling system 103 may receive lease data that includes details of one or more vehicles that are coming off lease in the identified time period. The details for each vehicle may include manufacturer information, model information, zip code information (potentially including zip code+4 information) and a quantity for that vehicle (or similar vehicles) that exists in that zip code. The received data from the lease data store may be used to generate a lease file that is further processed by the dynamic modeling system 103.

At block 2704, a marketing database may be obtained or generated from data received from the marketing database. Similarly, block 2704 may also be performed by one of the processor 202, the user interface module 214, the I/O interfaces and device 204, and so forth. In some embodiments, the marketing database 2704 may comprise data from the marketing database that relates to households or consumers within a geographic area or region. The marketing data available from the marketing database may include demographic or similar data for every household in the United States. In some embodiments, obtaining or generating the marketing database may comprise or be based on receiving an input or request from the user about target potential clients. For example, the user may request the listing of households or people in a particular geographic area or region that are likely to have vehicle or user events that occur within a particular time period, as discussed herein. Obtaining or generating the marketing database may further comprise the dynamic modeling system 103 submitting a request to the marketing database based on the request received from the user. For example, the request to the marketing database may include the time period to be searched. In some embodiments, the request to the marketing database also includes the geographic area from which vehicle and/or user data is requested.

In response to the request to the marketing database, the dynamic modeling system 103 may receive or access marketing data that includes address information, contact information, names, and zip code for households in the geographic area. The received data from the marketing database 108 may form the marketing database that is further processed by the dynamic modeling system 103.

At block 2708, the dynamic modeling system 103 calculates a total number of households in each zip code+4. In some embodiments, the total number of households may be calculated based on the marketing database obtained, accessed, or generated by the dynamic modeling system 103. In other embodiments, other geographic sets could be used, such as zip code, a collection of zip codes, zip codes within a county, and so forth. The data from the marketing database may be summarized and otherwise aggregated based on geographical areas or regions to calculate the number of households in each geographical area or region.

Also at block 2708, the dynamic modeling system 103 may merge data from the marketing database and data from the vehicle and/or user file. In some embodiments, this may involve merging the number of households calculated at block 2706 into the vehicle and/or user file. The data may be merged so that the merged data file includes (for each geographic area) the number of households in the geographic area and the vehicle and/or user information in the geographic area. In some embodiments, the merging of these files and the calculation of the total number of households may be done on a regular basis, for example, quarterly, monthly, weekly, daily, hourly, and so forth or in some batch mode so that the merged data file is ready for when the user request is received. In other embodiment the merging and calculating may be done after receipt of the user request.

The various details from the user request may be identified. For example, one or more of the identified geographic area, makes, models, classes, and time period may be identified from the user request. At block 2712, these criteria may be applied via, for example a filter, to the merged vehicle and/or user file and marketing database (for example, the merged data file) to filter the merged data file to only include data based on the user request (for example, only showing the requested makes, models, and so forth). By filtering the merged data file, the dynamic modeling system 103 may be able to focus on only data relevant to the user's specific request and reduces processing of unnecessary or worthless information.

Also at block 2712, the dynamic modeling system 103 may create various audience metrics to provide to the user. For example, the dynamic modeling system 103 may calculate or create various metrics based on the merged data file. For example, the dynamic modeling system 103 may create event percentage metrics. Based on the merged data file (which includes the number of households in the geographic area experiencing the event and the total number of households in the geographic area), the event percentage metrics may be calculated. For example, an event percentage rate may be calculated based on dividing the number of households experiencing the event by the total number of households in the geographic area. As one example, the event percentage for each zip code+4 may be defined as the total number of vehicles experiencing the event in that zip code+4 that match the user's criteria divided by the number of households in that zip+4.

The merged data file may be reviewed or processed by the dynamic modeling system 103 to confirm that each zip code+4 is only listed one time in the merged data file (for example, that there are no duplicates in the file). The dynamic modeling system 103 may also confirm a value indicating the total number of vehicles or users experiencing the event is cumulative for each zip code+4 so that all vehicles or users experiencing the event are carried through when records are merged or consolidated. In some embodiments, the dynamic modeling system 103 may apply an aggregation algorithm to form one or more zones to meet pre-defined criteria. For example, if one of the zip code+4 zones only includes 3 households when at least 4 households are required or desired, then the dynamic modeling system 103 may aggregate that zip code+4 zone with another zip code+4 zone, for example, selecting the second zip code+4 zone that gets the closest to the minimum 4 households.

As another example, if there are any groups that have less than four households or an event percentage greater than or equal to 100%, then the dynamic modeling system 103 may combine zip code+4 regions within the same zip code in order to increase the group size to at least 4 (or some other pre-defined criteria) and/or to create an event percentage that is less than 100% (or some other pre-defined criteria). After zip code+4 areas are combined, the device calculates new event percentages for each remaining group. The dynamic modeling system 103 may utilize best matching algorithms or other algorithms to match up and aggregate each of the zones that do not meet the criteria. When creating the groups, the dynamic modeling system 103 may calculate the number of households left in the merged data file that have not already been assigned to a group (for example, total number of households in the merged data file minus the cumulative number of households) and then continue with the grouping until all of households have been assigned to a group. In other embodiments, there may be one or more households or zones that are not assigned to a group.

The dynamic modeling system 103 may also calculate the number of vehicles or users experiencing an event in the group, the number of households in the group, and the event percentage within each group—the total number of vehicles or users experiencing the event in the group divided by the total number of households in the group—which may be based on the user-identified criteria or overall based on the cumulative number of households. Any or all of these metrics may be provided to the user (for example, the audience). In some embodiments, the historical purchase may be used to update one or more metrics or update how a metric is determined. For example, historical purchase rates may show how different combinations or weightings of inputs may change corresponding purchase rates and update the metrics to better provide predicted results based on historical results.

Also at block 2712, the dynamic modeling system 103 may dynamically generate and apply custom models based on the user's criteria to determine groups of households by optimizing their likelihood of experiencing the event in the time period. The models may be based on geographic areas and/or the calculated event rates. As one example, after the zones have been aggregated such that they comply with any rules or requirements from the user, the merged data file may then be sorted from high to low based on the calculated event percentage for each zone (or aggregated zone). Additionally, the dynamic modeling system 103 may generate other calculations such as, for example, a cumulative total number of households, a cumulative total number of vehicles or users experiencing the event for each record in the merged data file, and/or the total number of households in the whole file and merge that total number back into every record on the file.

The groups may be sorted into various tiers, where the highest tier includes zones (or aggregated zones) within which the households are most likely to be experiencing the event within the identified time period and where the lowest tier includes zones (or aggregated zones) within which the households are least likely to be experiencing the event within the identified time period. The models may automatically make adjustments to the grouping.

Additionally at block 2712, one or more rules may be applied to the models and generated groups to confirm that any data requirements are met as such the model may be adjusted or calibrated to comply with predefined criteria. For example, the dynamic modeling system 103 may confirm that each created group includes at least four households as identified by the marketing database and has an event rate of less than 100%. In some embodiments, the dynamic modeling system 103 may confirm that the groups have more or less households and may establish an event rate threshold of any other value. The groups may be created with a goal of maximizing or increasing the event percentage within each group that is created.

At block 2720, additional data from the marketing database may be merged into the merged data file for the identified households for one or more tiers of groups. For example, the marketing database may merge households or records identified in the top tiered group (for example, the group with the most households likely to be experiencing the event in the time period) with corresponding information, and so forth, and may not be merged into the households or records in lower tiers. In other embodiments, the marketing database data may be merged for all records in all groups.

Also at block 2720, the dynamic modeling system 103 may assign model scores to each record in the merged data file to indicate a likelihood that a specific record is experiencing the event for the specific criteria. The model score may be based on the assigned tier and/or the zone in which the record is related. In some embodiments, the model scores may also indicate a confidence level that the record is correct or accurate. In some embodiments, records may be removed or reorganized in the groups based on the model scores and/or confidence levels.

Also at block 2720, the dynamic modeling system 103 performs quality checks on the records in the merged data file. The quality checks may confirm that only information meeting corresponding requirements is released to the user. The quality checks may also confirm that the records are appropriately grouped and that only records for the desired geographic area and for the identified makes, models, event, time period, and so forth, are included in the records generated for the user.

In some embodiments, historical purchase records may be used to update one or more aspects of assigning model scores to records. For example, historical purchase rates, etc., may show how different combinations or weightings of inputs may change corresponding purchase rates and update the scoring basis to better provide predicted results based on historical results. Thus, the scores would better reflect expected vehicle purchases, leases, etc.

In some embodiments, the quality checks may include verifying that there are no groups with event percentages greater than or equal to 100% and no groups with less than four households. An additional example quality check may include verifying a number of zip code+4 areas in the merged file is equal throughout the processing, that a total number of households is equal throughout the processing, and that a total number of vehicles or users experiencing the event is equal throughout the processing.

At block 2726, the dynamic modeling system 103 generates the output notification package (for example, an electronic report) for the user including one or more of the records and/or groups for the identified geographic region, vehicle information, tier information (for example, the tiered group), and the model score. In some embodiments, the electronic report may be automatically transmitted to the user once generated by the dynamic modeling system 103. In some embodiments, the electronic report may be viewed by the user by accessing the electronic report via the dynamic modeling system 103. In some embodiments, the electronic report may be printed and electronically sent to the dynamic modeling system 103. Thus, the user may receive various information that can be used to target potential clients that are known (or known to be reasonably likely) to be experiencing an event in the desired time period.

XX. User Interfaces—Example Use Case—Vehicle and Client Data

Figure 28:
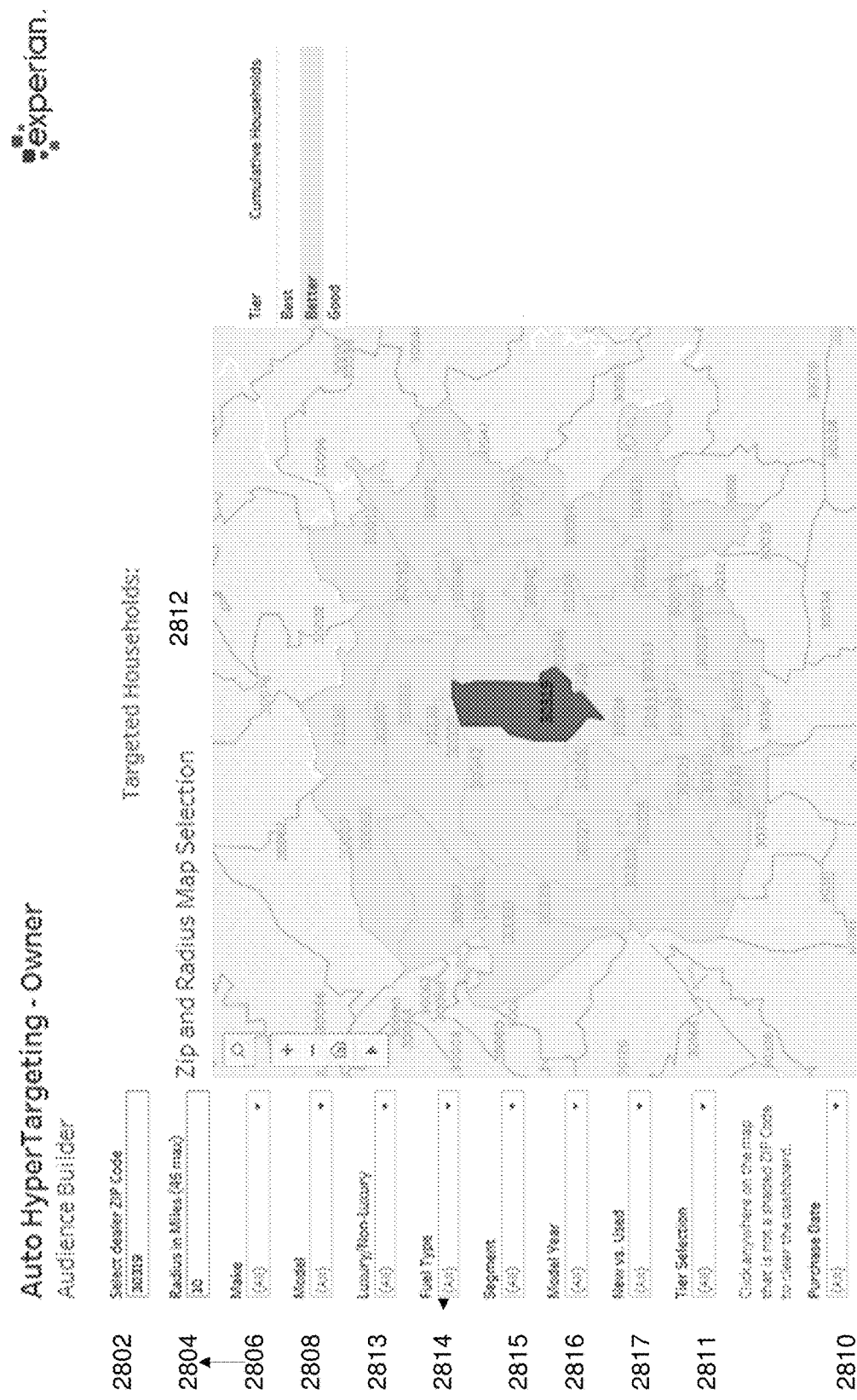
FIG. 28 is an example interactive user interface (or graphical user interface or "GUI") including screen that provides an off loan tool usable by a user for input selection, in accordance with an exemplary embodiment.

FIG. 28 is an example interactive user interface (or graphical user interface or "GUI") including screen 2800 that provides an off loan tool usable by a user for input selection, in accordance with an exemplary embodiment. Advantageously, the interactive user interface allows user to interact with various elements of the GUI, e.g., by touching or otherwise selecting and/or manipulating the elements, to receive input from the user and provide dynamic updates to the user via the GUI, such as in response to processing large amount of data based on inputs provided by the user via the GUI and providing real-time updates to the GUI in some embodiments.

In this embodiment, the event tool may provide the client with an ability to review records for vehicles and/or users that experience user or vehicle events in a particular geographic radius around a selected zip code. The radius and selected zip code may correspond with a coverage area or radius around a single dealer rooftop or a particular geographic radius around multiple dealer rooftops in a selected zip code.

The example screen 2800 may include various values that are user customizable and that may initiate updates to the GUI in response to adjustment of the values. A first value 2802 may correspond with a zip code based on which the user wants the event tool to generate a report of percentages of all vehicles or users likely experiencing an event. In some embodiments, the zip code selected by the user may be centrally located in a particular geographic region. For example, the value 2802 may default to the zip code of the user (for example, of a dealer rooftop, manufacturer site, part or service provider office, etc.).

The example screen 2800 further includes a radius value 2804. The radius value 2804 may indicate a radius around the zip code value 2802. In some embodiments, the radius value 2804 may be, for example, in a range of 0 to 45 miles and may be user selectable with a manually entered value or with a slider bar to adjust the value. The range may instead be in a range of 0 to 10 miles or 0 to 20 miles or any other range. For example, the radius may be set at increments of 0.5 miles or 1 mile or 5 miles. In some embodiments, the GUI may include a geometric (e.g., circular, oval, rectangular, etc.) or free form selection tool that allows the user to select an area of a map for analysis.

The example screen 2800 also includes a selection 2806 for selecting one or more vehicle makes. The selection 2806 of vehicle makes may utilize a multiple selection capable drop down menu that allows the user to identify one or more vehicle makes that the user wants to use in the report generated by the event tool. For example, the user may select one or more manufacturers (for example, Ford, GM, Lincoln, and so forth) that best fits the user market and target audience (for example, competitors, known clients, and so forth). Selection 2808 provides a multiple selection drop down menu by which the user selects one or more models associated with the one or more selected makes or manufacturers from selection 2806. By selection 2808, the user identifies one or more vehicle models which the user wants to use in the report generated by the event tool.

The example screen 2800 also includes a date 2810 selection menu that allows the user to select or identify a date or range of dates within which the user wishes to identify events for the selected vehicle attributes (for example, makes and models described above). In some embodiments, the date or range of dates may be a single day or a range of many weeks within, for example, an 18-month window.

The example screen 2800 includes a map 2812 that identifies zip codes that will be searched based on the entries in the values 2802 and 2804 described above. For example, the zip code identified in zip code value 2802 may be shaded with a first shade or pattern and positioned generally in a center of the map 2812. The map 2812 further identifies zip codes that fall around the zip code value 2802 and those zip codes that fall within the radius in value 2804 may be shaded with a second shade or pattern. In some embodiments, only zip codes that fall entirely within the radius value 2804 may be shaded or identified. In some embodiments, any zip code that falls at least partially within the radius value 2804 may be shaded or identified. In the map 2812, the zip code 30319 may be the selected zip code value 2802 and the shaded zip codes surrounding the 30319 zip code are the zip codes that will be searched for households with for events that occur.

The example screen 2800 shows a tier selection value 2811 that allows the user to select only those results that meet particular tiers. For example, the tiers may correspond to the tiered groups described above, where tiered groups of zones maybe based on the event percentage. For example, tier A may be the "best" tier including geographic zones with event percentage of >65% but <100%, tier B may be the "better" tier including geographic zones with an event percentage of >40% but <=65%; tier C may be the "good" tier including the geographic zones with an event percentage of <=40%. By selecting a particular tier, only those households that fall in the selected tier may be shown in the example screen 2800 and the resulting report.

The example screen 2800 also allows selections for luxury/non-luxury vehicles 2813 (allowing selection between luxury and non-luxury vehicles), fuel type 2814 (allowing selection between vehicles with different fuel types, such as hybrid, electric, diesel, unleaded, etc.), segment 2815 (allowing selection between SUV, sedan, coupe, van, etc.), model year 2816 (allowing selection based on model year), and new vs. used 2817 (allowing selection based on whether the vehicle in the household was purchased new or used). In some embodiments, a selection using one of the luxury/non-luxury vehicles 2813 and fuel type 2814 automatically selects corresponding makes and models from selections 2806 and 2808, respectively.

In some embodiments, the client may individually select (or hover over) each shaded zip code to see information specific to the selected zip code.

Figure 29:
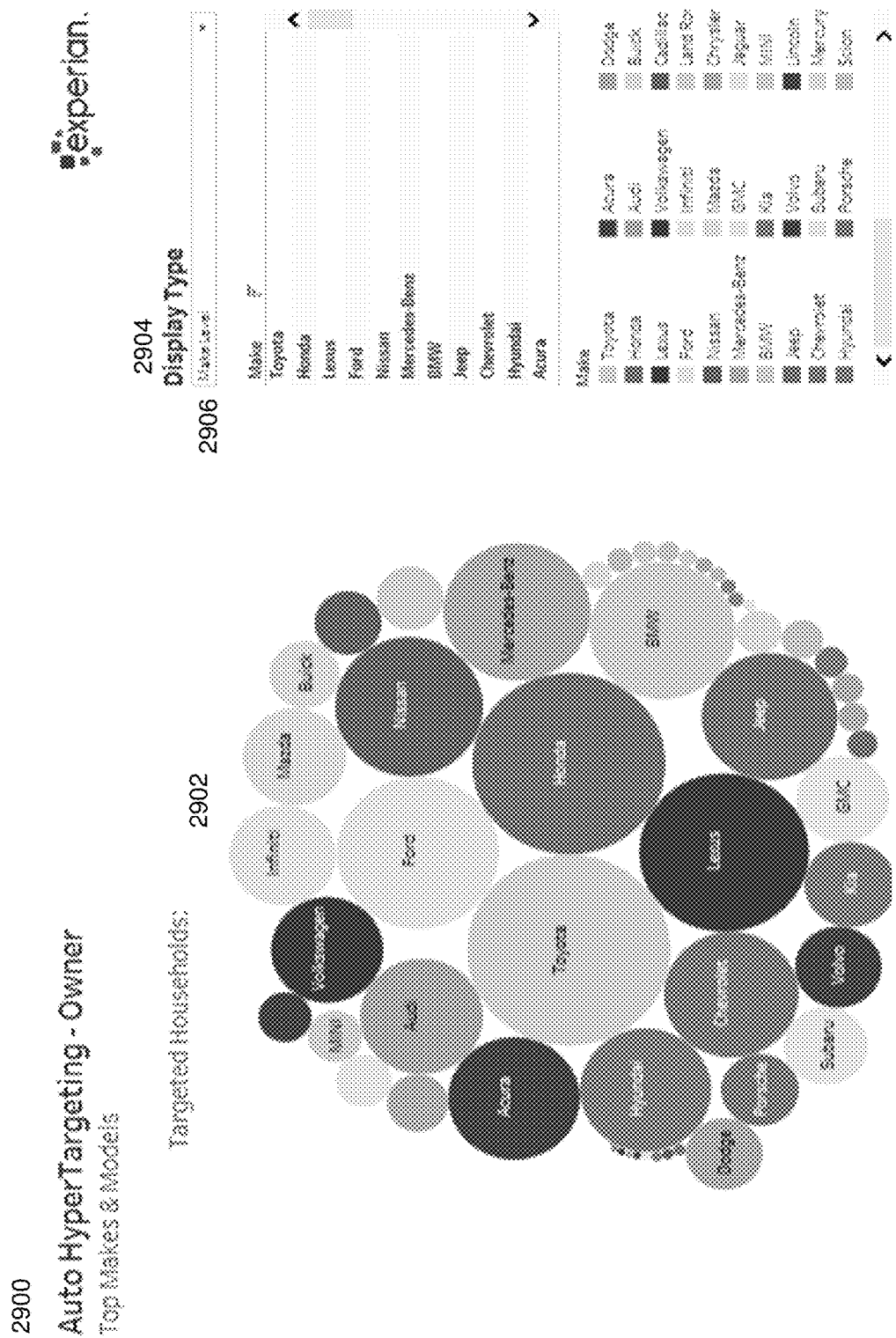
FIG. 29 is an example of a breakdown ranking or listing of a number of targeted household, identified by make, associated with one or more owner or vehicle events in the specified geographic region, in accordance with an exemplary embodiment.

FIG. 29 is an example of a graphical and numerical display 2900 depicting a number of targeted households that have a vehicle or owner event that occurs within a predefined time period that are within a particular geographic area identified by the zip code value 2802 and the radius value 2804 of FIG. 28. In some embodiments, the display 2900 may be presented to a user as part of a GUI that is displayed on a user's computing device. In some embodiments, the GUI may include various representations or values for comparison, such as interactive elements that are selectable to cause display of more detailed information regarding the selected item. The geographic area with which the display 2900 relates is indicated by the map 2812.

The display 2900 includes, as shown, a graph 2902 of circles of varying sizes or areas for a plurality automobile manufacturers, where the size or area of the circle is indicative of a corresponding value or number of vehicles by the respective manufacturer within the geographic area that have events identified by the system. For example, a larger sized circle corresponds to a larger number of vehicles by the respective manufacturer associated with an event within the geographic area and a smaller sized circle corresponds to a smaller number of vehicles by the respective manufacturer. The display 2900 include a table 2904 that provides the numbers of vehicles associated with each manufacturer and also provides the key associating each manufacturer with one of the circles on the graph 2902. In some embodiments, the manufacturers shown in the display 2900 may correspond to the selection 2806 of vehicle makes, such that the manufacturers shown on the display 2900 depends on the makes selected at the selection 2806.

Additionally, the display 2900 includes a drop down selector 2906 that allows a selection of one of the attributes that are selectable with the selectors 2806, 2808, 2810, 2811, and 2813-2817 on the screen 2800 of FIG. 28. As such, the display 2900 can be used to show breakdowns according to any of the selections available on the screen 2800 for ease of review. Accordingly, the values and information shown in the table 2904 may change according to the data in the selections on the screen 2800. The table 2904 includes a column for the number of target households and a column for the breakdown being depicted (for example, the manufacturer, model, fuel type, luxury/non-luxury, etc. This is one data visualization example. There are a multitude of ways to view the data based on the selected criteria(s), with other options including, but are not limited to, household counts, historical purchase rates, purchase timing, vehicle segments, and so forth.

Figure 30:
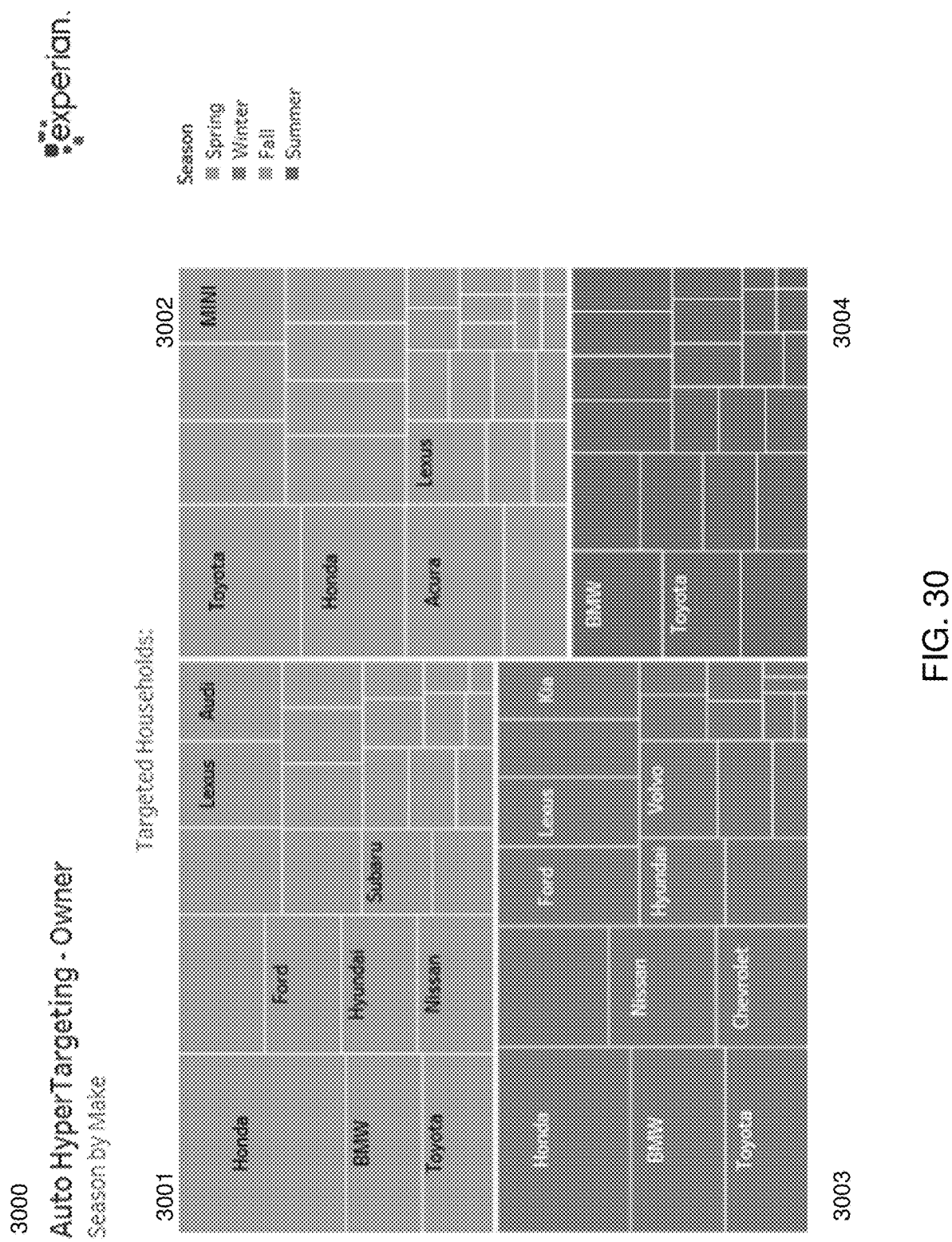
FIG. 30 is an example of a breakdown ranking or listing of the number of targeted households, identified by make, associated with the one or more owner or vehicle events in the specified geographic region and in a specified season, in accordance with an exemplary embodiment.

FIG. 30 is an example of a breakdown 3000 of the number of targeted households associated with the one or more owner events in the specified geographic region shown on the graph 2900 of FIG. 29 according to vehicle make, where the one or more owner events occurs in a specified season. As shown, the breakdown 3000 includes four quadrants, one for each of the spring, winter, fall, and summer seasons. Each quadrant include sub-breakdowns that are divided according to the selected attribute from the screen 2800. For example, quadrant 3001, in the top left hand corner of the breakdown 3000, corresponds to the number of target households that experienced a vehicle or owner event having a vehicle from a particular manufacturer during the spring, while the quadrant 3002 in the top right hand corner is for the fall, the quadrant 3003 in the bottom left hand corner is for the winter, and the quadrant 3004 in the bottom right hand corner is for the summer. The areas or sizes of the sub-breakdowns correspond the quantity or number of vehicles for each make, similar to the sizes or areas of the circles in the graph 2802 of FIG. 28.

In some embodiments, given the limited area available for each sub-breakdown or season, only a subset of the total manufacturers from the display 2800 of FIG. 28 are shown. In the each of the sub-breakdowns of the breakdown 3000, the top 23 manufacturers are shown. The breakdown 3000 also includes the total number of targeted households identified by the system and as shown in the screen 2800 and the display 2900.

Figure 31:
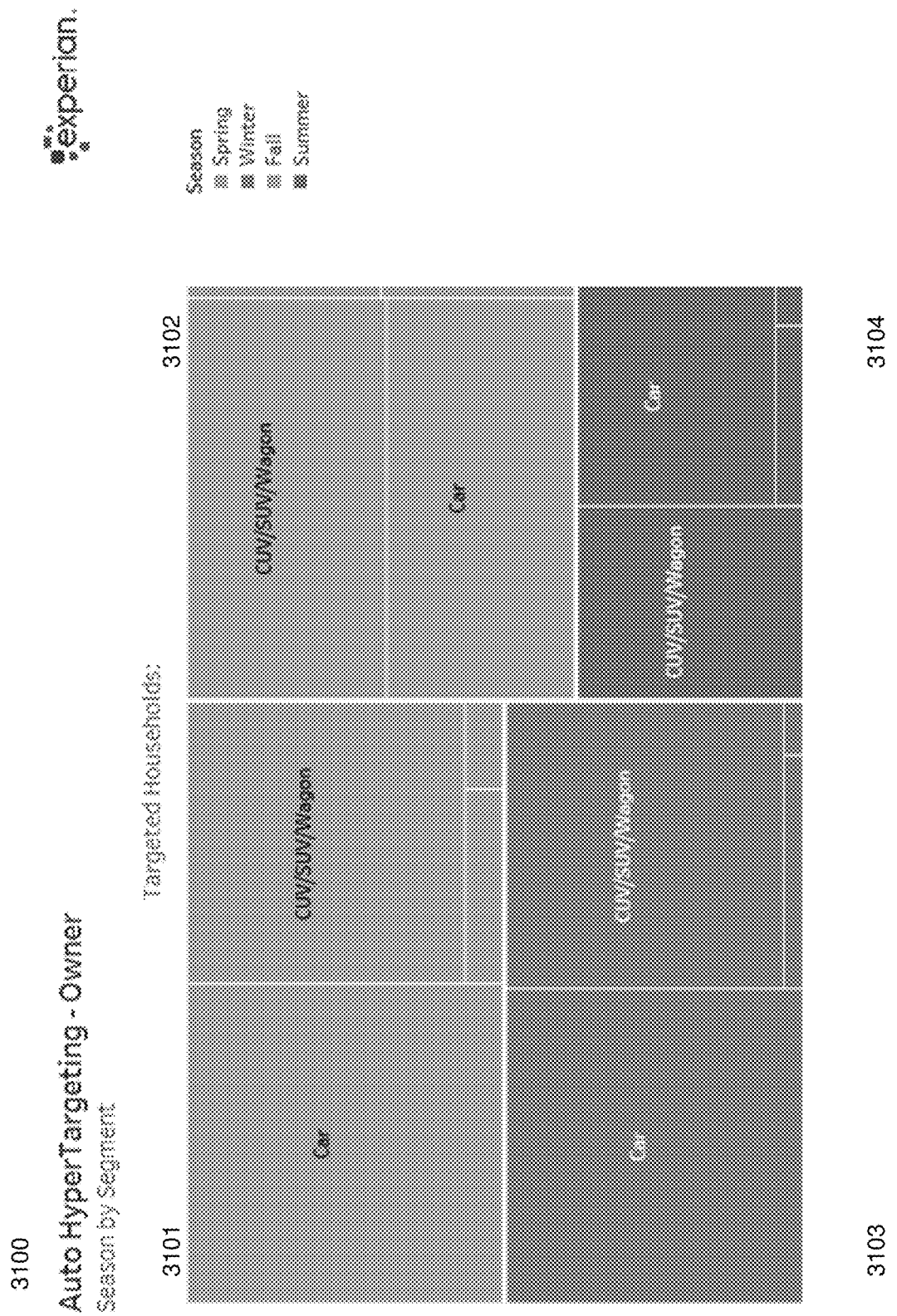
FIG. 31 is an example of a breakdown ranking or listing of the number of targeted households identified by type, associated with the one or more owner or vehicle events in the specified geographic region and in the specified season, in accordance with an exemplary embodiment.

FIG. 31 is an example of a breakdown 3100 of the number of targeted households associated with the one or more owner events in the specified geographic region shown on the graph 2900 of FIG. 29 according to vehicle type, where the one or more owner events occurs in a specified season. The breakdown 3100 may be displayed on a user device in response to the user selecting a specified geographic region of graph 2900, such as in real-time in response to the user selecting the region via a displayed GUI.

As shown, the breakdown 3100 includes four quadrants 3101-3104, one for each of the spring, winter, fall, and summer seasons. Each quadrant include sub-breakdowns that are divided according to the selected attribute from the screen 2800. For example, quadrant 3101, in the top left hand corner of the breakdown 3100, corresponds to the number of target households that experienced a vehicle or owner event having a vehicle of a particular vehicle type during the spring, while the quadrant 3102 in the top right hand corner is for the fall, the quadrant 3103 in the bottom left hand corner is for the winter, and the quadrant 3104 in the bottom right hand corner is for the summer. The areas or sizes of the sub-breakdowns correspond the quantity or number of vehicles for each vehicle type, similar to the sizes or areas of the circles in the graph 2902 of FIG. 29.

In some embodiments, given the limited area available for each sub-breakdown or season, only a subset of the total manufacturers from the display 2900 of FIG. 29 are shown. In the each of the sub-breakdowns of the breakdown 3100, the top 2 vehicle types are shown. The breakdown 3100 also includes the total number of targeted households identified by the system and as shown in the screen 2800 and the display 2900.

Figure 32A:
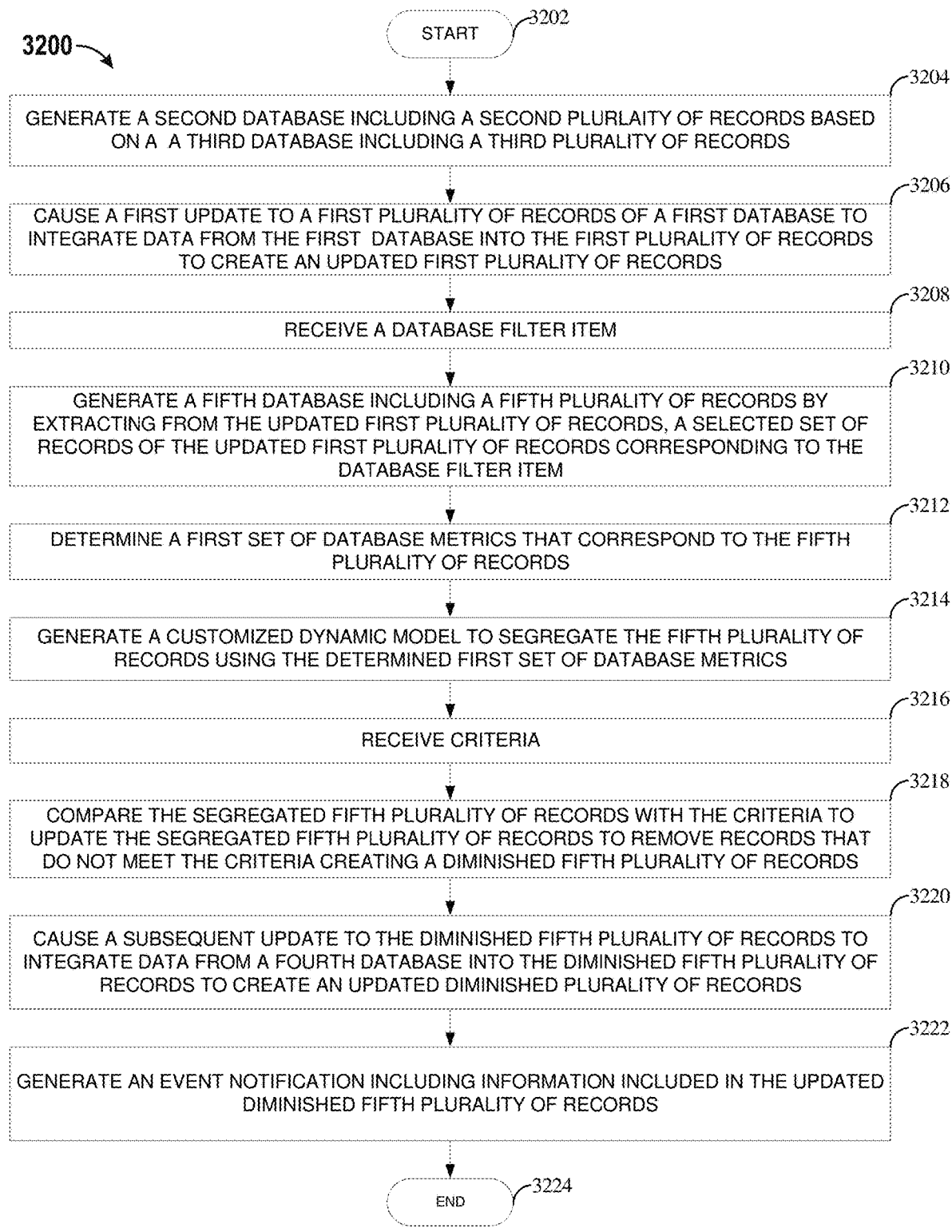
FIGS. 32A and 32B are flow charts for methods of processing data using dynamic models, in accordance with exemplary embodiments.
Figure 32B:
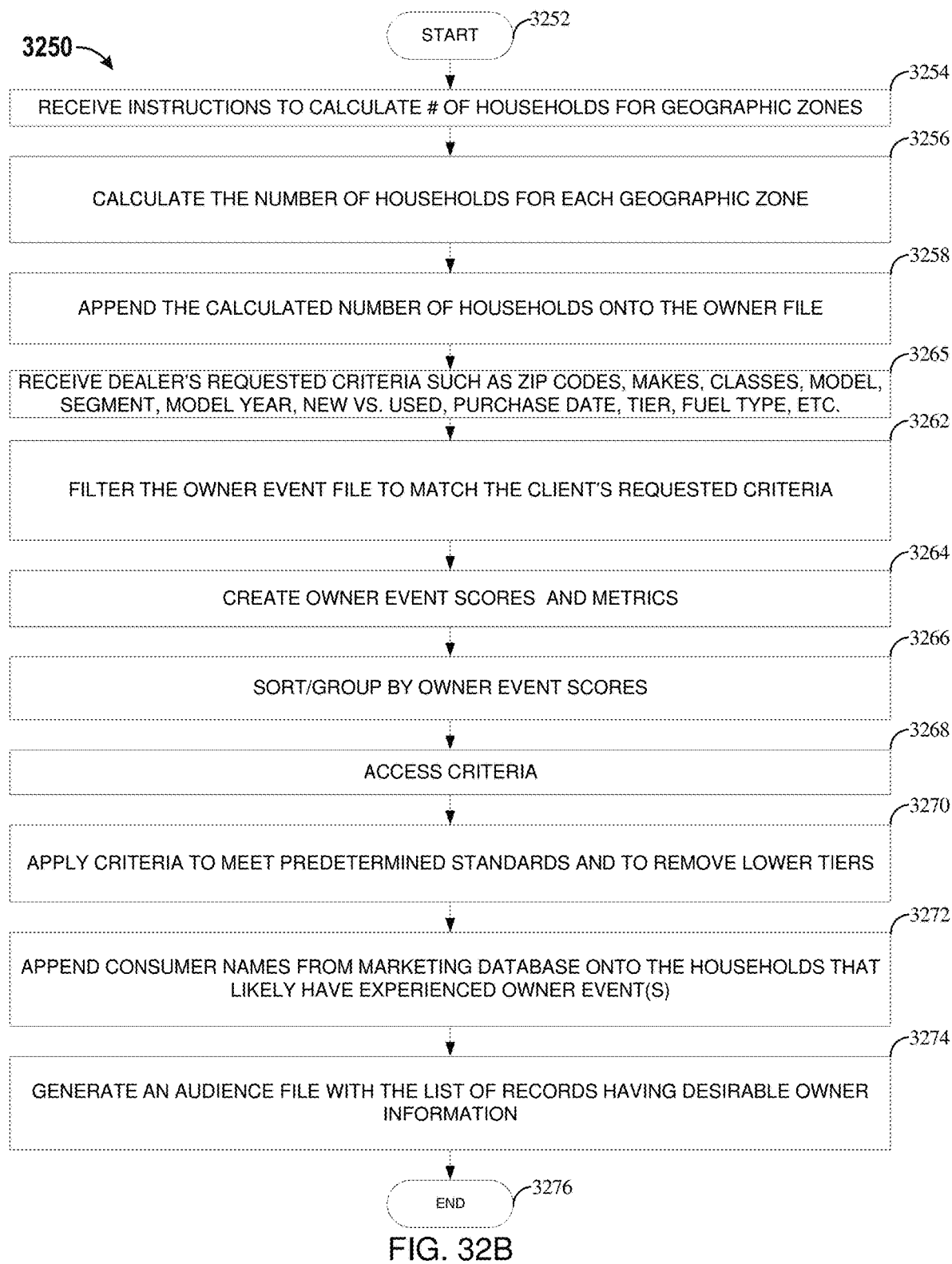

FIGS. 32A and 32B are flow charts for methods of processing data using dynamic models, in accordance with exemplary embodiments. In some embodiments, any of the components described herein (for example, the CPU 202, the I/O interfaces and devices 204, the user interface module 214, and/or the mass storage device 210) of the dynamic modeling system 103 as shown in FIG. 2B) may perform either or both of these methods. The method 3200 of FIG. 32A begins at block 3202.

At block 3204, the CPU 202 may generate a second database including a second plurality of records based on a third database including a third plurality of records. At block 3206, the CPU 202 may cause a first update to a first plurality of records of a first database to integrate data from the first database into the first plurality of records to create an updated first plurality of records. At block 3208, the CPU may receive a database filter item. in some embodiments, the filter item may be received via the user interface module 214 and/or the I/O interfaces and device 204. For example, the first filter item comprises one or more filter values, selections, or inputs as received from a user of the dynamic modeling system 103 via the user interface module 214 or a predetermined criteria as received from the mass storage device 210. At block 3210, the CPU 202 may generate a fourth database including a fifth plurality of records by extracting from the updated first plurality of records, a selected set of records of the updated first plurality of records corresponding to the database filter item and corresponding records from the second database. At block 3212, the CPU 202 may determine a first set of database metrics that correspond to the fifth plurality of records.

At block 3214, the CPU 202 may generate a customized dynamic model to segregate the fifth plurality of records using the determined first set of database metrics. At block 3216, the CPU 202 may receive criteria corresponding to predetermined rules or filters. At block 3218, the CPU 202 may compare the segregated fifth plurality of records with the criteria to update the segregated fifth plurality of records to remove records that do not meet the criteria creating a diminished fifth plurality of records. At block 3220, the CPU 202 may cause a subsequent update to the diminished fifth plurality of records to integrate data from a fourth database into the diminished fifth plurality of records to create an updated diminished plurality of records. At block 3222, the CPU 202 may generate an event notification including information included in the updated diminished plurality of records, before ending at block 3224.

The method 3250 of FIG. 32B begins at block 3252. At block 3254, the CPU 202 may receive instructions from a user to calculate a number of households for one or more geographic zones. At block 3256, the CPU 202 may calculate the number of households for each geographic zone, for example, based on information in a marketing database. At block 3258, the CPU 202 may append the calculated number of households onto an equity file. At block 3260, the CPU 202 may receive user's requested criteria such as zip codes, makes, classes, new vs. used, purchase date, tier, fuel type, and so forth. At block 3262, the CPU 202 may filter the owner event file to match the client's requested criteria. At block 3264, the CPU 202 may create owner event penetration rates, counts, and metrics. At block 3266, the CPU 202 may sort/group the data store by owner event rates. At block 3268, the CPU 202 may access criteria corresponding to predetermined limits, and so forth. At block 3270, the CPU 202 may apply the criteria to meet predetermined standards and to remove lower tiers. At block 3272, the CPU 202 may append consumer names from the marketing database onto the households that have experienced owner events in vehicle(s). At block 3274, the CPU 202 may generate an audience file with the list of records that have equity before ending at block 2576.

XXI. Computing Systems

Any of the components or systems described herein may be controlled by operating system software, such as Windows XP, Windows Vista, Windows 7, Windows 8, Windows Server, UNIX, Linux, SunOS, Solaris, iOS, Android, Blackberry OS, or other similar operating systems. In Macintosh systems, the operating system may be any available operating system, such as MAC OS X. In other embodiments, the components or systems described herein may be controlled by a proprietary operating system. Conventional operating systems control and schedule computer processes for execution, perform memory management, provide file system, networking, I/O services, and provide a user interface, such as a graphical user interface ("GUI"), among other things.

Computing devices, which may comprise the software and/or hardware described above, may be an end user computing device that comprises one or more processors able to execute programmatic instructions. Examples of such computing devices are a desktop computer workstation, a smart phone such as an Apple iPhone or an Android phone, a computer laptop, a tablet PC such as an iPad, Kindle, or Android tablet, a video game console, or any other device of a similar nature. In some embodiments, the computing devices may comprise a touch screen that allows a user to communicate input to the device using their finger(s) or a stylus on a display screen.

The computing devices may also comprise one or more client program applications, such as a mobile "app" (for example, iPhone or Android app) that may be used to visualize data, and initiate the sending and receiving of messages in the computing devices. This app may be distributed (for example downloaded) over the network to the computing devices directly or from various third parties such as an Apple iTunes or Google Play repository or "app store." In some embodiments, the application may comprise a set of visual interfaces that may comprise templates to display vehicle history reporting and financing information. In some embodiments, as described above, visual user interfaces may be downloaded from another server or service. This may comprise downloading web page or other HTTP/HTTPS data from a web server and rendering it through the "app". In some embodiments, no special "app" need be downloaded and the entire interface may be transmitted from a remote Internet server to computing device, such as transmission from a web server to an iPad, and rendered within the iPad's browser.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the vehicle history reporting and financing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, the system distinguishes between the initial transmission of loan application data required for user interfaces, and subsequent transmissions of user interface data so that it may transmit only portions that are necessary to update a vehicle history reporting and financing user interface. This may be done, for example, using an XMLHttpRequest (XHR) mechanism, a data push interface, Asynchronous JavaScript and XML ("Ajax"), or other communication protocols.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process blocks may be stored, persistently or otherwise, in any type of non-transitory computer storage such as, for example, volatile or non-volatile storage.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or blocks in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the vehicle history reporting and financing system 100, marketing computing device 162, and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The I/O devices and interfaces provide a communication interface to various external devices and systems. The computing system may be electronically coupled to a network, which comprises one or more of a LAN, WAN, the Internet, or cloud computing networks, for example, via a wired, wireless, or combination of wired and wireless, communication links. The network communicates with various systems or other systems via wired or wireless communication links, as well as various data sources.

Information may be provided to the computing system 1200 over the network from one or more data sources including, for example, external sources 104, 108 or internal source information database. In addition to the sources that are illustrated in FIG. 1, the network may communicate with other data sources or other computing devices. The data sources may include one or more internal or external data sources. In some embodiments, one or more of the databases or data sources may be implemented using an open-source cross-platform document-oriented database program, such as a Mongo dB, a relational database, such as IBM DB2, Sybase, Oracle, CodeBase and Microsoft® SQL Server as well as other types of databases such as, for example, a flat file database, an entity-relationship database, and object-oriented database, and/or a record-based database.

It is recognized that the term "remote" may include systems, data, objects, devices, components, or modules not stored locally, that are not accessible via the local bus. Thus, remote data may include a system that is physically stored in the same room and connected to the computing system via a network. In other situations, a remote device may also be located in a separate geographic area, such as, for example, in a different location, country, and so forth.

XXII. Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following.

What is claimed is:

1. A data processing system for accessing databases and updated data items, the data processing system comprising:
   a user database including a plurality of user records relating to property owners;
   an interactive user interface; and
   a hardware processor configured to execute computer-executable instructions to:
      receive, via the interactive user interface displayed on a user device, a database filter item;
      generate a database including a plurality of records by extracting from a plurality of user records, a selected set of household level records of the plurality of user records matching the database filter item;
      determine a first set of metrics that correspond to the plurality of records;
      generate a customized dynamic model configured to segregate the plurality of records using the determined first set of database metrics;
      receive criteria of one or more selected metrics of the first set of database metrics to filter the plurality of records;
      create a diminished plurality of records that includes records that meet one or more of the first set of database metrics based on the segregated plurality of records and the criteria;
      cause an update to the diminished plurality of records to integrate data from an event database into the diminished plurality of records to create an updated diminished plurality of records; and
      based on an identification of one or more records existing in the updated diminished plurality of records, update the interactive user interface to include information included in the updated diminished plurality of records.

2. The data processing system of claim 1 further comprising:
   a scoring engine;
   wherein the hardware processor is further configured to execute computer-executable instructions to:
      execute the scoring engine using the updated diminished plurality of records to generate a score file; and
      cause a second update to the updated diminished plurality of records to integrate data from the score file into the updated diminished plurality of records to create a scored diminished plurality of records.

3. The data processing system of claim 2, wherein the hardware processor is further configured to execute computer-executable instructions in order to analyze historical purchase rates and corresponding score file information and update the scoring engine accordingly.

4. The data processing system of claim 1, wherein the database filter item comprises one or more of a geographic area, a vehicle make, a vehicle model, or a time period.

5. The data processing system of claim 4, wherein the hardware processor is further configured to generate an event notification indicating a quantity of households in the geographic area that satisfy the database filter item and a breakdown of the quantity of households in the geographic area that satisfy the database filter item according to one or more of: the vehicle make, the vehicle model, the time period, or a vehicle type.

6. The data processing system of claim 1, wherein the first set of database metrics comprises at least a comparison of a number of relevant household level records to a total number of household level records in the geographic area.

7. The data processing system of claim 1, wherein the hardware processor is further configured to execute computer-executable instructions in order to analyze historical purchase rates and update one or more of the first set of database metrics.

8. The data processing system of claim 1, wherein the hardware processor creates a diminished plurality of records based on comparing the segregated plurality of records with the criteria to update the segregated plurality of records to remove records that do not meet the criteria.

9. A computer implemented method for generating an event notification, the method comprising:
   receiving, from a user computer system, a database filter item comprising one or more rules for notifying the first user computer system of particular types of updates;
   generating, by the database system, a database including a plurality of records by extracting a selected set of records corresponding to the database filter item from another database of records;
   determining, by the database system, a database metrics that correspond to the plurality of records;
   generating, by the database system, a customized dynamic model to segregate the plurality of records using the determined database metrics;
   receiving, by the database system, criteria;
   comparing, by the database system, the segregated plurality of records with the criteria to update the segregated plurality of records to remove records that do not meet the criteria, creating a diminished plurality of records;
   causing, by the database system, a subsequent update to the diminished plurality of records to integrate data from the second database into the diminished plurality of records to create an updated diminished plurality of records;
   automatically generating, by the database system, an electronic notification, for communication to the user computing system of a user, indicating information included in the updated diminished plurality of records; and
   communicating, by the database system, the electronic notification to the user computing system.

10. The computer implemented method of claim 9, wherein the database filter item from the user computer system comprises at least a target metric associated with the other database of records.

11. The computer implemented method of claim 9, wherein the database filter item from the user computer system comprises at least a geographic restriction associated with the other database of records.

12. The computer implemented method of claim 9, further comprising:
   accessing, by the database system, a scoring engine;
   executing, by the database system, the scoring engine using the updated diminished plurality of records to generate a score file; and
   causing, by the database system, another update to the updated diminished plurality of records to integrate data from the score file into the updated diminished plurality of records to create a scored diminished plurality of records.

13. A data processing system for accessing databases and updated data items, the data processing system comprising:
a user database including a plurality of user records relating to vehicle owners;
a hardware processor configured to execute computer-executable instructions to:
receive, via an interactive user interface displayed on a user device, a request to calculate a number of households in a geographic zone;
calculate the number of households for the geographic zone based on information stored in the user database;
append the calculated number of households for the geographic zone to a first file;
receive criteria selected by the user device for filtering the first file;
filter the first file based on the received criteria;
generate one or more metrics based on the filtered first file;
sort the first file based on at least one of the one or more metrics;
access limit criteria that correspond to predetermined limits within the first file relative to the at least one of the one or more metrics;
apply the limit criteria to the sorted first file to meet predefined standards;
append the user records in the first file with identifying information; and
generate a results file identifying those user records in the first file that meet the received criteria and the limit criteria.

14. The data processing system of claim 13, wherein the received criteria comprises one or more of a geographic area, a vehicle make, a vehicle model, or a time period.

15. The data processing system of claim 14, wherein the hardware processor is further configured to generate an event notification indicating a quantity of households in the geographic zone that satisfy the received criteria and a breakdown of the quantity of households in the geographic zone that satisfy the received according to one or more of: the vehicle make, the vehicle model, the time period, or a vehicle type.

16. The data processing system of claim 13, wherein the one or more metrics comprises at least a comparison of a number of relevant household level records to a total number of household level records in the geographic zone.

17. The data processing system of claim 13, wherein the hardware processor is further configured to execute computer-executable instructions in order to analyze historical purchase rates and update the one or more metrics.

18. The data processing system of claim 13, wherein the hardware processor creates a diminished plurality of records based on removing records that do not meet the received criteria.

19. The data processing system of claim 13, wherein one or more metrics comprises at least a target metric.

20. The data processing system of claim 13, wherein one or more metrics comprises at least a geographic restriction.

* * * * *